US012748415B2

(12) United States Patent
Brown et al.

(10) Patent No.: US 12,748,415 B2
(45) Date of Patent: Sep. 29, 2026

(54) FALSE FAULT DETECTION FOR A COMPLIANCE REPORTING SYSTEM

(71) Applicant: Tyco Fire & Security GmbH, Neuhausen am Rheinfall (CH)

(72) Inventors: Julie J. Brown, Yardley, PA (US); Brendon F. Buckley, Carmel, IN (US); Matthew F. Malcolm, Brookfield, WI (US); Jesse D. Nercessian, Milwaukee, WI (US); Shawn D. Schubert, Oak Creek, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 287 days.

(21) Appl. No.: 18/540,070

(22) Filed: Dec. 14, 2023

(65) Prior Publication Data

US 2024/0201679 A1 Jun. 20, 2024

Related U.S. Application Data

(60) Provisional application No. 63/432,833, filed on Dec. 15, 2022.

(51) Int. Cl.
*G05B 23/02* (2006.01)

(52) U.S. Cl.
CPC ................................ *G05B 23/0262* (2013.01)

(58) Field of Classification Search
CPC .......................... G05B 23/0262; G05B 23/027
See application file for complete search history.

(56) References Cited

U.S. PATENT DOCUMENTS

| | | | |
|---|---|---|---|
| 8,655,830 | B2 | 2/2014 | Mackay |
| 8,731,724 | B2 | 5/2014 | Drees et al. |
| 9,753,455 | B2 | 9/2017 | Drees |
| 10,402,767 | B2 | 9/2019 | Noboa et al. |
| 11,182,047 | B2 | 11/2021 | Nayak et al. |
| 11,567,466 | B1 | 1/2023 | Galvez et al. |
| 2021/0080139 | A1 | 3/2021 | Brown et al. |
| 2021/0080143 | A1 | 3/2021 | Brown et al. |

(Continued)

OTHER PUBLICATIONS

Setra Systems, Inc., "Critical Environments Brochure 170502 Rev B," URL: http://setrasystems.uberflip.com/setra-systems/critical-environments-brochure, Jun. 29, 2015 (12 pages).

(Continued)

*Primary Examiner* — Charles Cai
(74) *Attorney, Agent, or Firm* — Foley & Lardner LLP

(57) ABSTRACT

A compliance system for a critical environment includes at least one sensor configured to output sensor measurements relating to at least one environmental condition of the critical environment, and a computing system. The computing system is programmed to record a warning when the sensor measurements are out of compliance relative to a compliance standard for longer than a warning delay time, generate an alert in response to a combination of recording the warning and a non-improving trend of the sensor measurements, and in response a combination of recording the warning and an improving trend of the sensor measurements, suppress the alert until the improving trend continues with the sensor measurements out of compliance for greater than an alert delay time.

20 Claims, 25 Drawing Sheets

(56) References Cited

U.S. PATENT DOCUMENTS

| | | | | |
|---|---|---|---|---|
| 2021/0081811 | A1* | 3/2021 | Brown | G05B 19/042 |
| 2021/0200807 | A1 | 7/2021 | Ploegert et al. | |
| 2021/0381861 | A1* | 12/2021 | Brown | G05D 22/02 |
| 2023/0169220 | A1 | 6/2023 | Ramanasankaran et al. | |
| 2023/0185983 | A1 | 6/2023 | Ramanasankaran et al. | |

OTHER PUBLICATIONS

Setra Systems, Inc., "EMS and BMS—Separate Systems Fulfilling a Common Cause White Paper," URL: http://setrasystems.uberflip.com/setra-systems/ems-and-bms-white-paper, Feb. 28, 2022 (5 pages).

Setra Systems, Inc., "Pressure Calibration Brochure," URL: http://setrasystems.uberflip.com/setra-systems/pressure-calibration-brochure?_ga=2.200925290.510907589.1701375015-1012487918.1701375014, Jun. 29, 2015 (12 pages).

Setra Systems, Inc., "Release Announcement: Setra CEMS &#x2122 Software 6.0 Update," URL: http://setrasystems.uberflip.com/setra-systems-blog/release-announcement-setra-cems-software-6-0-update, Nov. 28, 2023 (2 pages).

Setra Systems, Inc., "Setra CEMS Brochure," URL: http://setrasystems.uberflip.com/setra-systems/setra-cems-brochure-rev-a-1, Aug. 22, 2022 (7 pages).

Setra Systems, Inc., "Setra FLEX Brochure Rev B," URL: http://setrasystems.uberflip.com/setra-systems/setra-flex-brochure?_ga=2.200925290.510907589.1701375015-1012487918.1701375014, Feb. 7, 2017 (8 pages).

* cited by examiner

Command Center Engine with Patient Recognition Functionality

FALSE FAULT DETECTION FOR A COMPLIANCE REPORTING SYSTEM

CROSS-REFERENCE TO RELATED APPLICATION

This application claims priority to and the benefit of U.S. Provisional Patent Application No. 63/432,833 filed Dec. 15, 2022, the entire disclosure of which is incorporated by reference herein in its entirety.

BACKGROUND

The present disclosure relates generally to building management systems (BMS). More specifically, the present disclosure relates generally to BMS systems with an integrated command center.

SUMMARY

Some embodiments of the present disclosure relate to a compliance system for a critical environment. The compliance system includes at least one sensor configured to output sensor measurements relating to at least one environmental condition of the critical environment, and a computing system programmed to record a warning when the sensor measurements are out of compliance relative to a compliance standard for longer than a warning delay time and, in response to a combination of recording the warning and a non-improving trend of the sensor measurements, generate an alert. The computing system is also programmed to, in response a combination of recording the warning and an improving trend of the sensor measurements suppress the alert until the improving trend continues with the sensor measurements out of compliance for greater than an alert delay time and generate the alert upon the improving trend continuing with the sensor measurements out of compliance for greater than the alert delay time.

In some embodiments, computing system is programmed to classify the sensor measurements as having the improving trend or the non-improving trend by calculating a derivative of the sensor measurements. In some embodiments, the computing system is programmed to classify the sensor measurements as having the improving trend or the non-improving trend by calculating an integral of a difference between the sensor measurements and the compliance standard.

In some embodiments, the computing system is programmed to classify the sensor measurements as having the improving trend or the non-improving trend by determining a direction of change of the sensor measurements over time, identifying the improving trend when the direction of change is toward the compliance standard, and identifying the non-improving trend when the direction of change is away from the compliance standard or when the sensor measurements are not changing over time.

In some embodiments, the computing system is programmed to adjust the warning delay time or the alert delay time based on a magnitude of a deviation of the sensor measurements from the compliance standard.

In some embodiments, the compliance system also includes a display. The computing system may be configured to generate the alert by causing a notification to be presented on the display. The computing system may be programmed to abstain from causing the notification to be presented in response to the warning until the alert is generated. The computing system can automatically populate a compliance report with the warning.

In some embodiments, the critical environment is an operating room of a healthcare facility and the sensor measurements represent temperature, pressure, and humidity of the operating room. In some embodiments, the critical environment is a laboratory.

In some embodiments, the computing system is programmed to automatically determine a root cause in response to the alert and automatically generate a work order to resolve the root cause. The computing system may be programmed to automatically determine a root cause in response to the alert and cause a unit of building equipment to change operations to resolve the root cause.

In some embodiments, the computing system is programmed to record the warning when the sensor measurements are out of compliance relative to the compliance standard for longer than the warning delay time by incrementing a timer in response to the sensor measurements being out of compliance, decrementing the timer in response to the sensor measurements being in compliance, and comparing the timer to the warning delay time.

Another implementation of the present disclosure is a method for reducing alarm noise in a monitoring system for compliance standards for temperature, pressure, or humidity of a healthcare facility. The method includes collecting, by at least one sensor, sensor measurements relating to at least one of the temperature, pressure, and humidity of the healthcare facility, recording a warning when the sensor measurements are out of compliance relative to a compliance standard for longer than a warning delay time, and in response to a combination of recording the warning and a non-improving trend of the sensor measurements, generating an alert. The method can also include in response a combination of recording the warning and an improving trend of the sensor measurements, suppressing the alert until the improving trend continues with the sensor measurements out of compliance for greater than an alert delay time and generating the alert upon the improving trend continuing with the sensor measurements out of compliance for greater than the alert delay time.

In some embodiments, the method includes classifying the sensor measurements as having the improving trend or the non-improving trend by calculating an integral of a difference between the sensor measurements and the compliance standard or by calculating a derivative of the difference. The method may include classifying the sensor measurements as having the improving trend or the non-improving trend by determining a direction of change of the sensor measurements over time, identifying the improving trend when the direction of change is toward the compliance standard, and identifying the non-improving trend when the direction of change is away from the compliance standard or when the sensor measurements are not changing over time.

In some embodiments, the method includes abstaining from causing a notification be pushed to a user in response to the warning until the alert is generated and causing the notification to be pushed to the user in response to generating the alert. The method can include automatically populating a compliance report with the warning.

Another implementation of the present disclosure is one or more non-transitory computer-readable media storing program instructions that, when executed by one or more processors, cause the one or more processors to perform operations. The operations include recording a warning when sensor measurements relating to at least one environmental condition of a critical environment are out of compliance relative to a compliance standard for longer than a warning delay time. The operations can also include generating an alert in response to a combination of recording the warning and a non-improving trend of the sensor measurements. The operations can also include, in response a combination of recording the warning and an improving trend of the sensor measurements, suppressing the alert until the improving trend continues with the sensor measurements out of compliance for greater than an alert delay time and generating the alert upon the improving trend continuing with the sensor measurements out of compliance for greater than the alert delay time.

In some embodiments, the operations also include abstaining from causing a notification be pushed to a display device in response to the warning until the alert is generated, causing the notification to be pushed to the display device in response to generating the alert, and automatically populating a compliance report with the warning. In some embodiments, the critical environment is an operating room of a healthcare facility and the sensor measurements represent temperature, pressure, and humidity of the operating room.

DETAILED DESCRIPTION

Overview

Referring generally to the FIGURES, systems and methods for aggregating data from multiple subsystems and making one or more command decisions based on the aggregated data. In some embodiments, buildings-such as hospitals-include several systems and/or subsystems, such as heating, ventilation, or air conditioning (HVAC) systems, room scheduling systems, patient monitoring systems, ambulance dispatch systems, and distributed care systems.

Building Management System and HVAC System

Figure 1:
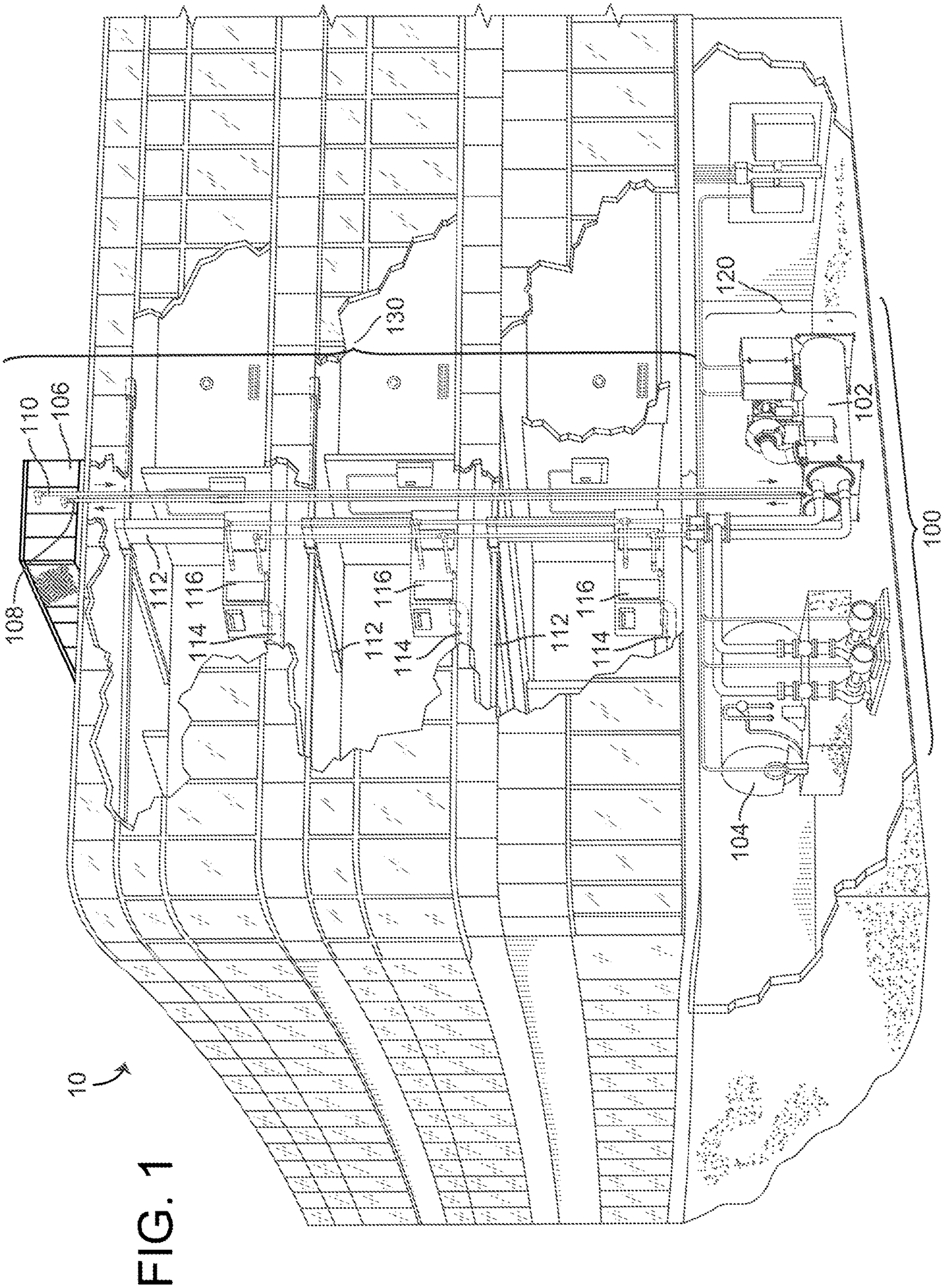
FIG. 1 is a schematic drawing of a building equipped with an HVAC system, according to some embodiments.

Referring now to FIG. 1, a perspective view of a building 10 (e.g., a hospital or healthcare facility) is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings of a hospital campus) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.).

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Figure 2:
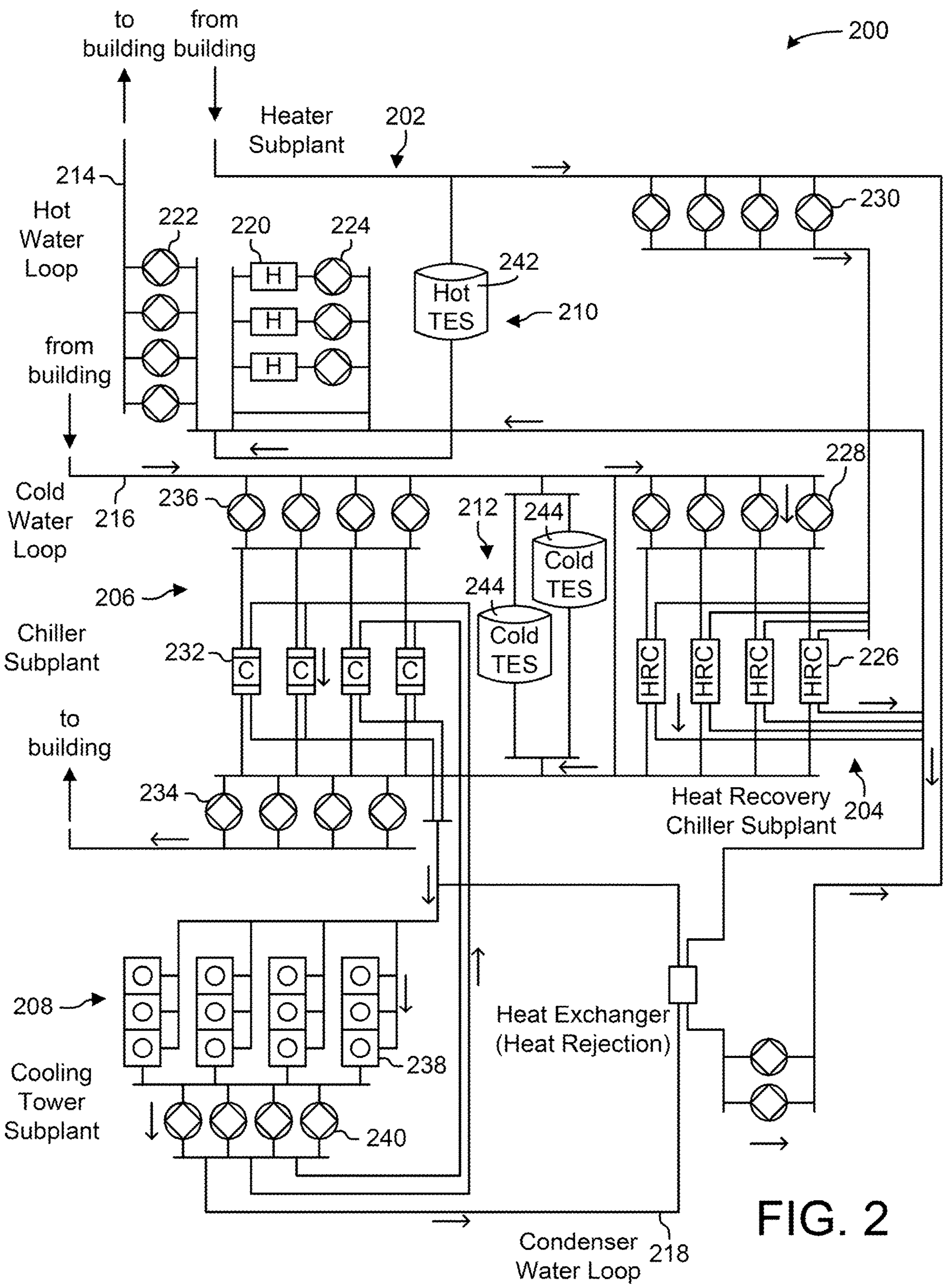
FIG. 2 is a schematic drawing of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
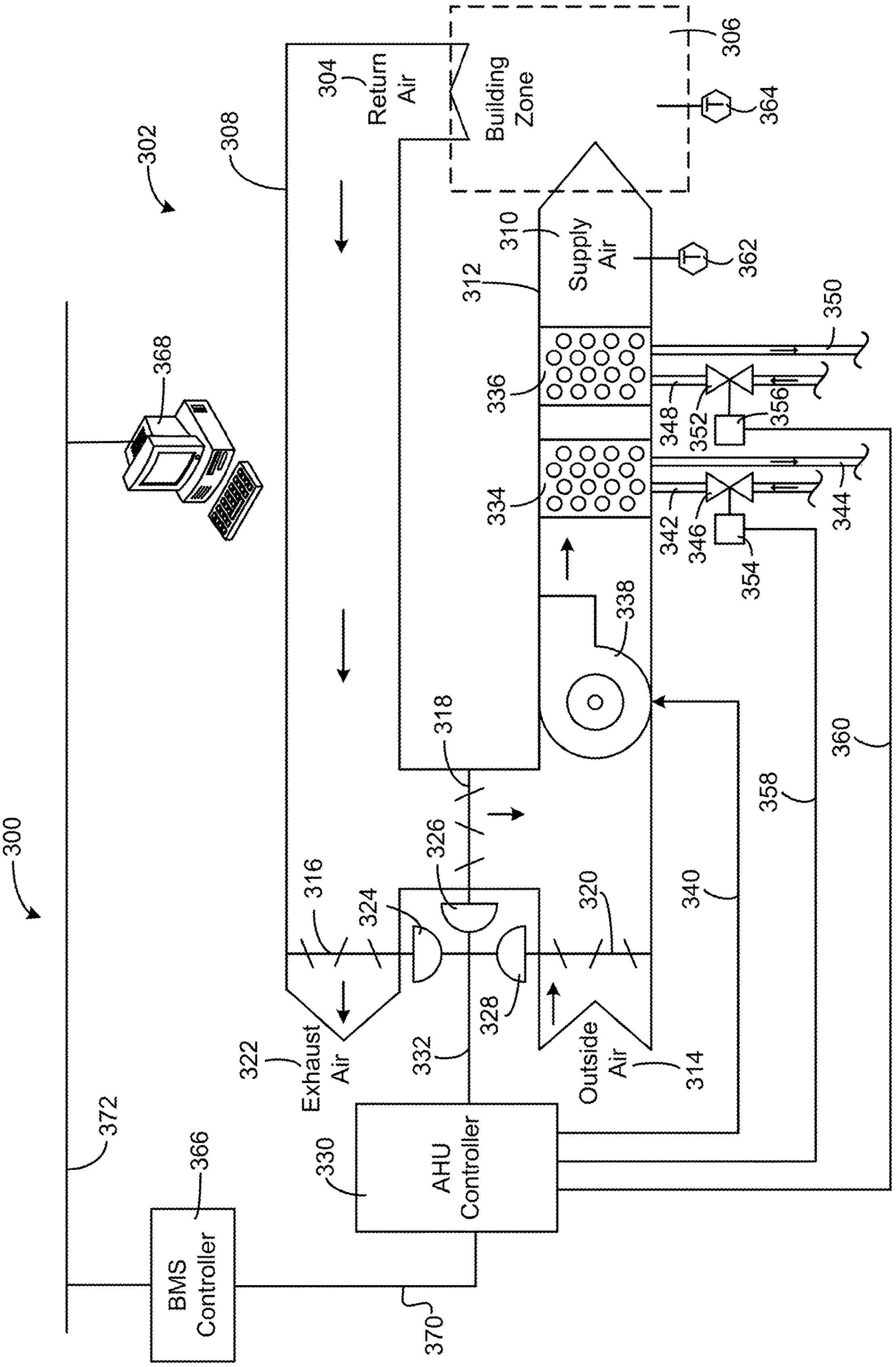
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flowrate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
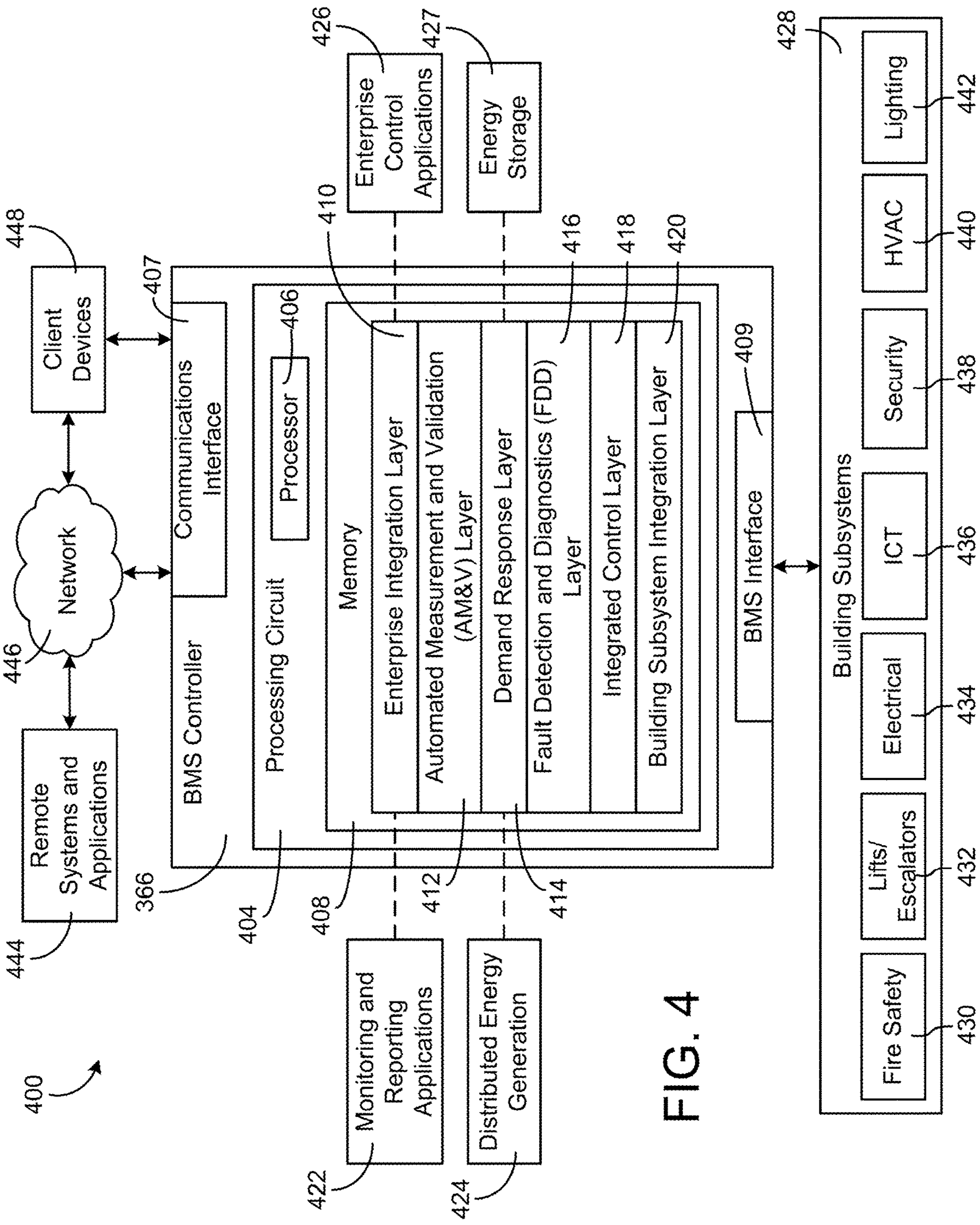
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include an elevator system, a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application-specific integrated circuit (ASIC), one or more field-programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Integrated Command Center

Figure 5:
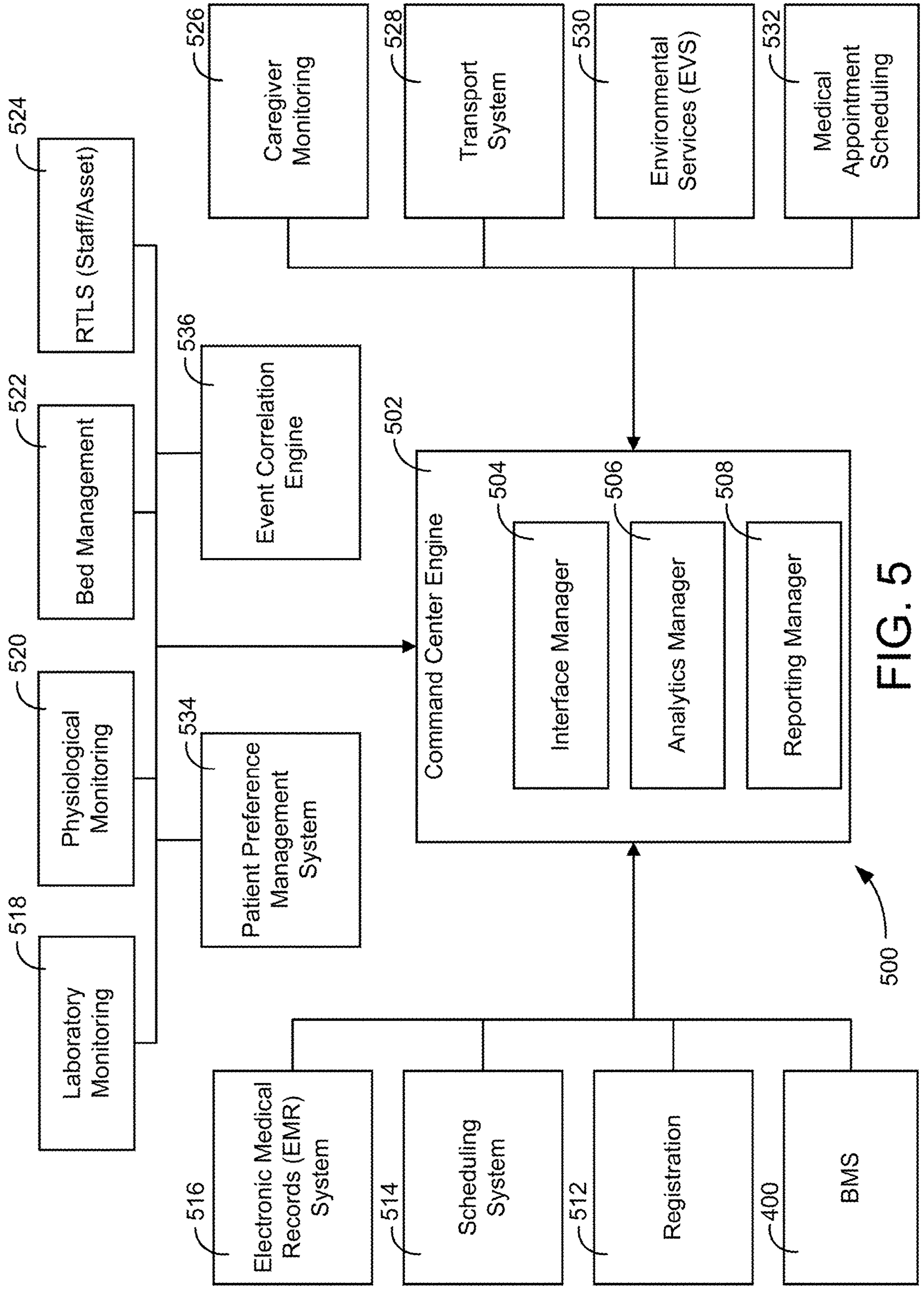
FIG. 5 is a block diagram of an integrated command center, which can be implemented in the building of FIG. 1, according to some embodiments.

Referring now to FIG. 5, a block diagram of supersystem 500 is shown, according to some embodiments. The supersystem 500 may be integrated with any of the systems described herein, such as the HVAC system 100, the waterside system 200, the airside system 300, and the BMS system 400. The supersystem 500 is shown to include multiple systems that are affiliated with the building 10, and a command center engineer for aggregating and analyzing data from the one or more systems. The supersystem 500 is shown to include the BMS 400, a registration system 512, a scheduling system 514, an electronic medical records (EMR) system 516, a laboratory monitoring system 518, a physiological monitoring system 520, a bed management system 522, a real time location system 524, a caregiver monitoring system 526, transport system 528, an environmental services (EVS) 530, a medical appointment scheduling (MAS) system 532, a patient preference management system (PPMS) 534, and an event correlation engine 536. Additionally, the supersystem 500 is shown to include a command center engine 502 including an interface manager 504, an analytics manager 506, and a reporting manager 508.

The registration system 512 may be configured to facilitate registration with the building 10. In some embodiments, a user registers for their appointment at the building 10 via an application. In some embodiments, the application provides global positioning satellite (GPS) coordinates to a user prior to and/or during the commute to building 10. The application may provide directions to the user that may include color coding and/or sound indicators. For example, on the application the user may be represented as a blue dot following a green path towards the building 10. Once inside the building 10, the application may also provide directions to the particular room or other location required to complete registration. In some embodiments, the application includes GPS instructions and assistance for several aspects of a visit to the building 10, such as providing guidance to another wing of building 10, providing guidance to a bathroom, and providing guidance to a new location to continue the visit at the building 10. In some embodiments, the MAS system 532 is included in the registration system 512, and is configured to facilitate medical appointment scheduling and coordinate travel to the appointment in a timely manner. Integration of the scheduling, check in, and navigation improves the user's ability to schedule and travel to appointments and allows for a more accurate schedule for the facility.

The scheduling system 514 may be configured to facilitate improved scheduling of the patients using the collected data at the command center engine 502. In some embodiments, the scheduling system 514 receives user preferences from the registration system 512 and uses that information to selectively schedule the time/date for the appointment of the patient. For example, during registration, the user is prompted (e.g., via an application, etc.) with questions regarding their preferences, such as preferred times to schedule an appointment. After completing registration, the user attempts to schedule a time or data that is outside of their preferred time slots (e.g., the user prefers morning slots and the user is attempting to schedule an appointment for the afternoon, etc.), the application may respond by suggestion to the user a preferred time slot. For example, the application responds with: "Thank you for booking! We've noticed that you prefer time slots in the mornings for your hospital appointments. Here are some suggested time slots that fit within your preferences, in case you would like to switch." The application may then provide one or more time slots on one or more days that fits within the preferences of the user.

In some embodiments, the scheduling system 514 facilitates scheduling of one or more patients based on several sets of aggregated data, not just the data from the registration system 512. For example, the BMS 400 may determine that one or more chillers configured to supply chilled fluid to a subsystem that cools the air in a particular zone of the building 10 is inoperable and, as such, the temperature cannot be properly controlled in that building zone. The command center engine 502 receives this information and the scheduling information from the scheduling system 514, which indicates a preferred appointment in that building zone. The application (e.g., which may be communicably connected to the command center engine, or query data from the command center engine 502, etc.) may respond to the requested scheduling by notifying the user that the building cannot presently receive scheduling appointments for that location of the building. In some embodiments, the operations of the one or more systems described within the supersystem 500 utilize data sets from one or more other systems within the supersystem 500.

The EMR system 516 may be configured to update and organize electronic medical records. In some embodiments, the updating and organizing of medical records is at least in part monitored by the command center engine 502. The command center engine 502 may be configured to receive information that helps facilitate the organizing of the medical records in a more efficient manner, using aggregated data from the other systems within the supersystem 500. For example, the command center engine may include scheduling preferences (e.g., preferred scheduled times, etc.), received from the scheduling system 514, caregiver preferences (e.g., gender, qualifications, etc.) (e.g., from the caregiver monitoring system 526, etc.), bed management information (e.g., preferred room type, etc.), and other information.

The laboratory monitoring system 518 may be configured to monitor and record laboratory operations before, during, or after laboratory sessions (e.g., surgeries, scans, etc.). In some embodiments, control signals provided to the laboratory rooms are adjusted based on decisions made by the command center engine 502. For example, the command center engine 502 receives information regarding user preferences to temperature, pressure, and humidity (TPH) levels within a room from the PPMS 534. The command center engine 502 also receives information on how the TPH levels in a laboratory are to comply with rules and regulations. The command center engine 502 then complies with the user preferences insomuch that they are in compliance with the rules and regulations of operation for the laboratory. Preferences of other users may also be considered, such as the doctor's preferences or the nurse's preferences.

The physiological monitoring system 520 may be configured to obtain real-time and/or historical data relating to the physiological operation of one or more patients. In some embodiments, the physiological monitoring system 520 provides the physiological information to the command center engine 502, such that the command center engine 502 can make decisions based on the physiological information. For example, the command center engine 502 may receive EMR's from the EMR system 516 and the physiological data of the same patient from the physiological monitoring system 520 and determine that the physiological data is significantly abnormal compared to the EMR's of the patient. The command center engine 502 may automatically provide a notification to the care team (e.g., the doctor, the nurse, etc.) that provides a warning related to the discovered information.

The bed management system 522 may be configured to facilitate appropriate bed management for the patients. In some embodiments, this can include assigning particular beds/rooms to patients based on their preferences (e.g., as determined by the PPMS 534). For example, a patient may prefer to be assigned to a bed with certain features (e.g., inclined back rest, additional pillows, queen-sized, etc.), which can be provided via the registration system 512. The command center engine 502 may analyze the registration preferences and assign the beds to the patients to satisfy the preferences. Of course, multiple types of preferences and/or data sets can be considered for making decisions in the physiological monitoring system 520, or any of the systems in supersystem 500.

Real time location system (RTLS) 524 may be configured to provide real-time monitoring of the one of more patients arriving at the building 10, the occupants currently within the building 10, or a combination thereof. The RTLS 524 can provide directions to users after they are within a certain distance of the building 10. For example, after crossing a geo-fence (e.g., 1 mile from the building 10, 5 miles from the building 10, etc.), an application hosted on a user's device and communicably connected to the command center engine 502 updates the user on the directions for parking at the building 10, and continues to provide directions all the way to the appropriate room in the building 10, including providing directions while within the building 10. In some embodiments, the RTLS 524 tracks users (e.g., patients, building occupants, etc.) via GPS or via radio-frequency identification (RFID) from WiFi signals, Bluetooth® signals, etc. For example, each occupant of a building may carry a device capable of RFID transmissions, such as a mobile phone, a badge or lanyard, a wristband, etc., which can be tracked by RFID transceivers positioned throughout the building. In some embodiments, the RTLS 524 utilizes facial and/or voice recognition to detect and track occupants.

Figure 7:
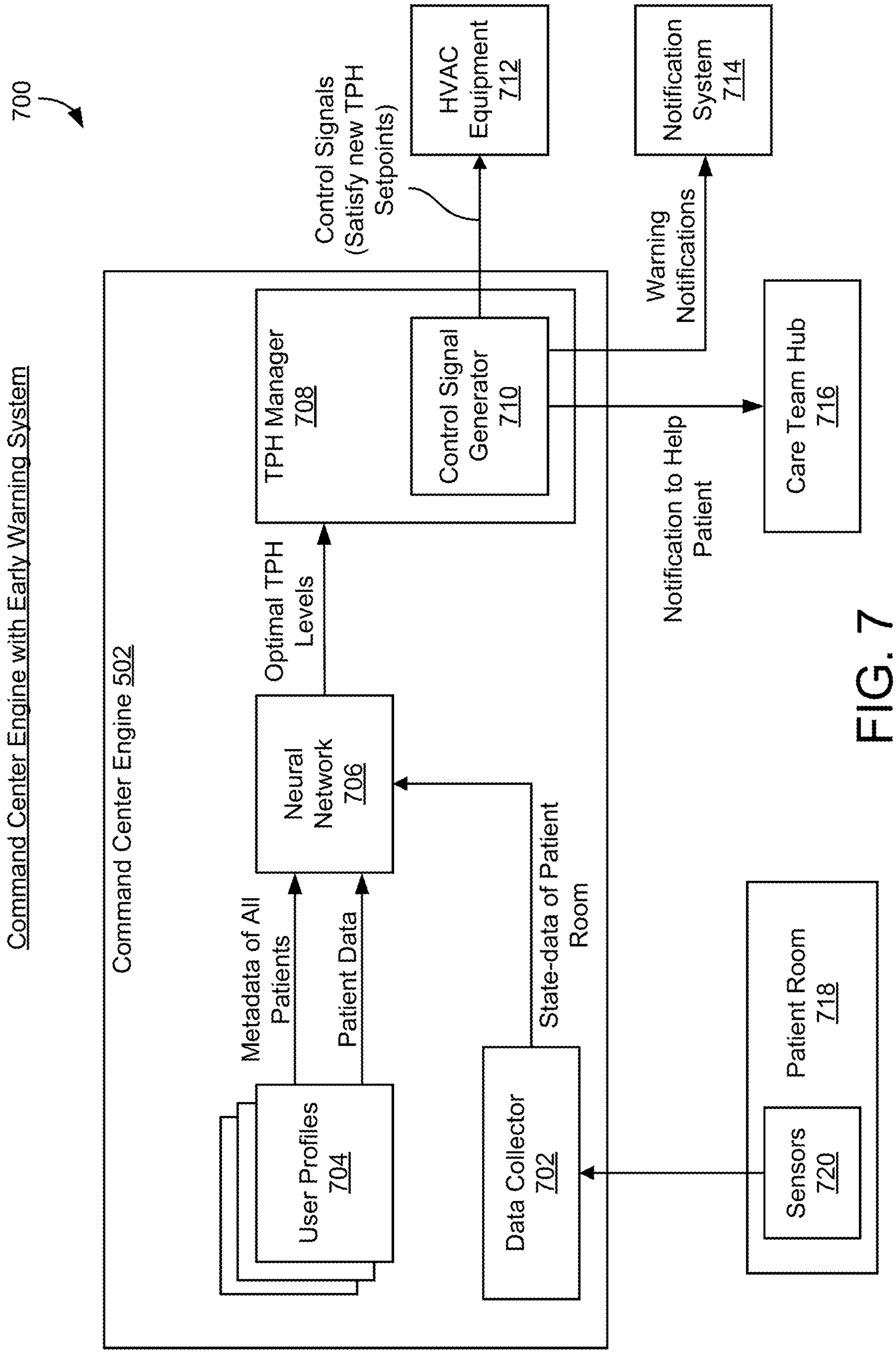
FIG. 7 is a block diagram of a command center engine with early warning system, which can be implemented in the integrated command center of FIG. 5, according to some embodiments.

The caregiver monitoring system 526 may be configured to provide updates to the care team of the patient using aggregated data within command center engine 502. For example, as described in greater detail below with reference to FIG. 7 and FIG. 12, updates can be sent to the care team (e.g., doctors, nurses, etc.) for the patient that can preemptively detect unsafe or dangerous situations, using sensor data from the patient's room, medical records from the patients file (e.g., via EMR system 516, etc.), a profile generated by the command center engine 502 with historical data relating to the physiological information and comfort information, or any combination thereof.

The transport system 528 may be configured to facilitate transport of patients from the entrance of building 10 to the required room within building 10, or between multiple rooms within building 10. For example, an ambulance may arrive with a patient and automatically provide the command center engine 502 with an indication that the patient has arrived. The command center engine 502 may then query a database (e.g., maintained by the PPMS 534, as described below) that indicates one or more preferences for the user, such as preferred temperature, pressure, and humidity levels in the room. Thus, the room may be prepared for the patient prior to the patient arriving at the room.

The EVS system 530 may be configured to facilitate the cleaning and sanitizing of rooms, hallways, tables, and other components of building 10 (e.g., a hospital). The EVS system 530 may employ global positioning satellite (GPS) tracking of the custodians and maintain a virtual cleaning log to display locations that have been cleaned and have yet to be cleaned. In some embodiments, the EVS system 530 is particularly equipped to handle sanitization after a detection of a contagious disease (e.g., COVID-19). For example, once COVID-19 has been detected in the facility, contact tracing may be determined based on cameras located within the building 10. The command center engine 502 may receive the video feeds from the cameras and the location of the potentially contagious area, determine the profiles of the potential carriers of the disease, and implement contact tracing/prevention.

The PPMS 534 is configured to determine, record, store, and/or retrieve various patient preferences. Patient preferences may include, for example, preferred temperature, pressure, and humidity levels in a room (e.g., a patient room), preferred lighting temperatures and intensities, preferred meal times, favorite movies or television shows, favorite musicians and bands, a patient's sleep schedule, etc., along with any of the other patient or user preferences described herein. In some embodiments, patient preferences are entered manually, such as by a patient or facility (e.g., hospital) staff when the patient is checking-in or registering. In some embodiments, the PPMS 534 is configured to automatically determine patient preferences by recording room and/or schedule parameters over time (e.g., temperature, pressure, and humidity levels in the patient's room) and/or by analyzing the patient's social media accounts, bank and/or credit card purchases, search history, etc. For example, the PPMS 534 may receive preference information for a patient from a remote and/or third-party (e.g., Google, Facebook, etc.). In some embodiments, the PPMS 534 may interface with EMR system 516 to determine patient preferences and/or to store patient preferences. In some embodiments, the PPMS 534 maintains patient profiles for recording patient preferences over time. For example, patient Additional features of the PPMS 534 are described in greater detail below.

The event correlation engine 536 may be configured to monitor and detect patterns in patient care. For example, the event correlation engine 536 may monitor patient temperature checks over time, to determine an interval (i.e., frequency) between temperature checks. If a period of time (e.g., a time interval) passes without a temperature check, when one was expected, the event correlation engine 536 may transmit a notification to a care provider or other user to initiate a temperature check. In some embodiments, the event correlation engine 536 can identify correlations between building events (e.g., BMS 400 events) and clinical events. For example, the event correlation engine 536 may identify a correlation between the TPH of a patient room and patient recovery times or patient comfort.

Command Center Engine

Figure 6:
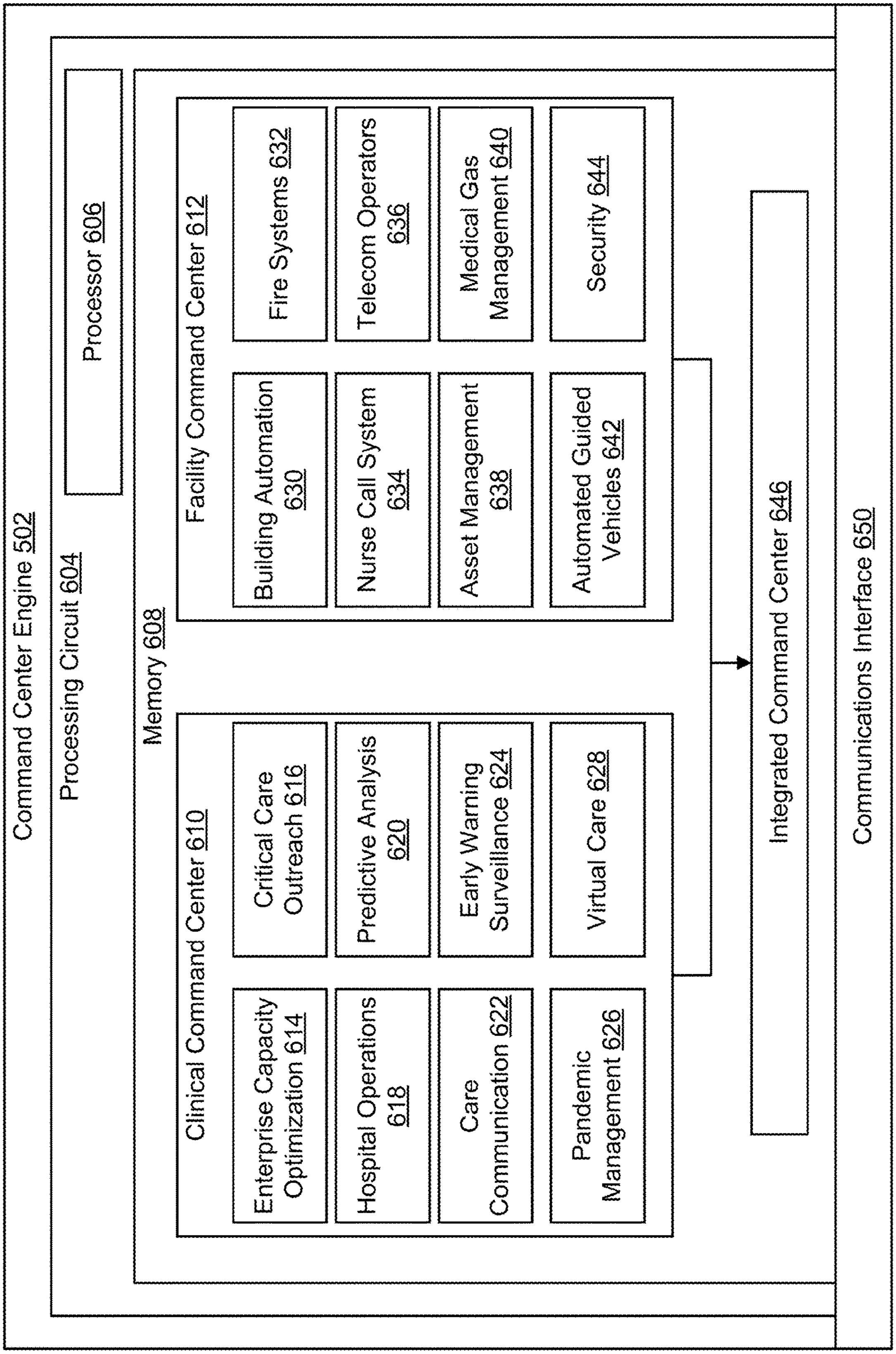
FIG. 6 is a block diagram of a command center engine, which can be implemented in the integrated command center of FIG. 5, according to some embodiment.

Referring now to FIG. 6, a detailed block diagram of the command center engine 502 is shown, according to some embodiments. The command center engine 502 is shown to include a processing circuit 604 including a processor 606 and a memory 608 and a communications interface 650. The processing circuit 604 can be communicably connected to the communications interface 650 such that the processing circuit 604 and the various components thereof can send and receive data via the communications interface 650. The processor 606 can be implemented as a general purpose processor, an application-specific integrated circuit (ASIC), one or more field-programmable gate arrays (FPGAs), a group of processing components, or other suitable electronic processing components.

The memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 608 can be or include volatile memory or non-volatile memory. The memory 608 can include database components, object code components, script components, or any other type of information structure for supporting the various activities and information structures described in the present application. According to an exemplary embodiment, the memory 608 is communicably connected to the processor 606 via the processing circuit 604 and includes computer code for executing (e.g., by the processing circuit 604 and/or the processor 606) one or more processes described herein. In some embodiments, the command center engine 502 is implemented within a single computer (e.g., one server, one housing, etc.). In various other embodiments the command center engine 502 can be distributed across multiple servers or computers (e.g., that can exist in distributed locations).

The communications interface 650 can facilitate communications between the command center engine 502 and other systems within supersystem 500 (e.g., the scheduling system 514, the bed management system 522, etc.) for allowing user control, monitoring, and adjustment to the command center engine 502 and/or the one or more systems in the supersystem 500. The communications interface 650 can be or include wired or wireless communications interfaces (e.g., jacks, antennas, transmitters, receivers, transceivers, wire terminals, etc.) for conducting data communications within the supersystem 500 or other external systems or devices. In various embodiments, communications via the communications interface 650 can be direct (e.g., local wired or wireless communications) or via a communications network (e.g., a WAN, the Internet, a cellular network, etc.). For example, the communications interface 650 can include an Ethernet card and port for sending and receiving data via an Ethernet-based communications link or network. In another example, the communications interface 650 can include a Wi-Fi transceiver for communicating via a wireless communications network.

Memory 608 is shown to include clinical command center 610, including enterprise capacity optimization 614, critical care outreach 616, hospital operations 618, predictive analysis 620, care communication 622, early warning surveillance 624, pandemic management 626, and virtual care 628. The memory 608 is also shown to include facility command center 612, including building automation 630, fire systems 632, nurse call system 634, telecom operators 636, asset management 638, medical gas management 640, automated guided vehicles 642, and security 644. The memory 608 is shown to further include integrated command center 646.

Command Center Engine Processes

Early Warning System

Referring now to FIG. 6, a system 700 of command center engine 502 with early warning system functionality is shown, according to some embodiments. System 700 is shown to include the command center engine 502, HVAC equipment 712, a notification system 714, a care team hub 716, and a patient room 718. In some embodiments, system 700 is configured to provide early warnings to the care team hub 716 or directly to occupants within building 10 (e.g., via the notification system 714, etc.). This may be performed using data collected from sensors within the patient room 718. The early warning system and methods described with reference to FIG. 7 may be or be included in one or more of the systems of the supersystem 500, such as the BMS 400.

In some embodiments, the sensors 720 may obtain information related to any type of manipulated or control variable within system 700. For example, the sensors 720 obtain measurements on the temperature, pressure, humidity, light intensity, blinds position, sound level, motion, or a combination thereof, and provides the sensor data to the data collector 702 in the command center engine 502. The data collector 702 may be configured to provide the sate-data of the patient room to the neural network 706.

The neural network 706 may be configured to make predictions regarding certain situations that may warrant the distribution of a notification, warning, or alarm for safety reasons. Accordingly, the neural network 706 may be any suitable type of neural network, such as a perceptron, feed forward, recurrent (RNN), deep feed forward, convolutional, residual, support vector machine (SVM), etc. In some embodiments, however, the neural network 706 may be replaced with other model or algorithm-based prediction methods (e.g., clustering, forecast, time series, etc.). While not shown, the neural network 706 may be trained using historical data. For example, the neural network may use data regarding the patient room 718, data regarding the patients that have previously been in the patient room 718, and/or metadata regarding all patients and patient rooms, to generate a model of "safe" conditions. As shown, the neural network 706 may be configured to output optimal TPH settings or levels for an area (e.g., a patient room) based on patient metadata.

For example, a 20 year old male is put in the patient room 718 for a back injury. The neural network 706 uses training data including several months of different patients that have been placed in the patient room 718, historical data on 20 year old males, and patients with back injuries over a historical time period. In some embodiments, the neural network 706 attempts to satisfy an objective function, wherein the goal of the objective function is to provide the appropriate sensor value (e.g., temperature) based on the number of factors. In the above example, the historical data indicating the temperature preference of 20 year old males may be weighted differently than the temperature preference of a patient with back injuries, which may be weighted differently that patients located in the patient room 718. This can result in a multi-weighted objective function, which can also include one or more constraints. In some embodiments, the constraints are provided to make sure that the manipulated variable conforms to general rules and regulations. For example, if the objective function indicated that the temperature should be 100° F., a constraint may forbid a control signal attempting to reach a 100° F. setpoint in the patient room 718, the constraint not allowing temperature setpoints above 75° F.

In some embodiments, the neural network 706 is shown to receive metadata of all patients, including the data of the patient located in the patient room 718. This data could include previously preferred manipulated variables (e.g., temperature, pressure, humidity, light intensity, sound level, etc.), setpoints from the patient, medical data related to the patient, of the data for any and all patients that have logged data with the command center engine 502. For example, the neural network 706 may receive data from one or more sensors or devices monitoring the vitals and other physiological parameters of the patient. The neural network 706 may be configured to adjust TPH values in the room based on the patient's vitals (e.g., cooling the room to lower the patient's core temperature).

In some embodiments, the neural network 706 also receives patient data indicating classification or diagnostic codes for the patient. These codes can include International Statistical Classification of Diseases and Related Health Problems (ICD) codes, Diagnosis-Related Group (DRG) codes, Current Procedural Terminology (CPT) codes, and/or any other similar type of classification or diagnostic code format that may be implemented by a healthcare facility. In some such embodiments, the neural network 706 includes these types of codes (e.g., as an input) when determining TPH values or other parameters for the patient's room. For example, a patient experiencing COVID-19 symptoms can be assigned IDC code "U07.1, 2019-nCOV acute respiratory disease" and, in response, the TPH or other parameters of the patient's room may be adjusted to not only improve patient care, but to help prevent or slow the spread of COVID-19 to other patients and/or areas within the building. In this example, the patient's room may be isolated from other areas of a hospital, such as by adjusting HVAC equipment and/or by changing TPH values of the room. In another example, a sleep protocol may be initiated in response to particular classification or diagnostic codes and may cause the lights in the patient's room to dim, the blinds to close, the temperature to lower, etc.

In some embodiments, any of the data discussed above may also be used to train the neural network 706. After training, the neural network 706 may then be used to satisfy an objective function. Once the neural network 706 implemented and a predicted manipulated variable value is determined by the neural network 706, the TPH manager 708 may generate control signals via the control signal generator 710 to satisfy the predicted manipulated variable value. In some embodiments, this includes setting the manipulated variable value as a setpoint and providing control signals to the HVAC equipment 712 to satisfy the setpoint.

As mentioned above, the command center engine 502 may be configured to provide early warning detection based on received data. As such, the trained neural network 706 may be able to determine if the manipulated variable(s) are abnormal such that they indicate an unsafe environment in the patient room 718. In such embodiments, the control signal generator 710 may provide notifications to the care team hub to help the patient. While not shown, the control signal generator 710 may also provide a control signals to the HVAC equipment to adjust the manipulated variable to a safe level. In some embodiments, early warning detection is based in part of the number, type, and/or frequency of patient temperature change requests (e.g., from an application for adjusting parameters of the patient room).

In some embodiments, the control signal generator 710 can provide warning notifications to the notification system 714. The notification system 714 may be a system communicably connected to workstations within building 10, one or more user devices of the occupants within building 10 (e.g., or will eventually be within building 10), or any combination thereof. For example, the control signal generator 710 provides a warning indicated that the temperature within the patient room 718 is too high for the patient, who is particularly sensitive to high temperatures. A building manager receives the notification and supervises the adjustment of the temperature setpoint down to a safe level.

In some embodiments, command center engine 502 may know the room TPH values and how most people should feel within the room (e.g., based on neural network functionality described above, etc.). For example, if a patient requests a temperature change in the room, command center engine 502 may then use demographic information (e.g., height, weight, gender, medical history, etc.) to determine if the care team needs to be alerted, or if it is merely a preferential temperature change.

Command center engine 502 may be configured to integrate any and all systems within supersystem 500. In some embodiments, supersystem 500 is configured to improve noise levels for patients in their rooms, improve energy efficiency within BMS 400, improve sleep quality for patients, reduce infection risk, increase care team response times (e.g., notifying the closest nurse and not necessarily the assigned nurse, etc.), and increase security response time.

Service Rerouting

The integration provided by the command center engine 502 allows the system to provide improved service and facility efficiency. In some embodiments, if a service (e.g., an MRI machine, a vaccination, etc.) is backed up or is experiencing longer than usual wait times at one location (e.g. building 10, etc.), command center engine 502 can provide a notification to the user and provide an option to receive service at an alternative location in network, such as at a hospital at another location. The recommendation of an alternate location can include a prompt to accept or reject the recommended alternate location. In some embodiments, the command center engine 502 utilizes an algorithm based on travel times from a user's current location to the available buildings and the wait times at the available buildings and recommends the shortest total time to service. For example, a 90 minute wait may exist at the scheduled location, but a location 3 miles away may have immediate availability. The selection of an alternate location can reduce the time it takes the user to receive service and also improves the efficiency of each building. For example, a building with long wait times may experience a crowded waiting room and irritated patients.

In some embodiments, the command center engine 502 also considers a type of care required for the patient. In some such embodiments, the type of care required for the patient can be determined based on classification or diagnostic codes, such as the ICD, DRG, and/or CPT codes discussed above. For example, the command center engine 502 may identify only those alternate locations that are capable of treating a patient associated with specific classification or diagnostic codes. In some embodiments, a determination that a location is suitable for treating a patient is made based on the equipment, staffing, and/or capabilities of the location. For example, a location without an MRI machine may not be suitable to treat a patient that is classified as having a head injury. As another example, a location that does not staff pediatric physicians may be less suitable for a patient under 10 years old than a location that does staff pediatric physicians.

In some embodiments, the command center engine 502 is configured to rank and/or score facilities based on the patient's required type of care (e.g., based on ICD, DRG, and/or CPT codes). In some such embodiments, the command center engine 502 may calculate and assign a rating (e.g., on a scale from zero to five, based on a number of stars, as a percentage, etc.) for each identified alternate location, which could be presented to a patient when recommending alternate locations. For example, a patient may be presented with an interface that lists a plurality of potential alternate locations, a wait time and/or distance for each alternate location, and a star-rating for each location. Accordingly, in this example, the patient can weigh whether a longer wait time at a first, five-star rated location would be preferable over a shorter wait time at a second, four-star rated location.

The ability to recommend alternate locations has the effect of spreading the patient load between facilities and reducing the number of individuals positioned in waiting rooms. The reduction of individuals in waiting rooms provides a number of benefits including the reduced likelihood of transmission of illness. The command center engine 502 can coordinate scheduling changes and navigation changes when a user selects or accepts an alternate location. Coordination of scheduling includes reserving appointment slots, adjusting doctor or caregiver schedules, coordinating room allocation and parameter control, etc. Alternatively, the command center engine 502 can maintain the currently selected location if the user rejects the recommendation (e.g., the user may wish to go to a building with a longer wait time if the building is also convenient for other reasons such as visiting a friend or running errands nearby).

Integrated Parking Control

Figure 8:
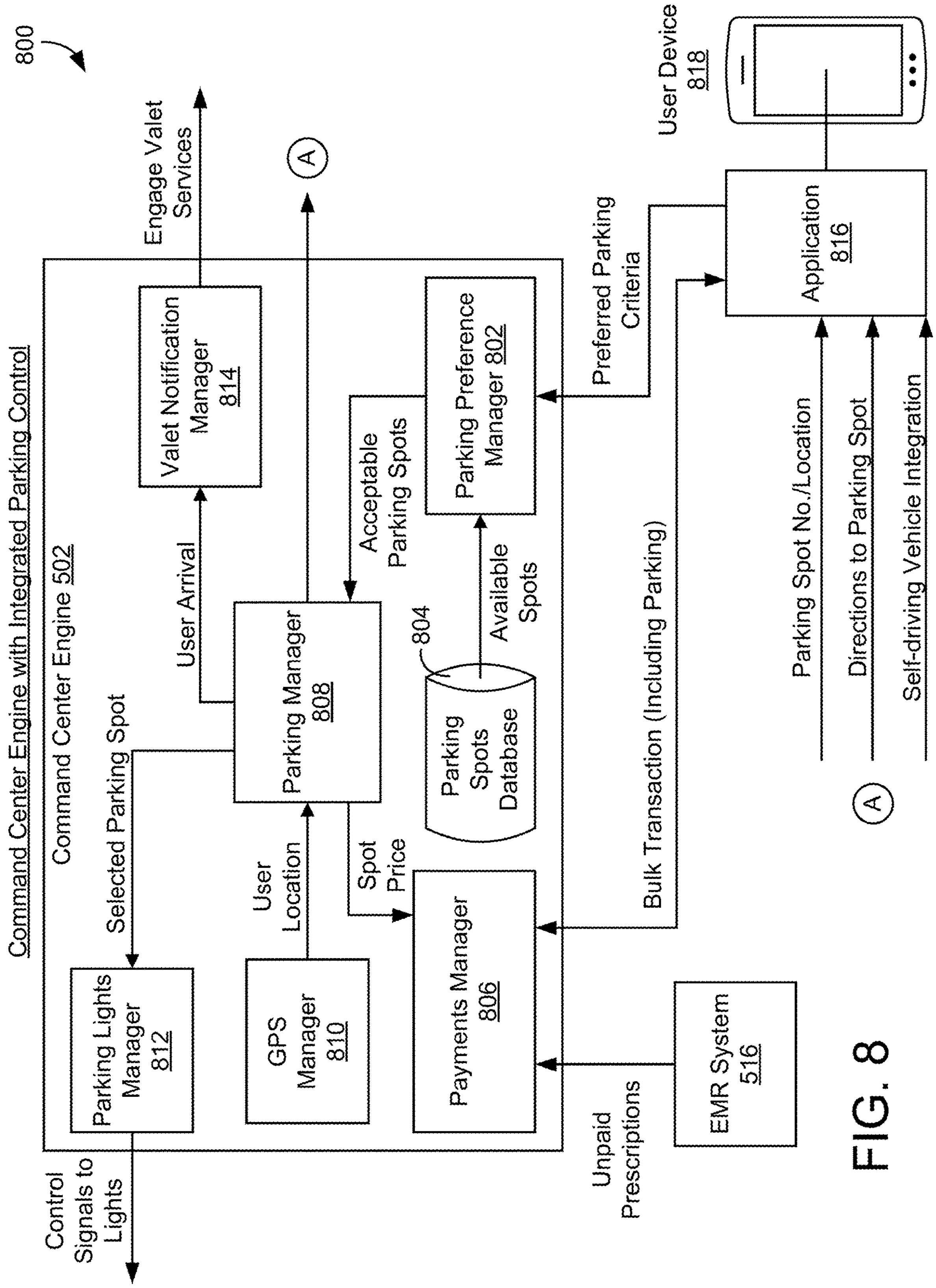
FIG. 8 is a block diagram of a command center with integrated parking control, which can be implemented in the integrated command center of FIG. 5, according to some embodiments.

Referring now to FIG. 8, a system 800 showing a command center engine with integrated parking control is shown, according to some embodiments. System 800 may be configured to facilitate parking for a building occupant of the building 10 leaving the building 10, or an occupant arriving at the building 10. The command center engine 502 can include functionality that receives the occupant's location and other data (e.g., prescription data from the EMR system 516, etc.) and creates a more streamlined and efficient parking situation for the occupant. The command center engine 502 is shown to include a parking preference manager 802, a parking spots database 804, a payments manager 806, a parking manager 808, a GPS manager 810, a parking lights manager 812, and a valet notification manager 814.

In some embodiments, an occupant arrives at a parking structure of the building 10. Either prior to arriving or after arriving at the parking structure, the user, using a user device 818, provides preferred parking criteria, such as proximity to the entrance of the building 10, handicapped parking, requested valet services. The parking preference manager 802 receives this information and available parking information from parking spots database 804 and provides one or more available parking spots to parking manager 808 that satisfy the user's preferences. If there are no spots that satisfy the user's preferences that are available, the parking preference manager 802 may provide acceptable parking spots to the parking manager based on another criteria (e.g., closest to the building 10, etc.).

The parking manager 808 may be configured to receive the user location from GPS manager 810 and the acceptable parking spots from the parking preference manager 802 and determine a selected parking spot for the user. The parking manager 808 may also be able to determine when the user is close to arriving or has arrived at the parking spot. In some embodiments, the parking manager 808 determines that the user is close to, or at, a parking structure based on GPS data from the user's device or vehicle, or based on a license plate recognition (LPR) system that detects the user's vehicle (e.g., using cameras positioned at an entrance to a parking structure).

In the event that the user has requested valet services, the parking manager 808 may send a notification to the valet notification manager 814 when the occupant is close (e.g., 1 mile, 1000 m, 100 m, etc.) to the parking structure, indicating that the valet services should be ready to assist. In the event that the user has not requested valet services when arriving, the parking manager 808 may send a signal to parking lights manager 812 to illuminate the parking spot for the occupant. In some embodiments, the illumination is a particular color that the user is told is for them via the application 816. In some embodiments, the GPS manager 810 provides directions directly to the appropriate spot choses by the parking manager 808 for the occupant, the directions provided on the application 816.

In some embodiments, the parking manager 808 may be configured to send information directly to the application 816, such as the chosen parking spot, the parking spot location (e.g., $2^{nd}$ floor, row A, etc.) and directions to the parking spot. In some embodiments, the occupant has indicated via the application 816 that the vehicle is a self-driving vehicle. In such embodiments, when the occupant has reached a reasonable proximity to the parking spot (e.g., entering the parking structure, getting near the building, etc.), the command center engine 502 may take partial or full control of the vehicle to guide the occupant's vehicle to the chosen parking spot. In some embodiments, the parking manager 808 interfaces with a remote and/or third-party lighting system installed in the parking structure and can utilize the lighting system to guide the user to a parking spot or to identify an available parking spot. For example, a parking structure lighting system may include one or more lights (e.g., a set of lights above each parking spot), in some cases of varying or variable colors, that can indicate whether a parking spot is available, reserved, or currently occupied. The user may receive a notification (e.g., a text message, a push notification, etc.) instructing the user to "follow the lights" through the parking structure to a reserved and/or available spot. In some embodiments, the parking manager 808 tracks the user's movement through the parking structure (e.g., via the LPR system) and activates lights along the user's path to guide the user to a parking spot. In some embodiments, the parking manager 808 is also configured to transmit a notification to the staff of a facility (e.g., hospital staff) when a user (e.g., a patient) arrives at a parking structure and/or parks their vehicle.

In some embodiments, the command center engine 502 may be aware of payments that the occupant still has to make, apart from the payment of the parking spot. For example, the occupant may need to pay for a prescription after completing an appointment. The payments manager 806 can accordingly receive information from a variety of remote and/or third-party systems, such as a pharmacy management system (not shown), and can facilitate payment to these remote and/or third-party systems at the same time as a payment for a parking spot. For example, the payments manager 806 can provide a combined transaction request to the user device 818 via the application 816 allowing the user to pay for the several transactions at once. In some embodiments, the command center engine 502 can also transmit a notification to valet staff (e.g., via valet notification manager 814) instructing the valet staff to pick up a user's prescriptions while the user is checking-out from an appointment, or when the user is ready to leave (e.g., when the user requests their vehicle from the valet). In this manner, the user may save time by receiving their prescriptions from the valet at the same time that they retrieve their vehicle, rather than making a separate trip to a pharmacy.

Distributed Care

Figure 9:
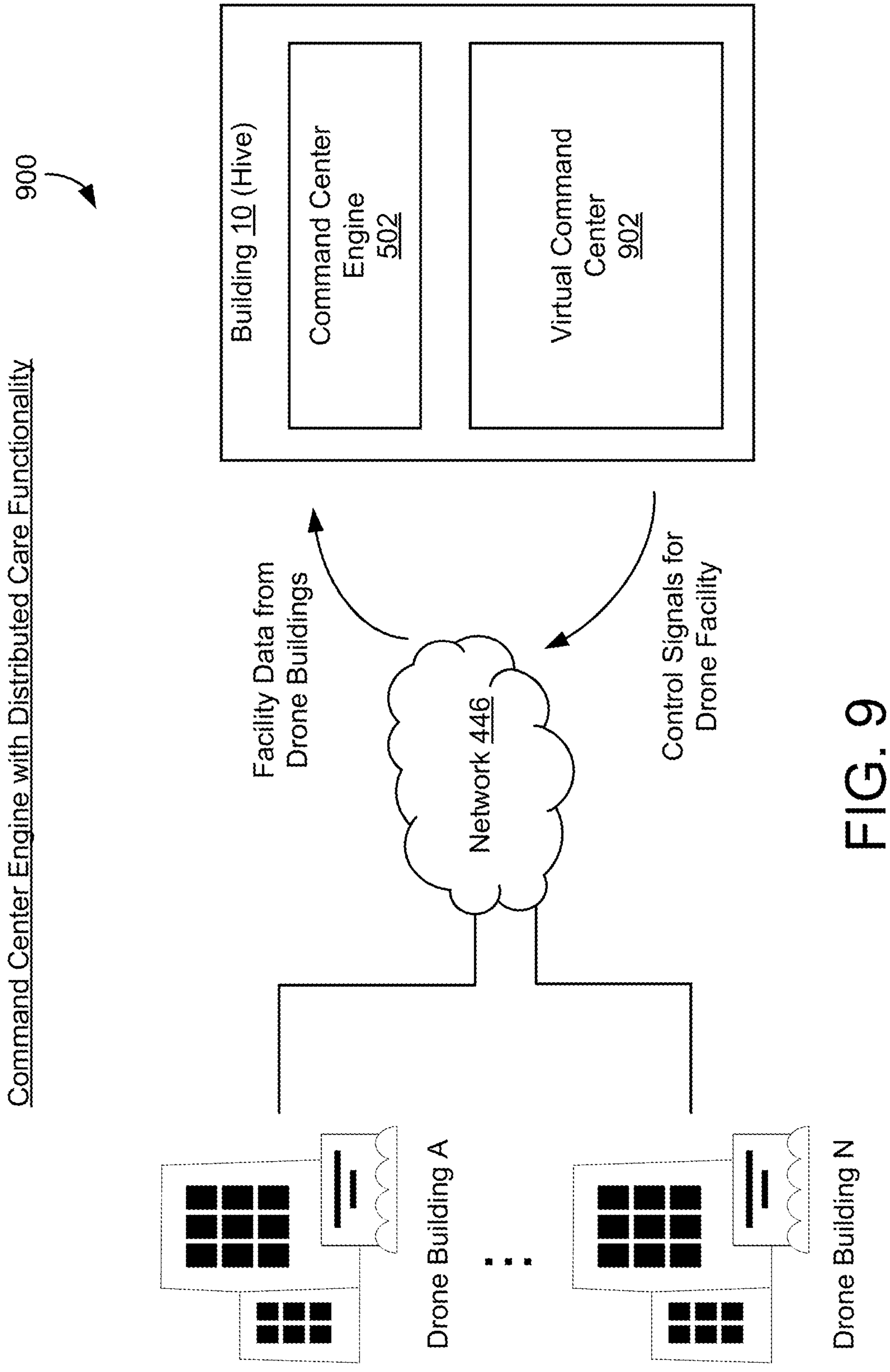
FIG. 9 is a block diagram of a command center engine with distributed care functionality, which can be implemented in the integrated command center of FIG. 5, according to some embodiments.

Referring now to FIG. 9, a system 900 with a command center engine with distributed care functionality is shown, according to some embodiments. System 900 may include some or all of the systems described herein. In some embodiments, the building 10 acts as a hive that has partial or full management control of one or more drone buildings (i.e., drone building A through drone building N). Management control of the drone buildings may include controlling their BMS systems or other systems described herein, such as those described above with reference to FIG. 5.

The building 10 is shown to include a command center engine 502 and a virtual command center 902. The virtual command center 902 may be configured to control at least a portion of one or more of the drone buildings. In some embodiments, the virtual command center 902 controls a single patient room (e.g., a surgical room), that can be better managed by the intelligence (e.g., processing circuitry, processing power, memory space, etc.) at the building 10 than the intelligence at the respective drone building. The building 10 is shown to receive data from the drone buildings via network 446. In some embodiments, this data includes real-time operation of the control zone, historical data of the control zone, system and subsystem layouts, or a combination thereof.

For example, the drone building A provides temperature, pressure, and humidity data to the building 10 for a surgical room at drone building A. The virtual command center 902 receives this data and, in response to at least one of a user preference, optimization, or regulatory conditions, the virtual command center 902 provides control signals to the HVAC equipment in the drone building A to satisfy the intended requests of the virtual command center 902.

In some embodiments, the virtual command center 902 of the building 10 can control rooms of the drone building A to provide functionality that is different from the functionality originally provided by the rooms of the drone building A. For example, general patient rooms of the drone building A may be controlled by the virtual command center 902 to provide TPH and other parameters that are conducive for use the general patient rooms for surgery, infection disease control, or another specific use room. The ability to remotely control rooms of the drone building A allows for an expanded flexibility and use of the drone building A while taking advantage of the more robust intelligence of building 10. In some embodiments, the virtual command center 902 can implement room uses for the drone building A that are outside the original design of the drone building A. For example, the virtual command center 902 may receive historical sensor information from the drone building A and recognize (e.g., using a machine learning or neural network system) how to control TPH and/or other parameters to provide an overall atmosphere that is appropriate for a desired procedure or use of the drone building A.

In some embodiments, virtual command center 902 of building 10 can control a basic care control room in drone building A to provide required assistance. For example, virtual command center 902 can provide a negative pressure to allow emergency care that the remote clinic was not designed for initially. Additionally, the virtual command center 902 can facilitate communication between doctors of the building 10 and the drone building A to improve the available resources and expertise available for procedures within the drone building A. For example, an emergency surgery in drone building A can include control of room parameters by the virtual command center 902 of the building 10 and a specialized doctor at building 10 can provide guidance to a doctor conducting the emergency surgery at the drone building A. The virtual command center 902 can facilitate the communication by analyzing schedules of doctors at the building 10 or another building and identify an appropriate expert and add the emergency schedule or other procedure to the expert's schedule and provide a communication platform for connecting the two remotely located doctors.

Sentient Patient Room

Figure 10:
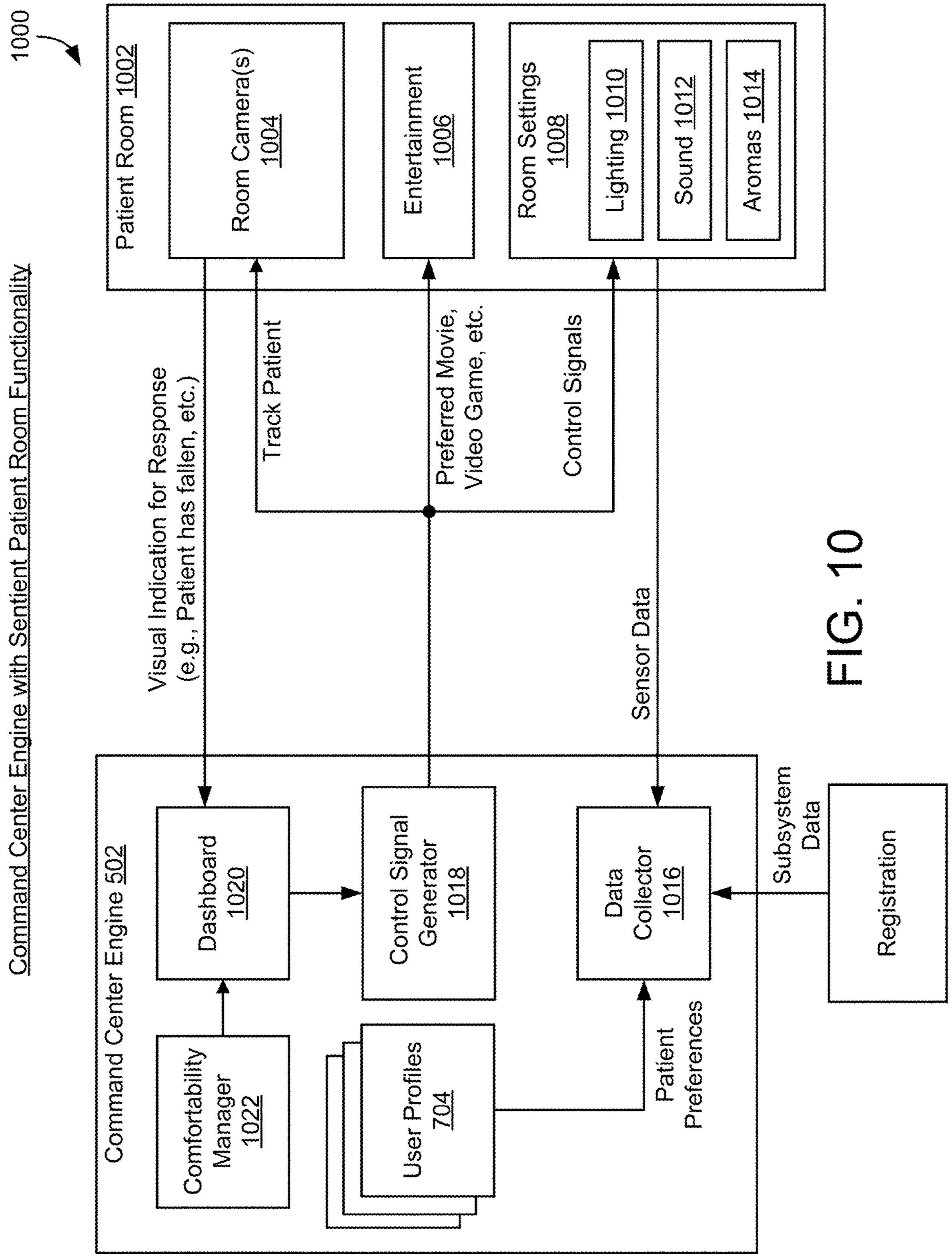
FIG. 10 is a block diagram of a command center engine with sentient patient room functionality, which can be implemented in the integrated command center of FIG. 5, according to some embodiments.

Referring now to FIG. 10, a system 1000 with a command center engine with patient room functionality is shown, according to some embodiments. System 1000 is shown to include the command center engine 502 and a patient room 1002. The command center engine 502 may be configured to control the room such that "the room" (e.g., the command center engine 502) preemptively know information about the patient prior to or during the patients arrival at the patient room 1002. The command center engine 502 is shown to include a data collector 1016, a control signal generator 1018, a dashboard 1020, a comfortability manager 1022, and the user profiles 704. The patient room 1002 is shown to include a room camera(s) 1004, an entertainment system 1006, and room settings 1008. Room camera(s) 1004 may be configured to provide a video stream to the dashboard 1020, such that one or more members of the patient's care team may view the video feed to determine how the patient is acting and if the patient requires help.

In some embodiments, the patient room 1002 provides sensor data for one or more manipulated variables to the data collector 1016. The data collector 1016 may also receive patient preferences from the user profiles 704. The data collector may then send this information to the control signal generator, so that the control signal generator 1018 can provide comfort to the patient without having the patient request the adjustments to the manipulated variable. In some embodiments, this information is combined with the processed digital video feed to determine when the patient has arrived in the patient room 1002. In some embodiments (not shown), the command center engine 502 can perform facial recognition to determine which person (i.e., the patient) has arrived in the patient room 1002, and provide comfortability adjustments for the patient. In other embodiments, the command center engine 502 can determine that a person has arrived in the patient room 1002 based on RTLS data (e.g., from an RTLS enabled badge or wristband carried by a patient, physician, etc.). Other reasons for adjusting the manipulated variables can be considered too, just as the command center engine 502 determining that the patient has re-entered the room, and sending a voice command to the patient, such as "Welcome back, [Name]. We've adjusted the room to your liking. Please feel free to change any settings via the application."

The system 1000 is structured to recognize using the sensor arrays and the video feeds the patient's needs without input. The system 1000 is also integrated with the scheduling system so that procedures and appointments are recognized by the system 1000 and integrated into the care provided by the sentient patient room. For example, the system 1000 may utilize historical demographic information to predict a base profile policy for the patient (e.g., the average individual matching the age, gender, nationality, etc. of the patient defines a base profile of preferences), receives inputs and preferences from the patient before a stay in the sentient patient room (e.g., favorite sports team, favorite color, pictures from a past vacation, favorite authors, normal sleep temperature, favorite scents, etc.) that allow the system 1000 to update the base profile policy to provide a customized profile policy in view of patient inputs, and continue to update the customized profile policy using machine learning or artificial intelligence (e.g. neural networks, reinforcement learning, etc.) to improve a response of the sentient patient room by the system 1000 to the patients activities and actions. For example, the system 1000 may receive feedback from the patient about actions implemented by the system 1000 (e.g., thumbs up or thumbs down in response to an implemented change).

The system 1000 receives input form the scheduling system to understand why the patient is residing in the sentient patient room (e.g., a surgery and recovery are scheduled, etc.), and automatically responds to scheduled activities and patient actions to provide care. For example, the system 1000 coordinates cleaning and sanitization activities to align with times the patient will be out of the room, adjusts temperatures before a patient arrives to the room and after a patient leaves, changes meal timing based on schedules and patient reactions (e.g., if a patient is sleeping soundly, no meals are provided to wake them), adjust lighting in the room (e.g., provide dim light upon return form a stressful appointment), provide inspiration after a difficult appointment (e.g., quotes, movies, music, smells, sounds, etc.), present movies or music based on activities of the patient (e.g., recognizing boredom via the patient switching rapidly between activities), welcoming the patient back to the room after an appointment (e.g., "Welcome back Joe, you did great!"), provides a reel of pictures provided by the patient or associates of the patient (e.g., family members can provide a stream of photos or videos to provide encouragement to the patient), and recognizes that additional individuals (e.g., family or friends) are in the sentient patient room and adjusts operation to better accommodate the group. The system 1000 can utilize big data (e.g., purchase history, ad info, etc.) to improve the base profile policy and more accurately predict how the patient will prefer the sentient patient room to react to various actions. Other actions and functionality of the sentient patient room can be provided by the system 1000 within the scope of this concept. The use of an artificial intelligence engine can be used to predict and respond to patient actions and activities to improve patient care.

In some embodiments, system 1000 is configured to improve the patients and clinicians surroundings, including lighting conditions, air temperature, privacy and noise. In some embodiments, this can make the difference for a successful intervention of the care team. System 1000 may be configured to decrease response delays, decrease distractions from focusing on patient care, decrease HVAC system lagging, improve readiness of access to patient information, and decrease potential negative patient outcomes.

In some embodiments, system 1000 is speeds staff response (e.g., in an emergency situation when every second could influence patient survival, etc.). Care team staff may receive immediate notifications with patient status, as well as room number to help with wayfinding. Automated controls can shift room features to the optimal setting, and the healthcare team can be free to focus immediately and fully on assessing, resuscitating, and otherwise stabilizing the patient. System 1000 may include providing care team notifications with room number and staff arrival status, patient event dashboard(s) including meals, medications, and/or allergies, automated HVAC zone temperature change, and/or, automated controls for lighting, TV, shades room settings, and any combination thereof.

Smart Room Integration

Figure 11:
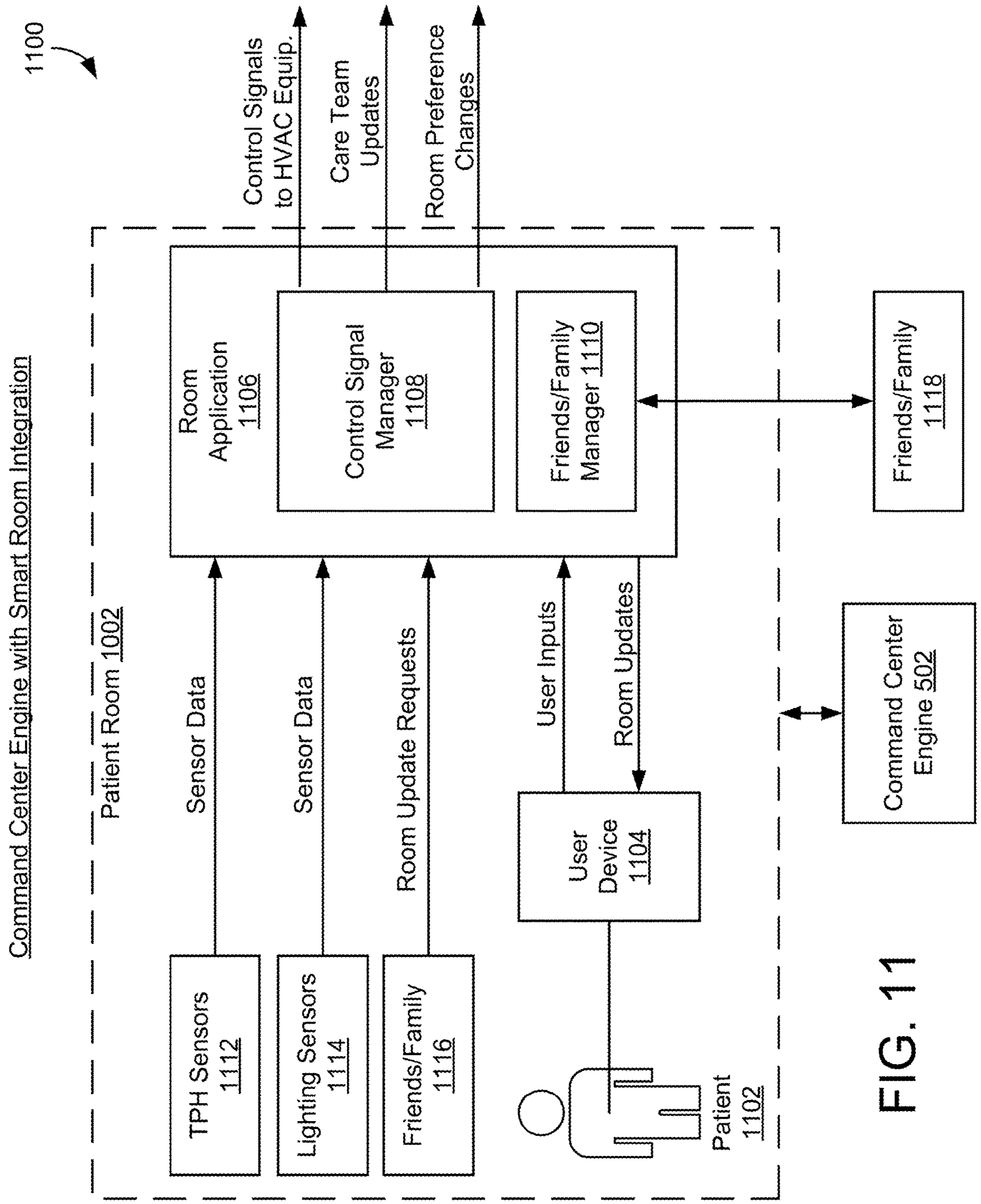
FIG. 11 is a block diagram of a command center engine with smart room integration, which can be implemented in the integrated command center of FIG. 5, according to some embodiments.

Referring now to FIG. 11, a system 1100 with a command center engine with smart room integration is shown, according to some embodiments. System 1100 is shown to include patient room 1002 that can integrate with the patient room 1002 with application requests from one or more occupants (e.g., a patient 1102, friends/family 1118, etc.) and other systems within building 10. In some embodiments, system 1100 can be incorporated partially or entirely within system 1000, or vice versa.

The patient room 1002 is shown to include the patient 1102, a user device 1104, a room application 1106, TPH sensors 1112, lighting sensors 1116, friends/family 1118, the command center engine 502, and friends/family 1118. The friends/family 1118 located within the patient room 1002 provide updates or requests to the application 1106, along with the patient 1102. In some embodiments, there is hierarchy of which requests can be considered for implementing.

TPH sensors 1112 may be configured to monitor environmental conditions within room 10002. Lighting sensors 1114 may be configured to monitor the amount of light within patient room 1002 (e.g., lumens, etc.). Friends/family 1118 may be the friends and/or family of the patient that has entered patient room 1002. User device 1104 may be any device capable of accessing any one of the systems within supersystem 500 via the Internet, an application, or any combination thereof, such as a smartphone or tablet. Room application 1106 may be hosted on premise (e.g., within a server in building 10, etc.) or off-premise (e.g., stored on a server at a datacenter, etc.), and may be hosted as an application on user device 1104.

For example, if the patient 1102 requests a temperature decrease, while a friend of friends and family 116 requests a temperature increase, the room application 1106 (e.g., via a control signal manager 1108, etc.) may implement a control signal to satisfy the request of the patient 1102. In some embodiments, one or more requests to adjust manipulated variables from any of the occupants in the patient room 1002 can be implemented simultaneously. In some embodiments, friends and family 1118 are located outside of the patient room 1002, and can similarly make requests. In the above example relating to hierarchy, requests from the friends and family 1118 may be lower in hierarchy than the occupants within the patient room 1002.

Control signal manager 1108 may be configured to provide control signals to HVAC equipment, provide care team updates to the care team of the patient 1102, and provide room preference changes to one or more building occupants (e.g., hospital administrator, etc.).

Patient Recognition

Figure 12:
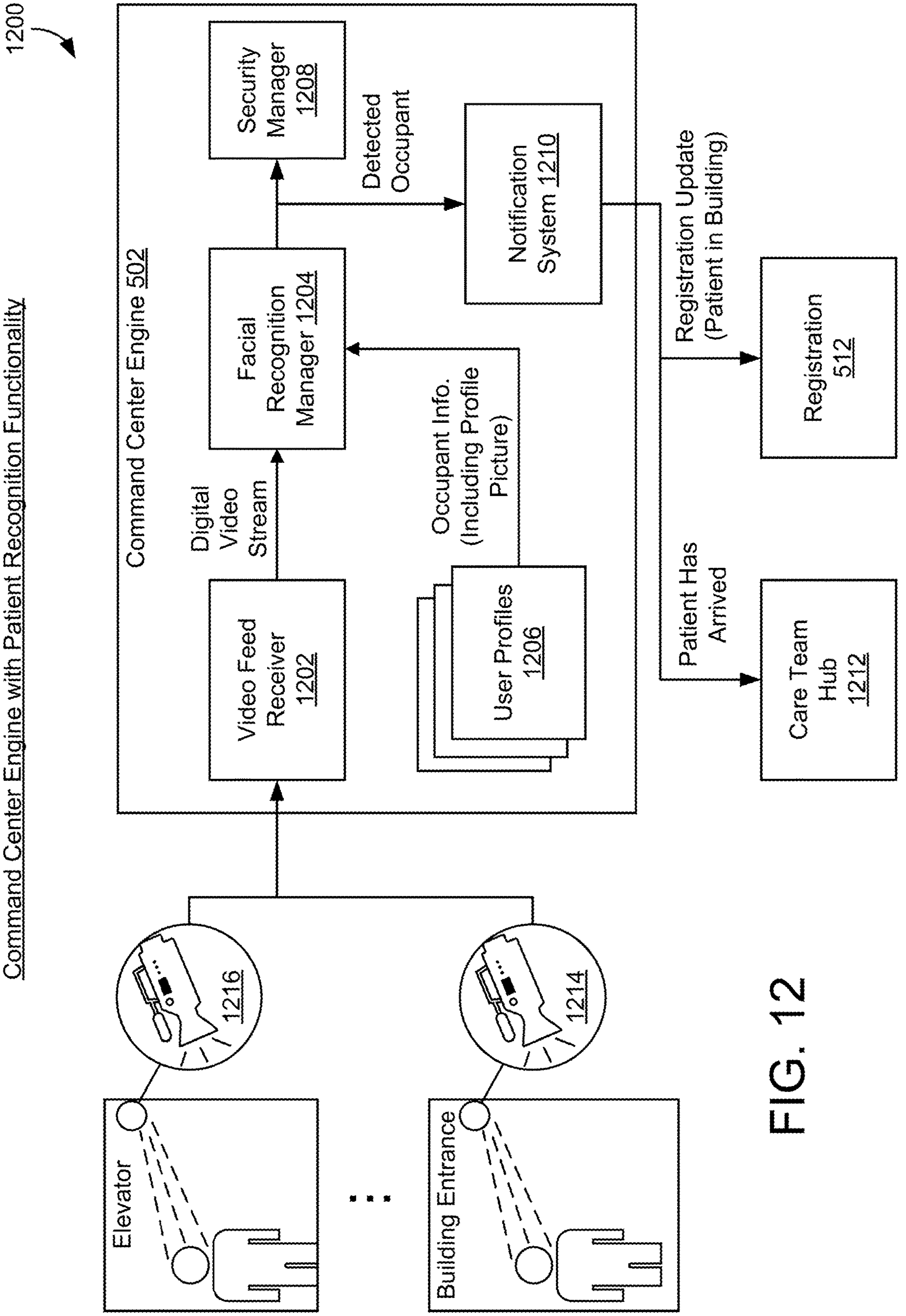
FIG. 12 is a block diagram of a command center engine with patient recognition functionality, which can be implemented in the integrated command center of FIG. 5, according to some embodiments.

Referring now to FIG. 12, a system 1200 with a command center engine with patient recognition functionality is shown, according to some embodiments. System 1200 is shown to include video cameras 1214, 1216, the command center engine 502 including a video feed receiver 1202, facial recognition manager 1204, user profiles 1206, a security manager 1208, and a notification system 1210. The system 1200 is also shown to include the care team hub 716 and the registration system 512.

In some embodiments, system 1200 is configured to receive occupant data (e.g., facial recognition data from one or more occupants that enter building 10, etc.), process the facial recognition data, determine the detected occupant, and provide control actions based on the detected occupant. Video feed receiver 1202 may be configured to receive video feed (e.g., live video feed, etc.) and process the data such that it can be readable for facial recognition manager 1204. Facial recognition manager 1204 may be configured to determine the occupant detected from the live video feed based on stored user information (e.g., user profiles, etc.) from user profiles 1206.

Facial recognition manager 1204 may be configured to provide the detected occupant to security manager 1208 and notification system 1210. In some embodiments, security manager 1208 to determine if the incoming occupant is known, is a threat, requires security concern, or a combination thereof. Notification system 1210 may be configured to determine one or more registration updates (e.g., patient profiles in the building, etc.) and provide that information to registration system 512. In some embodiments, notification system 1210 may also be configured to provide patient updates to care team hub 716, in the event that the occupant is the patient and the care team can be updated about the incoming patient. While not shown in FIG. 12, system 1200 may also facilitate notification updates being provided to the occupant, such as providing instructions to the required room, etc.

Intelligent Code Blue System

Code Blue Method

Figure 13:
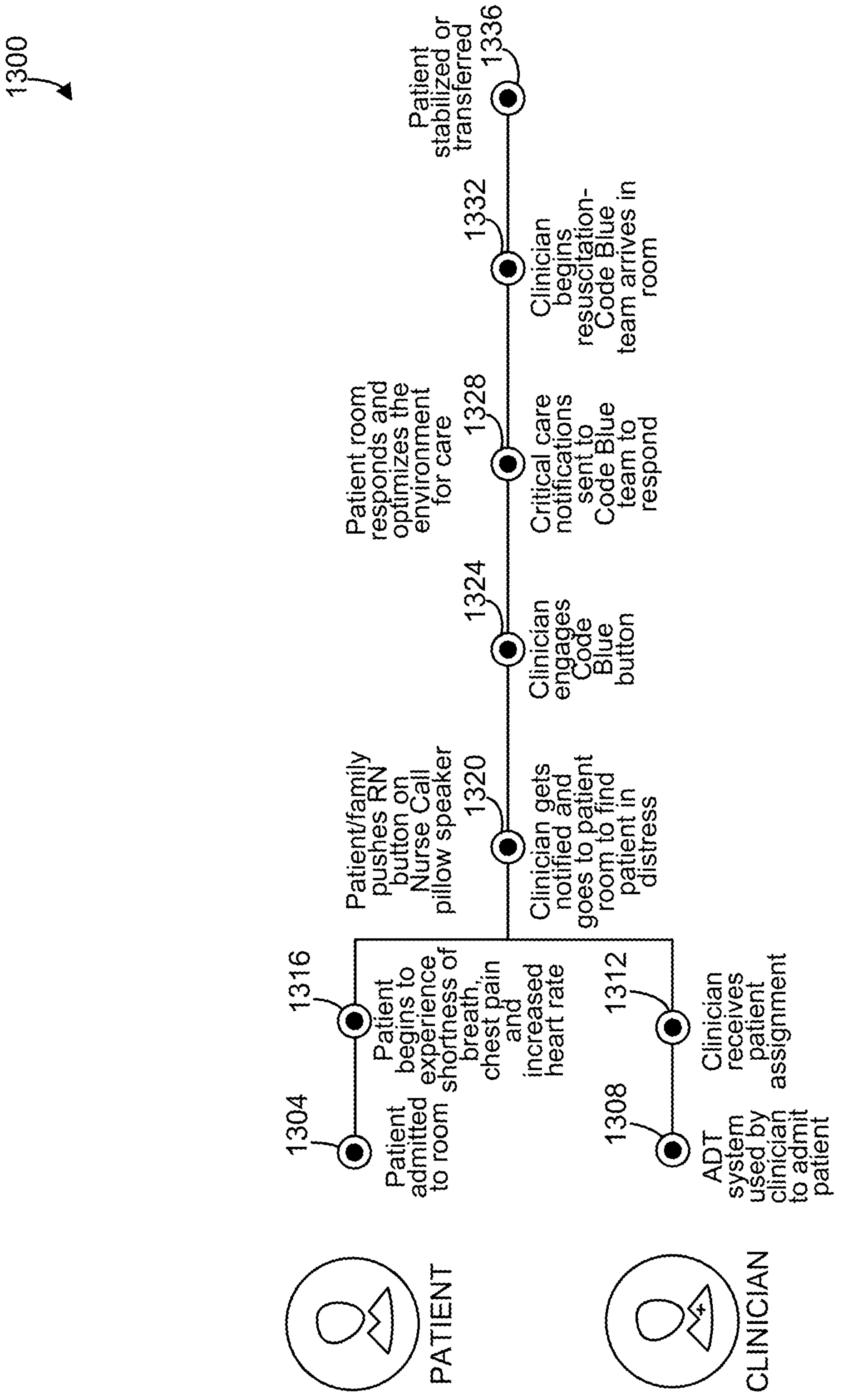
FIG. 13 is a diagram for implementing proper response to a patient during an emergency, which can be implemented by the engine of FIG. 5, according to some embodiments.

As shown in FIG. 13, an intelligent code blue method 1300 for implementing a response to a patient during an emergency is shown, according to some embodiments. The method 1300 provides coordination between the patient and the clinician via the command center engine 502 to enact efficient and effective medical response to a patient emergency. In some embodiments, the command center engine 502 may be replaced by a local controller, or an intelligent code blue system architecture 1400 as discussed below. In some embodiments, the intelligent code blue system architecture 1400 is included in the command center engine 502.

In some embodiments, the emergency includes a code blue event. Code blue is the most universally recognized emergency code within a hospital setting and indicates that there is a medical emergency occurring within the hospital. Healthcare providers can choose to activate a code blue event, typically by pushing an emergency alert button or dialing a specific phone number, if they feel the life of the person they are treating is in immediate danger. Many hospitals have a code blue team who will respond to the code blue event as quickly as possible (e.g., within minutes). The code blue team may include doctors, nurses, a respiratory therapist, and a pharmacist. Some common reasons for activating a code blue event can include cardiac arrest, respiratory arrest, severe confusion, not alert or lack of consciousness, or shows signs of stroke, and/or sudden and severe drop in blood pressure. With any code blue medical event, patient safety rises above all else. For the critical responses these situations demand, every second counts. Precision, focus, and efficiency matter and so does the room environment where these lifesaving measures unfold. Optimizing the patient's and clinicians' surroundings including lighting conditions, air temperature, privacy and noise can tip the scales for a successful intervention. Controlling a code blue environment builds a foundation for the best possible outcomes. Current systems suffer from response delays, including finding and adjusting features in the patient's room, distractions from focusing on patient care, HVAC system lag in changing zone temperature, lack of ready access to patient information, and other room specific issues that can lead to less desirable patient outcomes.

The intelligent code blue method 1300 speeds staff response when every second is key to patient survival. Care team staff receive immediate notifications with patient status, as well as room number to help with wayfinding. Automated controls shift room features and/or parameters to more optimized settings, keeping the healthcare team free to focus on immediately and fully assessing, resuscitating, and otherwise stabilizing the patient. Features of the intelligent code blue method 1300 include one-button code blue launch, care team notifications with room number and staff arrival status, patient event dashboard including meals, medications, allergies, automated HVAC zone temperature change, automated controls for lighting, TV, shades and room settings, and seamless integration with building systems and technology. The systems described above provide the infrastructure to enable the use of the intelligent code blue method 1300, and the benefits of the intelligent code blue method 1300 include greater operational efficiency, improved critical response team productivity, greater patient satisfaction with higher net promotor scores, improved HCAHPS scores, and enhanced hospital image. The critical response team can focus immediately on the patient, rather than the room environment, saving time when every second may affect patient outcomes. Advanced messaging, alarms and notification lookups quickly notify critical response team members for participation in person or by video. Room devices can be monitored and controlled without human intervention. Intelligent Code Blue automates the change to optimal room conditions, supporting the potential for positive outcomes. Fully digital, app-based controls adjust the patient room technologies automatically. Digital tools minimize physical touches by staff and patients, while increasing flexibility with options such as broadcasting a collaboration video to the room's TV. Optimizing Code Blue response increases staff satisfaction and promotes more effective collaboration among in-person and video participants. As patient care improves, patient and staff satisfaction increases and the hospital's positive reputation grows.

At step 1304, the patient is admitted to a room and the details of the patient and required medical assistance is entered into the command center engine 502 so that scheduling and coordination as discussed above can be integrated. In some embodiments, the patient is checked into a smart room or a sentient patient room. In some embodiments, the patient's preferences, historical information, and/or demographic information are loaded into the command center engine 502, and more specifically into PPMS 534, as described above.

At step 1308, a clinician, other hospital worker, or any of the automated check in systems discussed herein admit the patient into an admission, discharge, and transfer (ADT) system of the hospital. In some embodiments, the ADT is built into the command center engine 502 and the patient is automatically checked in upon arrival at the facility. In some embodiments, the patient admission is initialized by the patient at step 1304 and finalized at step 1308.

At step 1312, a clinician and/or a care team is assigned to the patient. In some embodiments, the clinician is assigned immediately after the patient is admitted and the assignment is not affected or in response to the symptoms recognized in step 1316, as described below. In some embodiments, the clinician is assigned after step 1316 in the assignment is based at least in part on the types of symptoms observed by the system.

At step 1316, the patient begins to experience symptoms that may lead to a code blue event. In some embodiments, the symptoms can include shortness of breath, chest pain, or increased heart rate. In some embodiments, the symptoms are recognized automatically by the sentient patient room via direct monitoring (e.g., a heart rate monitor) or via intelligent observation (e.g., patient is clutching chest, wincing, etc.).

At step 1320, a code blue button is optionally activated (e.g., a friend or family member presses an RN button on the nurse call pillow speaker) and a notification is sent to the assigned clinician. In some embodiments, the code blue button is engaged automatically by the command center engine 502 or another system of the sentient patient room in response to the symptoms recognized in step 1316. In some such embodiments, an automated code blue system or method may be implemented that automatically detects and/or initiates a code blue event (e.g., based on the patient's vital signs). The notification provides the clinician with instant access to the symptoms and any other information (e.g., classification and/or diagnostic codes, as discussed above) that triggered the engagement of the code blue button. When the clinician arrives in the patient's room, he or she already has information on the code blue event and can focus on confirmation of the notification information.

At step 1324, the clinician confirms the code blue event and the intelligent code blue method 1300 engages the full response team to mitigate the problems associated with the code blue event.

At step 1328, the patient room responds to the confirmed code blue event and automatically adjusts the temperature, pressure, and humidity and/or any other room systems (e.g., blinds, air purification, etc.) to provide an optimum environment for critical care. In some embodiments, the temperature and/or humidity of the room are automatically lowered in response to a code blue event. Lowering the temperature and/or humidity of the room may not only benefit the patient, but can benefit a care team and/or the assigned clinician, who may have to rush (e.g., run) to the patient's room, causing increased body temperatures and respirations, etc. As the room is automatically adjusting conditions for response, a notification is sent via the command center engine 502 to the code blue response team.

At step 1332, the assigned clinician administers immediate resuscitation or other code blue procedures and awaits the arrival of the code blue team. In some embodiments, a camera and/or display (e.g., a television) positioned in the patient's room is also activated, allowing a remote supervising clinician to support the assigned clinician in administering code blue procedures.

At step 1336, the code blue team arrives and stabilizes the patient. The command center engine 502 receives input through the code blue event and can automatically schedule a care room or facility that is appropriate for the patient's care after the code blue event. For example, if an emergency surgery is required in view of the code blue event, the command center engine 502 automatically schedules an OR and the code blue team is provided with wayfinding information for transferring the patient to the scheduled OR.

The patient or family of the patient can push a button to call a nurse (e.g., via a pillow speaker, etc.). The clinician can get notified and go to the patient's room to find the patient in distress. Subsequently, the clinician can engage an emergency alert (e.g., via a button, etc.). The patient's room is then optimized for the ideal care of the patient. For example, if the patient had adjusted the TPH levels to their preference, but were not necessarily ideal for their health, engaging the button that the clinician pressed can return the TPH levels back to levels that are optimal for the patient's health, even it compromises some of the comfort of the patient. In addition, the emergency button engaged by the clinician can send an alert to a critical care team, who can respond and assist in helping the patient.

Code Blue System Architecture

Figure 14:
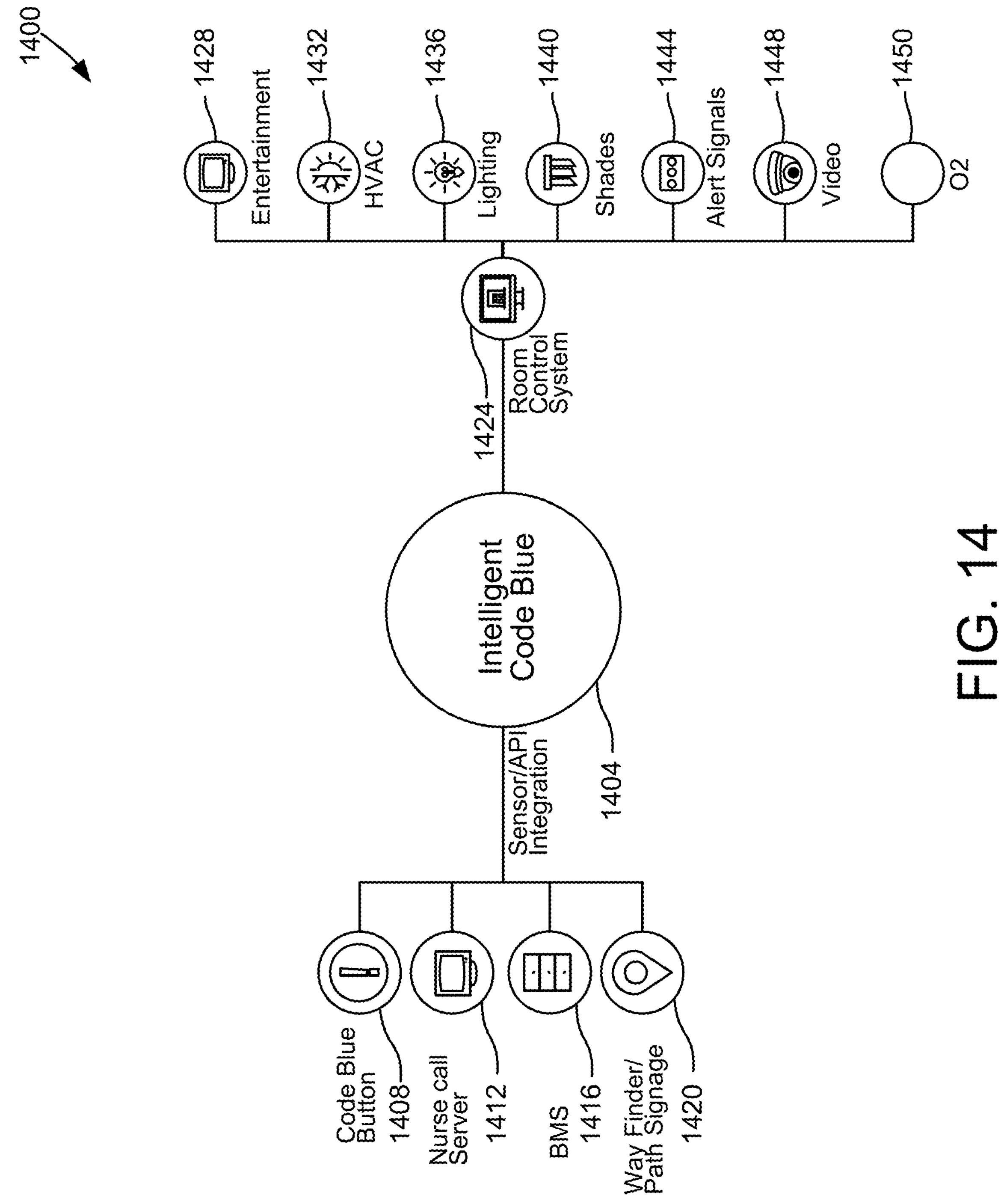
FIG. 14 is a diagram for implementing proper response to a patient during an emergency, which can be implemented by the engine of FIG. 5, according to some embodiments.

Referring now to FIG. 14, an intelligent code blue system architecture 1400 includes several servers (e.g., building management system server, nurse call server, etc.) and other sensor/API-based information being connected to an "intelligent code blue" system. In some embodiments, the intelligent code blue system architecture 1400 can include an alert/notification system and BMS adjustment that is engaged when one or more people of the care team of the patient engages the system (e.g., via a button, etc.). The intelligent code blue system architecture 1400 may also be connected to a room control system (e.g., system 1000, system 1100, etc.) configured to adjust room entertainment, HVAC, lighting, shading, alert signals, video, or any combination thereof.

As shown in FIG. 14, the intelligent code blue system architecture 1400 includes an intelligent code blue engine in the form of an integration engine 1404 that is structured to receive and interpret information, determine a code blue event, and enact code blue actions in response to determining a code blue event. In some embodiments, the integration engine 1404 receives information from a code blue button 1408 (e.g., in the patient room, at a nurse station, provided as an interactive button of a graphical user interface (GUI), a remote button, etc.) that can be engaged by a clinician (e.g., as shown in step 1324 of the method 1300). The integration engine 1404 can also communicate with a nurse call server 1412, a building automation system 1416 that can include the BMS 400 and/or the command center engine 502, and a wayfinder system 1420 for aiding clinicians get to the code blue event room. In some embodiments, the code blue button 1408 is a response button. In some embodiments, the response button can indicate an emergency, a contagious disease risk, or another event that requires automatic action of the intelligent code blue system architecture 1400.

In some embodiments, the integration engine 1404 provides information to the nurse call server 1412 to coordinate activities of the clinical staff. In some embodiments, the integration engine 1404 receives information from the nurse call system 1412 in the form of patient calls (e.g., a patient or other room occupant pressing the nurse call button), nurse and other clinical staff scheduling information (e.g., who is currently staffed, on-call individuals, clinician locations within the hospital, etc.), and/or other information.

In some embodiments, the integration engine 1404 provides information to the building automation system 1412 including room identity information (e.g., a room ID code, a room number, a room location, etc.), current patient information, room conditions at the time of a response event in the form of a code blue event, and other information, as desired. In some embodiments, the integration engine 1404 receives information from the building automation system 1412 including historical building information, operational status information for building systems (e.g., air handlers, chillers, door open status, air quality, temperature, pressure, humidity, etc.), or any other information available to the building automation system 1412.

In some embodiments, the wayfinder system 1420 is provided via lighted floors, video panels arranged in the hallways of the hospital, audio speakers, overhead lighting, or other physical elements within the hospital. In some embodiments, the wayfinder system 1420 is provided via a graphical user interface (GUI) of an application that can be accessed by a care provider via a smart phone, tablet, or other device. The GUI can provide real time location information and directions through the hospital. The wayfinder system 1420 can provide assistance to medical staff responding to the code blue event and reduce the time required for travel to the room where the code blue event is happening. The wayfinder system 1420 sends location information of a user (e.g., a medical professional) to the integration engine 1404 and receives information (e.g., directions, maps, etc.) from the integration engine 1404.

The integration engine 1404 communicates with a room control system 1424 to enact actions of the intelligent code blue system architecture 1400 (e.g., actions of the method 1300, response actions to a patient fall emergency, response actions to a contagious disease emergency, etc.). In some embodiments, the room control system 1424 controls room features including an entertainment center 1428, an HVAC system 1432, a lighting system 1436, a shades system 1440, an alert signal system 1444, a video system 1448, an oxygen supplement system 1450, and or other systems. In some embodiments, the room control system 1424 is in direct control of the room features. For example, the room control system 1424 can include or be a part of the BMS 400 discussed above and in control of HVAC systems and subsystems and other room features. In some embodiments, the room control system 1424 controls one or more room features, but not all room features, as desired. For example, the room control system 1424 can control the HVAC system 1432 and the lighting system 1436, but not the entertainment center 1428. In some embodiments, the room control system 1424 provides instructions to systems and subsystems associated with the room features to provide a coordinated response to the code blue event. For example, the room features may be controlled by any combination of local controllers and offsite controllers and the room control system 1424 provides instructions to the controllers (e.g., local, distributed, cloud based, off site, etc.) to enact the desired actions in response to the code blue event.

Figure 15:
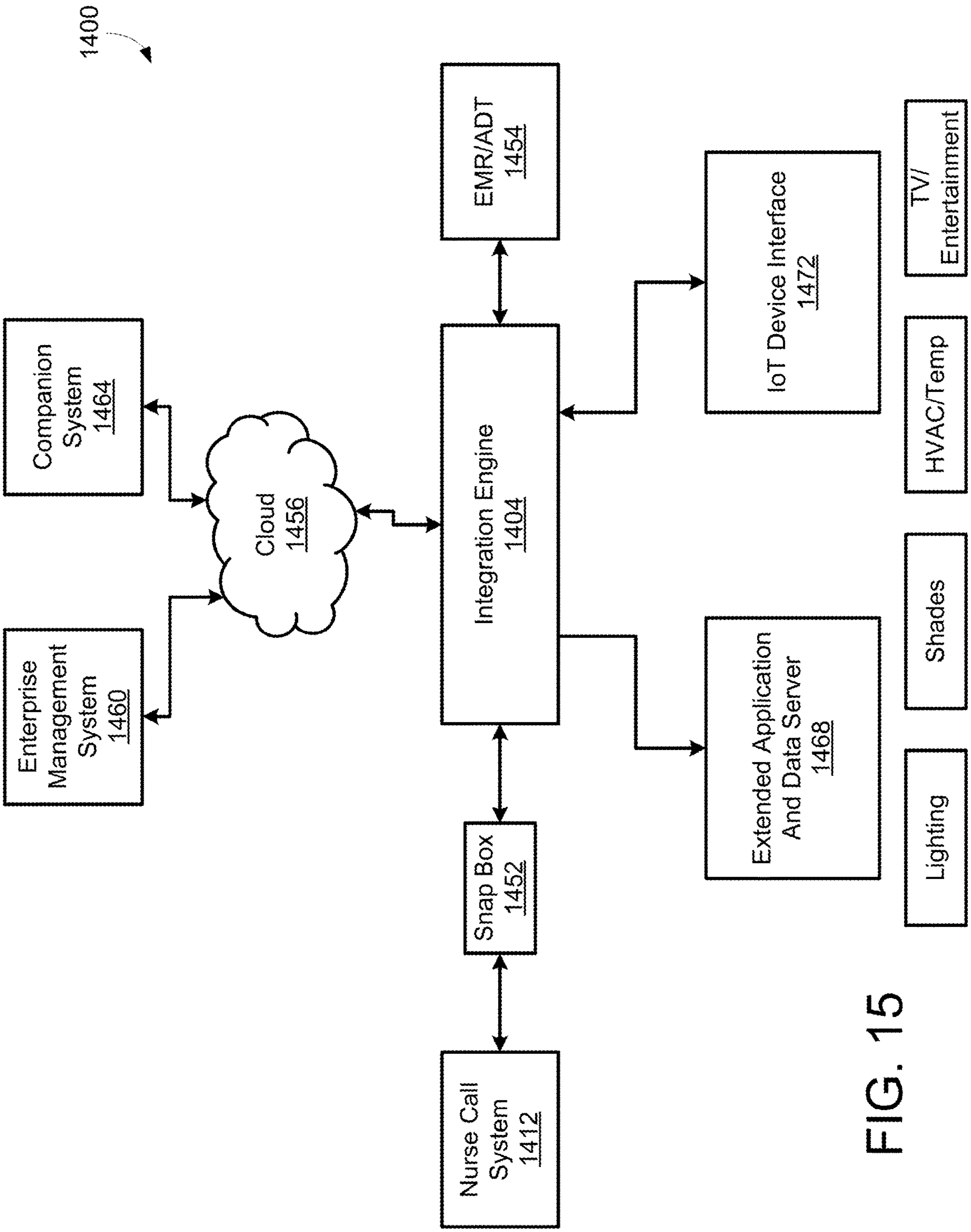
FIG. 15 is a schematic diagram of an intelligent code blue system architecture, which can be implemented by the engine of FIG. 5, according to some embodiments.

As shown in FIG. 15, some embodiments of the intelligent code blue system architecture 1400 include the integration engine 1404. The integration engine 1404 is located on-premises or locally. Generally, the nurse call system 1412 is structured to communicate with the integration engine 1404 via a snap box 1452 and provide a room identifier and a response identifier in the form of a code blue identifier to the integration engine 1404. An electronic medical record and admission discharge transfer (EMR/ADT) system 1454 communicates with the integration engine 1404 to provide patient related information including allergies, medication restrictions, health history, current medical treatment plans, historical doctor information, etc. The integration engine 1404 also communicates with a network system in the form of a cloud 1456. The cloud 1456 provides communication and control between the integration engine 1404, and enterprise management system 1460, and a companion system 1464. In some embodiments, the enterprise management system 1460 is the BMS 400 or the BMS controller 366, or any portion of the BMS 400 or the BMS controller 366, or any portion of enterprise management components, systems, or subsystems discussed above. In some embodiments, the companion system 1464 is an application in communication with the integration engine 1404 and/or the enterprise management system 1460 and can be provided on a user device such as a smart phone in order to convey information to a user (e.g., a medical professional) via a graphical user interface (GUI) and to receive information from the user via interaction with the GUI using buttons (e.g., real, virtual, digital touch screen, GUI buttons, etc.). The integration engine 1404 communicates with an application data server (ADS) or extended application and data server (ADX) 1468 and an Internet-of-Things (IOT) device interface 1472 to enact actions during a code blue event in response to the room identifier and the code blue identifier. The intelligent code blue system architecture 1400 is structured to identify a code blue event (e.g., from the nurse call system 1412), then control room features (e.g., temperature, lighting, air flow, oxygen levels, etc.) during the event. In some embodiments, the intelligent code blue system architecture 1400 is structured to provide communication to the companion system 1464 and the nurse call system 1412 to coordinate actions of medical staff responding to the code blue event. For example, the companion system 1464 may provide wayfinding instructions to medical staff, thereby decreasing the time to arrive at the room where the code blue event is occurring. Additional advantages and benefits of the intelligent code blue system architecture 1400 will be apparent from the following description. In some embodiments, the system architecture 1400 can be used to automatically respond to other emergencies or events. For example, concepts discussed herein may be applied to a patient fall emergency (e.g., when a patient falls within the hospital, or become incapacitated in a non-life threatening way), or a rapidly spreading contagious disease event. While the description herein refers to code blue events, it is understood that events other that code blue events can act as the prompt for actions, and actions other than the code blue actions discussed below can be implemented in response.

In some embodiments, the nurse call system 1412 is structured to output a text string. The snap box 1452 is structured to parse the text string into data packets and provide the data packets to the integration engine 1404 is a format suitable for use by the integration engine 1404. In some embodiments, the nurse call system outputs consumable data packets directly to the integration engine 1404. For example, the nurse call system 1412 can output a room signal that directly identifies the room in which a code blue event is occurring and a code blue signal indicating that a code blue event is ongoing. The room signal and the code blue signal can be directly communicated to the integration engine 1404 to allow the intelligent code blue system architecture 1400 to implement code blue actions (e.g., cool the room, increase air flow, maximize light, etc.) and to provide communication with the medical professionals to increase response time of the code blue team to the code blue event (e.g., via communication with the companion system 1464).

In some embodiments, the nurse call system 1412 outputs a text string including a room identifier and a code blue identifier. The room identifier may be a room number, a room code (e.g., hexadecimal ID number, etc.), or another identifier that allows the integration engine 1404 or another portion of the intelligent code blue system architecture 1400 to recognize the room in which the code blue event is occurring.

In some embodiments, the snap box 1452 receives the text string from the nurse call system 1412 and extracts the room identifier and the code blue identifier. For example, the snap box may utilize filtering techniques, programmed logic, a machine learning engine, or a rules based logic to determine the room identifier and the code blue identifier. For example, in some hospitals, the nurse call system 1412 may include relatively older technology or may include a unique way of identifying rooms and code blue events (e.g., a room identifier and a code blue identifier that are unique to that one hospital). The snap box 1452 includes logic, machine learning engines, or other programming that allows for the integration with an existing, and sometimes older technology, nurse call system 1412 with the integration engine 1404 and allows an older nurse call system 1412 to enjoy the benefits of the intelligent code blue system architecture 1400. In some embodiments, there the snap box 1452 utilizes machine learning, a reinforcement training scheme can be used to initialize a snap box model with historical information, then to further train the snap box model using real time nurse call information from the nurse call system 1412. In some embodiments, the snap box 1452 is a physical control module installed at an edge of the intelligent code blue system architecture 1400. For example, a snap box 1452 can be installed at each nurse station of a hospital to directly interact with the nurse call system 1412 where the medical staff interacts with the nurse call system 1412 (e.g., at a nurse station, in a section of a hospital floor, in a treatment unit, etc.). In some embodiments, the snap box 1452 may be included in the integration engine 1404 and an external physical module is not needed. In some embodiments, the snap box 1452 may be a regional or sectional physical module that is in communication with more than one nurse call system 1412 or more than one nurse call stations allowing for a single snap box 1452 to provide the room identifier and the code blue identifier from the more than one nurse stations to the integration engine 1404 and for use by the intelligent code blue system architecture 1400. In some embodiments, the snap box 1452 may communicate with the cloud 1456, the enterprise management system 1460, and/or the companion system 1464.

The EMR/ADT system 1454 communicates with the integration engine 1404 to provide patient information including allergies, medication restrictions, health history, current medical treatment plans, historical doctor information, etc. The patient information can be used by the integration engine 1404 to communicate relevant information to the code blue team via the companion system 1464. For example, the code blue team may be provided with the patient information and have access to patient allergies, or other information that may inform treatment during response to the code blue event.

The network system of FIG. 15 is shown as the cloud 1456. In some embodiments, the network system can include a local server system, a remote server system, a distributed control and data storage system, or any combination of network systems. In some embodiments, various data discussed herein may be processed at (e.g., processed using models executed at) the cloud 1456 or other off-premises computing system/device or group of systems/devices, an edge or other on-premises system/device or group of systems/devices, or a hybrid thereof in which some processing occurs off-premises and some occurs on-premises. In some example implementations, the data may be processed using systems and/or methods such as those described in U.S. patent application Ser. No. 17/710,458 filed Mar. 31, 2022, which is incorporated herein by reference in its entirety. In some embodiments, aspects of the enterprise management system 1460 and/or the companion system 1464 may be incorporated into the cloud 1456 or other network system(s). Additionally, in some embodiments, various data discussed herein may be stored in, retrieved from, or processed in the context of digital twins. In some such embodiments, the digital twins may be provided within an infrastructure such as those described in U.S. patent application Ser. No. 17/134,661 filed Dec. 28, 2020, 63/289,499 filed Dec. 14, 2021, and Ser. No. 17/537,046 filed Nov. 29, 2021, the entireties of each of which are incorporated herein by reference.

In some embodiments, the enterprise management system 1460 is the BMS 400 or the BMS controller 366, or any portion of the BMS 400 or the BMS controller 366, or any portion of enterprise management components, systems, or subsystems discussed above. The enterprise management system 1460 can control building systems to affect the environment in the room where the code blue event is occurring. For example, the enterprise management system 1460 may control air handlers, chillers, other HVAC components, louvers, lighting, shades, and any other room features that affect the environment. In some embodiments, the enterprise management system 1460 is also connected to auxiliary systems such as an entertainment system, and alert system, a video system, etc. For example, an entertainment system in the room may be automatically operated in response to a code blue event to display patient information, vital statistics, room parameters (e.g., temperature, pressure, humidity), locations of other members of the code blue team, etc. In some embodiments, the entertainment system and the video system may cooperate to provide an interactive environment that aids the code blue team. For example, a remote medical professional (e.g., an expert, a patients general practice doctor, etc.) may be connected to the entertainment system to communicate with the code blue team to increase the likelihood of survival of the patient. The video system could allow communication from the code blue team to the remote medical professional.

In some embodiments, the companion system 1464 is coordinated with the integration engine 1404 and the enterprise management system 1460 to provide coordinated communication to the code blue team and/or other medical professionals, family and friends, etc. For example, the companion system 1464 can include an application operable on a mobile device that provides a graphical user interface (GUI) for communicating information to a user and receiving information from the user. For example, the GUI can provide an alert to the code blue team that a code blue event has been triggered. A room location may then be provided and wayfaring information provided to speed the code blue teams arrival. The GUI may provide communication between the code blue team to provide additional coordination. Additionally, the code blue team can be connected with a primary care team for the patient to gain insight and information regarding the patient before arriving at the room. The GUI may also provide patient information before the code blue team arrives at the room. The companion system 1464 allows the code blue team to be more well prepared when they arrive at the room and therefore be more efficient with care and increase the likelihood of survival.

The ADS/ADX 1468 connects to devices at the edge of the intelligent code blue system architecture 1400 and manages the collection of large amounts of trend data, event messages, operator transactions, and system configuration data. The ADS/ADX 1468 provides site unification, advanced reporting, a simple and intuitive user interface, and a hierarchical network view of the intelligent code blue system architecture 1400 for all connected devices, which allows for efficient control of energy usage, quick response to critical conditions, and optimization of automation strategies. In some embodiments, the ADS/ADX 1468 provides fault detection at the edge. For example, the ADS/ADX 1468 identifies and lists building system-related faults in order of severity to help operators quickly fix issues and avoid equipment issues, energy waste, and comfort complaints. Fault detection can include fault triage that provides fault duration, occurrence information, and corrective action recommendations to improve fault prioritization that assists less experienced building operators with problem solving. In some embodiments, the ADS/ADX 1468 provides a building network tree that allows for faster delivery of user interfaces (UI) of the enterprise management system 1460 by enabling deployment prior to the spaces and equipment configuration process. In some embodiments, the ADS/ADX 1468 provides an advanced search and reporting features that accesses the enterprise management system 1460 to find and report on operational data and make bulk commands to restore order more quickly. For example, the advanced search and reporting feature can provide users the ability to quickly search enterprise management system 1460 objects by the building network, equipment, equipment type, or space. In some embodiments, the ADS/ADX 1468 provides custom dashboards for the enterprise management system 1460 and enable designers to create dashboards that provide the most relevant and critical information for enhanced productivity and creates an experience that mimics users operational styles for ease of use. In some embodiments, the custom dashboards can be provided to users via a mobile application of the companion system 1464. In some embodiments, the ADS/ADX 1468 provides graphics custom behaviors including custom symbols for individual buildings, campus needs, local standards, etc. In some embodiments, the ADS/ADX 1468 provides trend widget updates that allow users to identify patterns including outliers, using intuitive candlestick charts that display min, max, and averages. In some embodiments, the ADS/ADX 1468 provides a cyber health dashboard with a centralized view of potential security-related issues or system issues which are detectable by the ADS/ADX 1468, but which may not surface as part of general system alarms. In some embodiments, the ADS/ADX 1468 provides user management that facilitates the creation and management of users and their roles within the intelligent code blue system architecture 1400 including category based permissions and privileges. In some embodiments, the ADS/ADX 1468 provides historical data management, including an Open Database Connectivity (ODBC) compliant database package for storage of trend data, event messages, operator transactions, and system configuration data. A site management portal UI of the ADS/ADX 1468 provides a flexible system to change the online configuration of the enterprise management system 1460, optimize control strategies, and perform administrative tasks. The ADS/ADX 1468 includes an ODBC compliant database package for secure storage of historical and configuration data. The ADS/ADX 1468 supports virtual environments, including VMware® and Microsoft® Hyper-V™.

The IoT device interface 1472 provides communication between the integration engine 1404 and a variety of IoT connected devices (e.g., lighting, shades, HVAC/Temp, TV/entertainment, etc.). The IoT device interface 1472 can call a resting IP Application Programming Interface (API) of each individual IoT connected device to receive information therefrom and to provide control from the integration engine 1404 to the IoT connected device. The IoT device interface 1472 provide integration of IoT devices (e.g., third party provided devices, devices inclusive of the intelligent code blue system architecture 1400, any other IoT capable device) with the intelligent code blue system architecture 1400. The IoT device interface 1472 improves the system's ability to be integrated into existing system and hospitals while providing the advantages and benefits of the intelligent code blue system architecture 1400.

The integration engine 1404 includes programming that allows communication with the IoT device interface 1472 and integration of the IoT connected devices into the intelligent code blue system architecture 1400. In some embodiments, the integration engine 1404 include Node-RED programming that provides a logical flow based development environment allowing for visual programming of inputs, outputs, and actions of the integration engine 1404. The integration engine 1404 integrates hardware devices, APIs and online based services as a part of the IoT. Node-RED provides a light-weight runtime built on Node.js, and an event-driven, non-blocking model. The integration engine 1404 including Node-RED is ideal to run at the edge of the intelligent code blue system architecture 1400 and can be supported on relatively low-cost local hardware, in the cloud 1456, on a distributed network, or any combination thereof.

Method of Operation of an Intelligent Code Blue System Architecture

Figure 16:
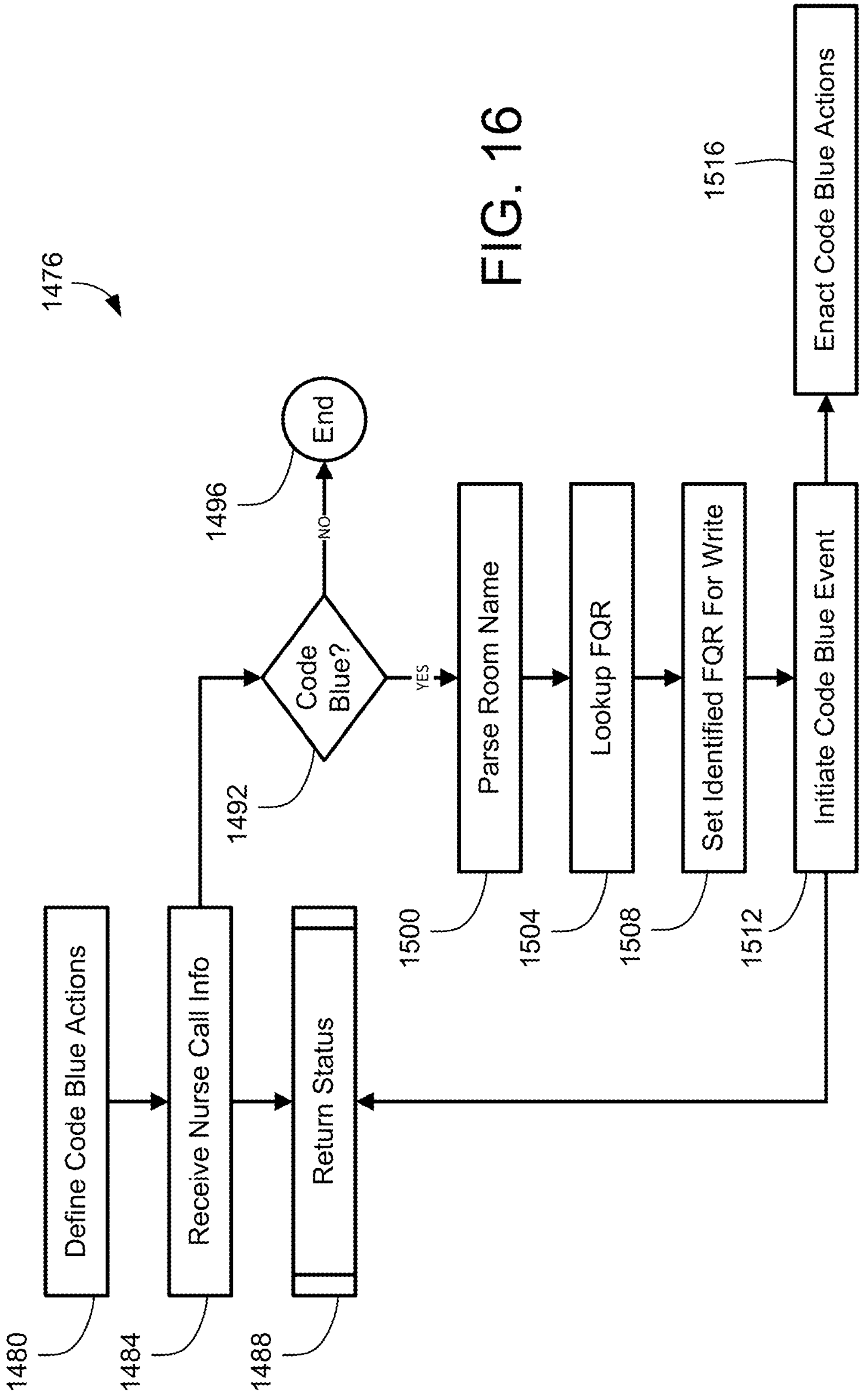
FIG. 16 is a flow diagram of a code blue response method, which can be implemented by the engine of FIG. 5, according to some embodiments.

As shown in FIG. 16, the intelligent code blue system architecture 1400 can be arranged and operated using the method 1476. At step 1480, code blue actions are defined in the integration engine 1404. Code blue actions can include and actions desired by the hospital and can include HVAC control, lighting control, shade control, security control, control of communications to the code blue team, control of communications to the primary care team, control of communications to the patient's family and/or friends, control of video camera systems, control of entertainments systems, control of an alert system, and/or other controls as desired. In some embodiments, the code blue actions are defined using the Node-RED environment discussed above. For example, the Node-Red environment can be used to define input nodes, processing nodes, and output nodes within the integration engine 1404 to provide the desired code blue actions. In some embodiments, the integration engine 1404 will communicate with the cloud 1456, the enterprise management system 1460, the companion system 1464, the nurse call system 1412, the EMR/ADT system 1454, the ADS/ADX system 1468, and/or the IoT device interface 1472 to define and control the input nodes, processing nodes, and output nodes. Control of the input node, processing nodes, and output nodes during operation of the method 1476 results in the implementation of the code blue actions, as desired.

In some embodiments, the HVAC control can control operation of the HVAC 1432 to lower the temperature of the room (e.g., the room 1002) to a set point temperature. In some embodiments, the HVAC control can adjust the HVAC 1432 to a coldest setting to drop the temperature as rapidly and as cold as permitted by the HVAC system constraints. In some embodiments, HVAC control defines an air flow or circulation rate (e.g., a turn over time, a turn over volume, etc.) and adjusts air handlers to achieve the air flow or circulation rate.

In some embodiments, the lighting control can control the lighting 1436 to provide a maximum illumination in the room and/or on a path to the room. For example, the hospital lighting system may be controlled to illuminate any areas through which a member of the code blue team may travel on their way to the room.

In some embodiments, the shade control operates the shades 1440 to allow a maximum of ambient light through any windows of the room. In some embodiments, the shade control can operate the shades 1440 to block visibility into the room (e.g., from an adjacent hallway, etc.).

In some embodiments, the security control can automatically unlock doors on the path between the code blue team and the room. Automatic control of safety doors may reduce the time required for the code blue team to arrive at the room and administer care.

In some embodiments, the control of communications to the code blue team can include communication using the companion system 1464 and may provide the code blue team with vital patient information, patient EMR/ADT information, communication or locations of other code blue team members, wayfaring information, etc. In some embodiments, the control of the communications to the code blue team can include paging the code blue team using personal pagers, group or floor level paging, department level paging, phone calls, or another form of communications. In some embodiments, the control of communications to the code blue team includes controlling video boards, or directional lighting to aid in wayfinding or wayfaring to aid in the speedy arrival of the code blue team in the room.

In some embodiments, the control of communications to the primary care team can include communication using the companion system 1464 and may provide the primary care team with vital patient information, patient EMR/ADT information, communication or locations of the code blue team members, instruction for treatment until the code blue team arrives (e.g., how to conduct preliminary actions and life saving techniques), etc. In some embodiments, the control of communications to the primary care team includes controlling the entertainment system 1428 to display information to the primary care team.

In some embodiments, the control of communications to the patient's family and/or friends can include communication using the companion system 1464 and may provide information about the patient, where they can meet the primary care team and/or the code blue team after the code blue event has concluded, etc.

In some embodiments, the control of video camera systems can include the ability for live interaction of the code blue team and/or the primary care team with a remote expert or individual who would like to communicate during the code blue event. The video system 1448 can provide sounds and video feed out to other, remote systems.

In some embodiments, the control of entertainments systems can include operation of the entertainment system 1428 to display patient information, aids for treatment, provide communication with an offsite expert or individual with information valuable to the code blue event, etc.

In some embodiments, the control of an alert system can be used to alert the code blue team or other individuals or groups who need to be aware of the code blue event. Alerts 1444 can include audible alarms, text messages, pages, alerts provided through the companion system 1464, or another type of alert, as desired.

At step 1484, the integration engine 1404 receives nurse call information from the nurse call system 1412. In some embodiments, the nurse call information includes a data packet in the form of a text string. The text string includes a code blue identifier and a room identifier. The code blue identifier indicates that a code blue event is occurring. The room identifier indicates a room location or code that allows the integration engine 1404 to determine the room where the code blue event is occurring and to provide location information of the room to the code blue team. In some embodiments, the location information can include a location of a nearest crash cart or other code blue related supplies and/or equipment. In some embodiments, the text string is parsed by the snap box 1452 in order to convert the raw information provided by the nurse call system 1412 to a data format usable by the integration engine 1404. In some embodiments, the nurse call system 1412 communicates directly with the integration engine 1404 and provides the code blue identifier and the room identifier in a format consumable by the integration engine 1404. In some embodiments, the nurse call system 1412 sends the nurse call information when a code blue button is pressed. The code blue button can include a physical button at a nurse station or on a mobile device, etc. or may be a digital or UI button provided on a touch screen or a mobile device (e.g., via the companion system 1464).

At step 1488, a status is returned to the integration engine 1404 and/or other components of the intelligent code blue system architecture 1400. For example, the existence of an active code blue event may be provided to the enterprise management system 1460, the companion system 1464, the cloud 1456 or another network system, the ADS/ADX 1468, and/or the IoT device interface 1472. The status may be used for logging or control actions.

At step 1492, the integration engine 1404 analyzes the nurse call information received at step 1484, parses the code blue identifier, and determines if the code blue identifier indicates an active code blue event. In some embodiments, the nurse call information only includes the code blue identifier if an active code blue event is occurring. In some embodiments, the code blue identifier is a first value (e.g., true, 1, etc.) if an active code blue event is occurring, and a second value (e.g., false, 0, etc.) if there is no active code blue event.

If the code blue identifier indicates no active code blue event (e.g., no code blue identifier included in the nurse call information, 0, false, etc.) then the method 1476 ends at step 1496 and continues to wait for further nurse call information.

If the code blue identifier indicates an active code blue event is ongoing (e.g., the code blue identifier is included in the nurse call information, 1, true, etc.) then the method 1476 continues to step 1500 and the room identifier is parsed and used to determine the room location.

At step 1504, the integration engine 1404 looks up a fully qualified reference (FQR) for the identified room. The FOR is a unique, user-defined name that identifies an object in the intelligent code blue system architecture 1400. In some embodiments, the identified room includes the FQR for all related room systems (e.g., lighting, HVAC, shades, etc.). In some embodiments, FQRs of each associated system and room object are looked up at step 1504.

At step 1508, each FQR associated with the identified room is set to write (e.g., initialized so that a status or operational characteristics of the associated object can be changed). In some embodiments, step 1508 opens each FQR associated with the identified room for editing or writing by the integration engine 1404 or another component of the intelligent code blue system architecture 1400.

At step 1512, each FOR is set to indicate an active code blue event. In some embodiments, step 1512 writes the FQR's of each associated device or system to true (e.g., 1, active, etc.) for code blue event. This indicates to the intelligent code blue system architecture 1400 and all included systems that a code blue event is occurring.

At step 1516, the integration engine 1404 initiates and controls the code blue actions. Initiation of the code blue actions results in the actuation of all desired room associated systems to produce the desired environmental and experiential result in the room during the code blue event. For example, the temperature of the room will be lowered to account for the larger number of bodies who will be occupying the room and inhibit the temperature in the room from raising to an unacceptable level during the code blue event. The code blue actions provide an automated response to the initiation of the code blue event and increase the medical staff and code blue team's likelihood for success in the code blue event.

Intelligent Code Blue System Architecture

Figure 17:
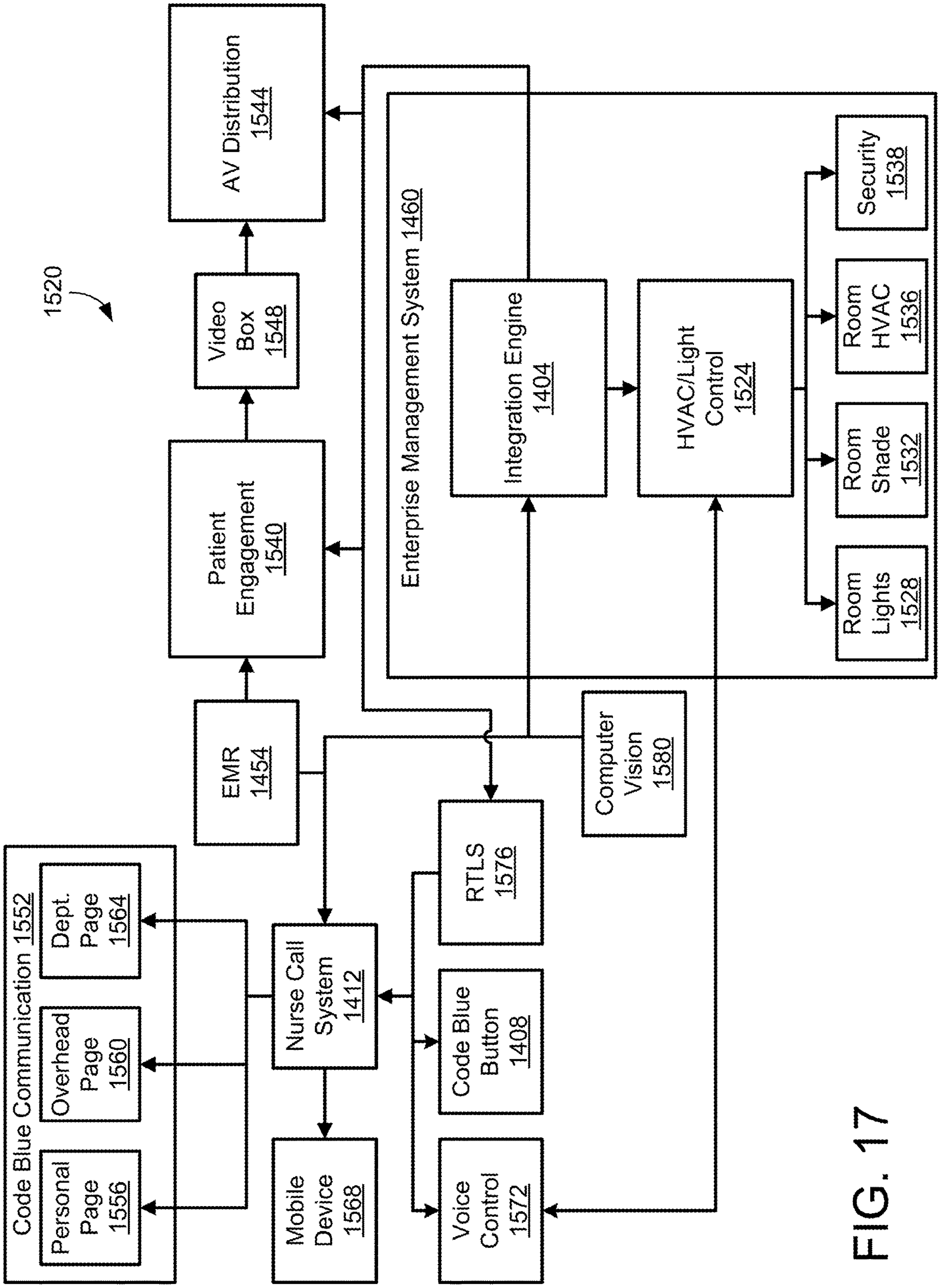
FIG. 17 is a schematic diagram of an intelligent code blue system architecture, which can be implemented by the engine of FIG. 5, according to some embodiments.

As shown in FIG. 17, in some embodiments an intelligent code blue system architecture 1520 includes the enterprise management system 1460 and the enterprise management system 1460 includes the integration manager 1404 and a HVAC/lighting control 1524 structured to control operation of room lights 1528, room shades 1532, room HVAC 1536 and room security 1538. In some embodiments, the HVAC/lighting control 1524 includes a number of distributed control modules located locally within the room (e.g., the room 1002) or near the room. In some embodiments, the HVAC/lighting control 1524 includes a centralized control located onsite (e.g., in a local server), at the edge, a distributed control network (e.g., residing in one or more servers located locally to the room or hospital or remote from the room or hospital), or any combination thereof. In some embodiments, the HVAC/lighting control 1524 initiates or controls the implementation of the code blue actions discussed above.

The integration engine 1404 also communicates with a patient engagement system 1540 and an AV distribution system 1544. In some embodiments, the patient engagement system 1540 controls room speakers, television displays and/or other room displays, hallway displays, hallway speakers, and/or other features that the patient may interact with. In some embodiments, the AV distribution system 1544 coordinates and controls digital white boards, clinical computers, video control computers, video cameras, speakers, badge tap devices, and/or other devices controlled by or interacted with by the medical staff or other hospital employees. In some embodiments, a video box 1548 provides communication from the patient engagement system 1540 to the AV distribution system 1544 to allow for coordination of the medical teams requirements for care and the patient's needs. Additionally, the EMR/ADT system 1454 provides information to the patient engagement system 1540, and the integration engine 1404.

The nurse call system 1412 provides information to the integration engine 1404 as discussed above. Additionally, the nurse call system 1412 can provide information to a code blue communication system 1552 structured to communicate with the code blue team. In some embodiments, the code blue communication system 1552 includes a personal page 1556, an overhead page 1560, and a department page 1564 that are arranged to communicate with the code blue team. For example, the personal age system 1556 may provide communication directly to a code blue team member via a pager, a mobile device (e.g., a text message, a phone call, etc.), or via the companion system 1464 discussed above. The overhead page system 1560 can provide an audible page to the code blue team based on location information (e.g., the page will be audible in the area where the code blue team members are currently). The department page system 1564 can provide an audible page to an entire area of the hospital (e.g., a floor, a department, a section, an area, etc.) so that the code blue team is alerted to the code blue event. The nurse call system 1412 can also communicate with a mobile device 1568 either directly or via the companion system 1460 to provide code blue team members with information regarding the code blue event. For example, the mobile device 1568 may display a room number (e.g., based on the room identifier), provide wayfinding directions to the room, provide wayfinding directions to a crash cart or other equipment/supplies, display vital statistics of the patient, display other patient information, or provide other information to the code blue team member to aid in response to the code blue event.

In some embodiments, the intelligent code blue system architecture 1520 includes a voice control system 1572 in communication with the nurse call system 1412 and the HVAC/light control 1524 to allow for voice control of room features and nurse call features. Voice control via the voice control system 1572 can provide efficiency during the time of determining if a code blue event is occurring and can decrease the response time of the code blue team to an identified code blue event. The nurse call system 1412 also receives information from the code blue button 1408 as discussed above. In some embodiments, the code blue event can be triggered by the voice control system 1572 and/or the code blue button 1408.

In some embodiments, the intelligent code blue system architecture 1520 includes a real-time locating system (RLTS) 1576 in communication with the nurse call system 1412, the patient engagement system 1540, the AV distribution system 1544, and the integration engine 1404 to provide location information usable by the intelligent code blue system architecture 1520. The location information can be used for wayfinding, and/or for controlling security doors to speed access of the code blue team in transit to the room. Location information can also be used by other systems as desired to coordinate the code blue team's ability to respond quickly to the code blue event. In some embodiments, the location information can include information about a crash cart or other supplies and/or equipment related to the code blue event. For example, a code blue team member may be assigned responsibility for bring a crash cart to the room, and the location information can provide wayfinding information to the crash cart for that team member, thereby reducing the response time of the code blue team as a whole to the code blue event.

In some embodiments, the intelligent code blue system architecture 1520 includes a computer vision system 1580 that is capable of watching patient's in rooms. The computer vision system 1580 can include a machine learning engine capable of determining activities of the patient. For example, the computer vision system 1580 may monitor the patient in conjunction with a vital signs monitor and determine that a code blue event is likely to occur for the patient. For example, the computer vision system 1580 may determine that the patient has been still for longer than a predetermined time and send an alert to the nurse call system 1412 to initiate a patient check. The computer vision system 1580 improves the primary care team's ability to recognize and trigger a code blue event in a timely fashion thereby increasing the chance of survival. The intelligent code blue system architecture 1520 is capable of performing the method 1476 discussed above.

Digital Twin

System Architecture

Figure 18:
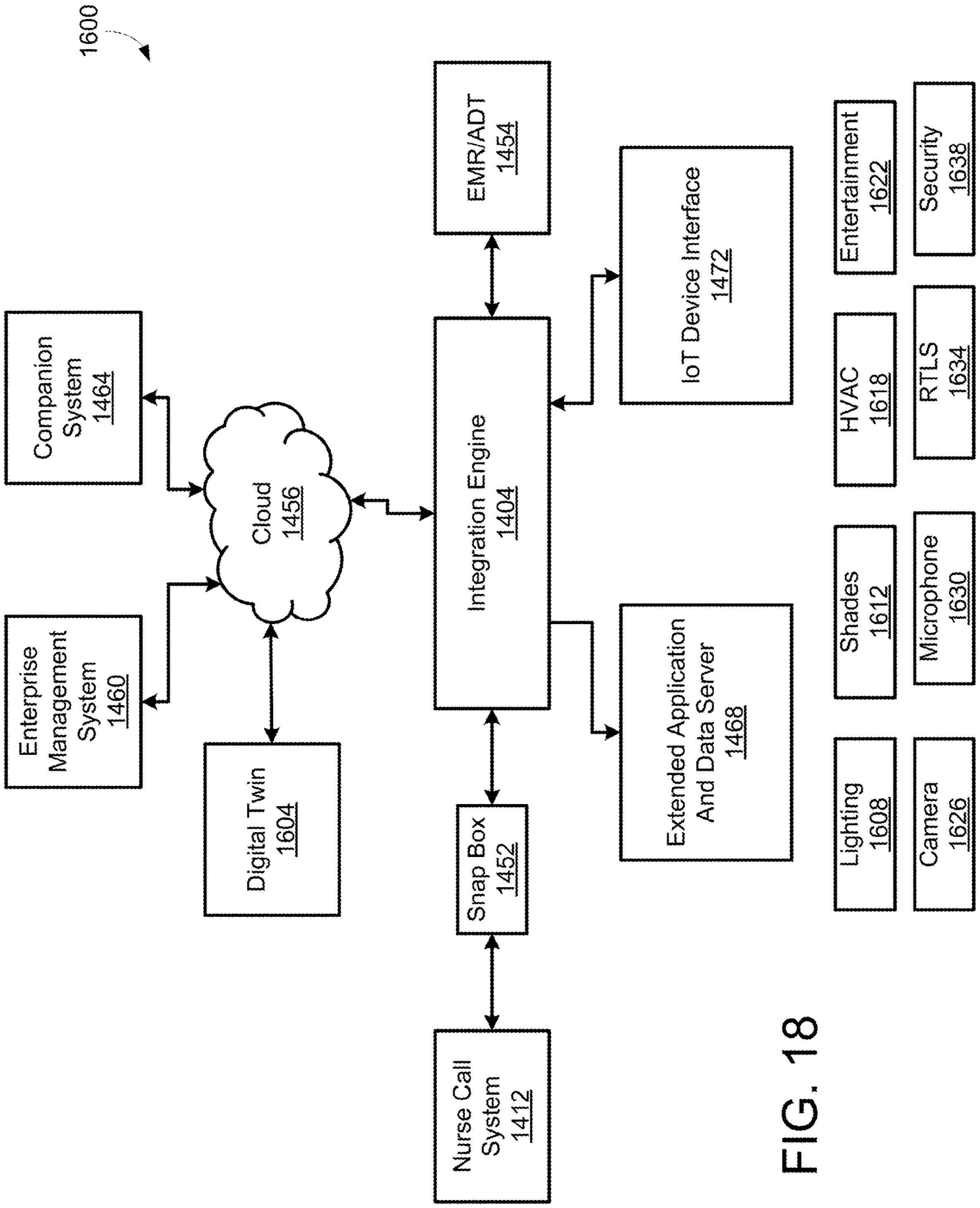
FIG. 18 is a schematic diagram of another system architecture, which can be implemented by the engine of FIG. 5, according to some embodiments.

As shown in FIG. 18, a system architecture 1600 is similar to the intelligent code blue system architecture 1400 discussed above. Components of the system architecture 1600 that are the same or similar to components of the intelligent code blue system architecture 1400 have been numbered with like numerals. The system architecture 1600 also includes a digital twin 1604 shown in communication with the cloud 1456. As discussed above, the cloud 1456 is only one example of a network system. In some embodiments, the network system can include a local server system, a remote server system, a distributed control and data storage system, or any combination of network systems. In some embodiments, various data discussed herein may be processed at (e.g., processed using models executed at) the cloud 1456 or other off-premises computing system/device or group of systems/devices, an edge or other on-premises system/device or group of systems/devices, or a hybrid thereof in which some processing occurs off-premises and some occurs on-premises. In some example implementations, the data may be processed using systems and/or methods such as those described in U.S. patent application Ser. No. 17/710,458 filed Mar. 31, 2022, which is incorporated herein by reference in its entirety. In some embodiments, aspects of the enterprise management system 1460 and/or the companion system 1464 may be incorporated into the cloud 1456 or other network system(s). Additionally, in some embodiments, various data discussed herein may be stored in, retrieved from, or processed in the digital twin 1604. In some such embodiments, the digital twin 1604 may be provided within an infrastructure such as those described in U.S. patent application Ser. No. 17/134,661 filed Dec. 28, 2020, 63/289,499 filed Dec. 14, 2021, and Ser. No. 17/537,046 filed Nov. 29, 2021, the entireties of each of which are incorporated herein by reference. The digital twin 1604 can also be provided within the integration engine 1404, be provided within the ADS/ADX 1468 or the IoT Device Interface 1472, and/or reside partially within edge devices themselves (e.g., a localized digital twin for an individual component, room, section, wing, floor, etc.).

Similar to the intelligent code blue system architecture 1400 discussed above, the system architecture 1600 communicates with building systems and sensors. The building systems and sensors can be used as inputs of the integration engine 1404 and/or the digital twin 1604 and used for determination of actions. In some embodiments, the inputs of the integration engine 1404 and/or the digital twin 1604 include a lighting system 1608, a shade system 1612, an HVAC system 1618 (e.g., the HVAC system 440), an entertainment system 1622, a camera system 1626, a microphone system 1630, a Real time location system (RTLS) 1634, a security system 1638, and/or an elevator system. In some embodiments, the inputs can include more or fewer inputs. For example, any systems or subsystems described herein (e.g., the building subsystems 428) can act as inputs or sources of information for the integration engine 1404 and digital twin 1604. Additionally, the digital twin 1604 and the integration engine 1404 can receive inputs or information from the nurse call system 1412 via the snap box 1452, the EMR/ADT system 1454, or the cloud 1456 (i.e., network system). The inputs and information sources allow the integration engine 1404 and the digital twin 1604 to learn how the building systems react to different changes in the system or environment and react to the changes to maintain or control a desirable environment. For example, a desirable environment may be an environment that reduces or minimizes the spread of viruses or bacteria, isolates a particular room or space, maintains a temperature/pressure/humidity (TPH) within compliance standards of a regulator body or compliance standard setting body such as Centers for Medicare and Medicaid Services (CMS) or auditors such as The Joint Commission, etc.

The building systems and sensors discussed above can also receive outputs or be controlled by the integration engine 1404 and/or the digital twin 1604 to enact actions and change the operational characteristics of the space. For example, the integration engine 1404 may determine actions, or may receive commands from the digital twin 1604 to institute actions, and the integration engine 1404 then controls operation of one or more building systems to control conditions of the space.

The digital twin 1604 in general is structured to replicate the physical systems associated with the building digitally or virtually. That is, the digital twin 1604 provides a virtual representation of the building and how the inputs affect operation of the building and environments within the building. The digital twin 1604 can includes programmed representations of the integration engine 1404 and all other components, systems, and subsystems connected to the integration engine 1404. The digital twin 1604 allows for testing and information sampling in a digital environment without the need for physical testing and manipulation. In other words, the digital twin 1604 allows an operator to observe potential changes to a subsystem or system without physically changing the real world environment. Below, a number of use cases for the digital twin 1604 and the system architecture 1600 are described.

Self-Supervised Training

Figure 19:
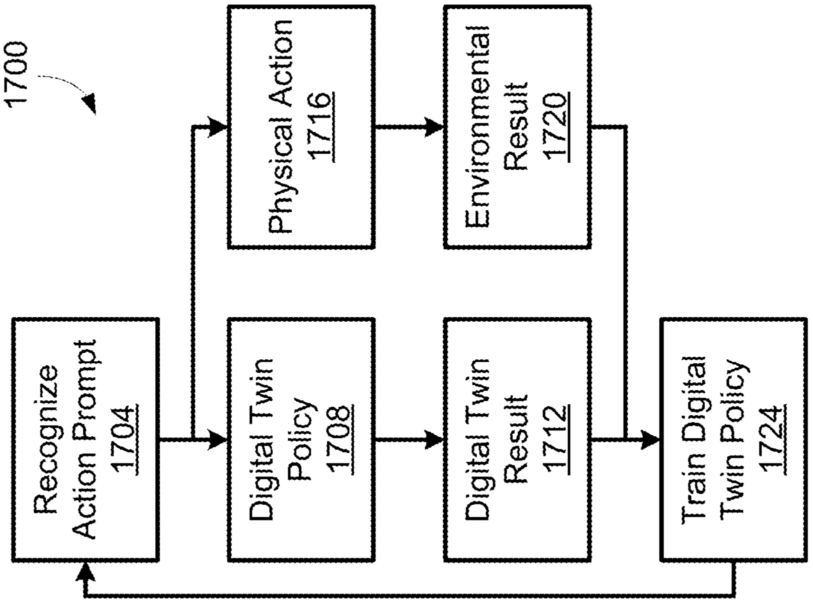
FIG. 19 is a flow chart of a self-supervised training method for operating the system architecture of FIG. 18, according to some embodiments.

As shown in FIG. 19, the system architecture 1600 can train the digital twin 1604 over time using a self-supervised training method 1700 that utilizes real life response of a medical team as a training input. In some embodiments, the digital twin 1604 include a machine learning or artificial intelligence engine and is initialized with a base digital twin policy. In some embodiments, the base digital twin policy is maintained in the cloud 1456 or in a remote portion of the digital twin 1604 and the base digital twin policy is updated over time based on aggregated information from multiple buildings connected to the cloud 1456. For example, all hospitals or healthcare facilities that are connected to the cloud 1456 provide information to the digital twin 1604 to be used for training the base digital twin policy. In this way, the base digital twin policy can improve over time and require less training within a specific system or building.

With the based digital twin policy initialized, the self-supervised training method 1700 receives or recognizes an action prompt at step 1704. In some embodiments, the action prompt is a sudden change in temperature, pressure, or humidity. In some embodiments, the action prompt is a code blue event. In some embodiments, the action prompt is a change in a patient state-of-mind (SOM) or a particular action of the patient or another person in the building (e.g., changing a thermostat, pressing a nurse-call button, turning on an entertainment system, etc.). In some embodiments, the action prompt is a scheduled event (e.g., a schedule doctor check in, a scheduled procedure, etc.).

At step 1708, the digital twin 1604 receives the action prompt as an input to the based digital twin policy. The digital twin 1604 then processes the action prompt and outputs a digital twin result at step 1712. The digital twin result includes a command for action of one or more building systems or subsystems. For example, the digital twin result may control operation of the HVAC system 1618 to change a temperature, a pressure, a humidity, an airflow, etc. of a room or space. In some embodiments, the digital twin result includes a command to a scheduling system, the nurse call system 1412, the entertainment system 1622, the lighting system 1608, the shade system 1612, or any other system or subsystem connected to the integration engine 1404.

At step 1716, a physical action is taken in the real world via the integration engine 1404. For example, a nurse may call a primary care physician, or lower a room temperature, or increase a room pressure, turn on lights, open shades, or any other activity to alter the physical parameters of the room or space.

At step 1720, the result of the physical actions taken in step 1716 are measured by the systems, subsystems, and sensors of the system architecture 1600. The physical action in step 1716 and the result in step 1720 provide real time training information for the digital twin 1604.

At step 1724, the base digital twin policy is trained based on the digital twin result generated in step 1712, the physical action in step 1716, and the environmental result in step 1720. For example, the physical action of step 1716 may be compared to the digital twin result from step 1712 and the comparison is used in a reinforcement learning scheme. For example, if the digital twin result matches the physical action taken or is within a tolerance band of the physical action taken, then a reward is provided to the based digital twin policy. If the digital twin result is different from the physical action taken or is outside a tolerance band of the physical action taken, then a penalty is provided to the based digital twin policy. Other learning methods are considered and contemplated within the scope of the self-supervised training method 1700. In some embodiments, a human operator interacts with the digital twin 1604 via the integration engine 1404 and enters the physical actions of step 1716 during the self-supervised training method 1700. In some embodiments, the integration engine 1404 provides the physical action of step 1716 to the digital twin 1604 automatically.

The ability of the digital twin 1604 to learn the specific response tendencies of the actual people operating the building or facility allows the digital twin 1604 to accurately represent the real world responses and controls of the building and staff within the building. Once the base digital twin policy is fully customized and operating within a predetermined tolerance band or threshold accuracy, then the fully trained customized digital twin policy can be instituted on the integration engine 1404 and can be used to automatically react to situations in the room or building to control building systems and subsystems. The digital twin 1604 can continue to run and update in the background for use the integration engine 1404 or for any other use case or desired implementation.

Improved Sleep

Figure 20:
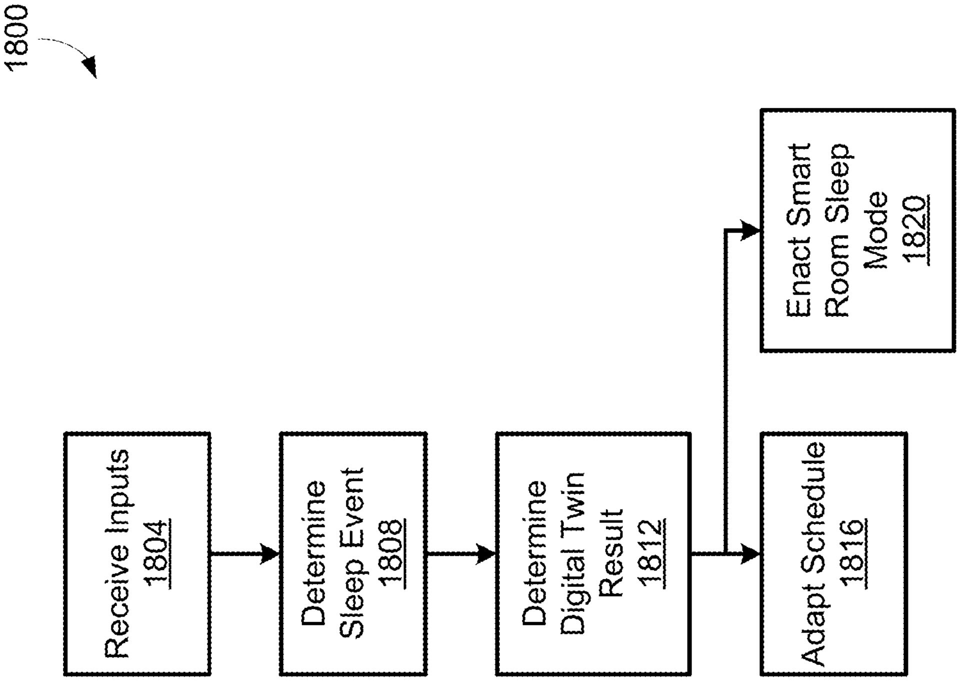
FIG. 20 is a flow chart of an improved sleep method for operating the system architecture of FIG. 18, according to some embodiments.

As shown in FIG. 20, the system architecture 1600 can be used to provide an improved sleep experience for patients in a healthcare facility room. An improved sleep method 1800 includes receiving system inputs at step 1804. In some embodiments, the inputs for the improved sleep method include the camera system 1626, the microphone system 1630, and the RLTS 1634. In some embodiments, other sensors or system can be used as inputs for the improved sleep method 1800. For example, a bed weight sensor that senses the movement of a patient in bed, a heart rate monitor, or another sensor/system. The inputs are received at step 1804 by a sleep engine of the integration engine 1404 and/or the digital twin 1604 that can use artificial intelligence of machine learning.

At step 1808, the sleep engine of the integration engine 1404 and/or the digital twin 1604 process the inputs and determine a sleep event percentage indicative of a likelihood that a target patient is sleeping, or is falling asleep. In some embodiments, the sleep engine can use video 1626 processing to identify sleep patterns. For example, the sleep engine can include a convoluted neural network capable of identifying objects and movement patterns to identify common sleeping patterns (e.g., no movement for a predetermined amount of time, rhythmic breathing, etc.). In some embodiments, other video analysis tools are implemented to analyze a video stream and identify a sleep event. In some embodiments, the microphone 1630 inputs to determine sleep noises and identify the sleep event. For example, the sleep engine can process the audio information from the microphone 1630 to determine rhythmic breathing, snoring, soft breathing, general quiet, etc. In some embodiments, the sleep engine can identify the sleep event by processing bed weight sensor information to determine if the patient has been laying still for a predetermined amount of time. In some embodiments, the sleep engine can identify the sleep event by processing heart rate monitor information. For example, if the patient's heart rate is dropping into a typical sleeping range or a specific heart rate range for that particular patient, the sleep engine can identify a sleep event. Other sensors and methods can be analyzed by the sleep engine in the integration engine 1404 and/or the digital twin 1604 to identify a sleep event.

At step 1812, the sleep engine outputs a digital twin result that includes control actions for response to the sleep event identified in step 1808. The control actions can be based on a simulation run in the digital twin 1604 using all available information. For example, the digital twin 1604 can test multiple control actions then determine the best actions for implementation by the integration engine 1404. For example, the digital twin 1604 may determine that schedules can be shifted to improve the patient's sleep experience (e.g., moving a scheduled appointment or non-critical procedure, cancelling a non-critical maintenance procedure nearby, etc.). If the digital twin 1604 determines that scheduling changes can be made without detriment to the overall care of the patient and/or the facility, then the schedules are adapted at step 1816.

In some embodiments, the digital twin result determined at step 1812 includes actuation of room features that can be implemented by the integration engine 1404. For example, the digital twin result may control actions of smart room features at step 1820. The actions can include any of the smart room features discussed herein. For example, the integration engine 1404 can command the shades 1612 to close, the lights 1608 to dim, the HVAC 1618 to adjust temperature to a patient requested sleep temperature, adjust the temperature to a physician requested level, adjust air flow to a predetermined sleep air flow, adjust a humidity to a desired level, the entertainment system 1622 to turn off, the entertainment system 1622 to play sleep sounds or a meditation, or any other environmental control identified in a user preference or identified by a care giver.

Efficient Patient Environment

Figure 21:
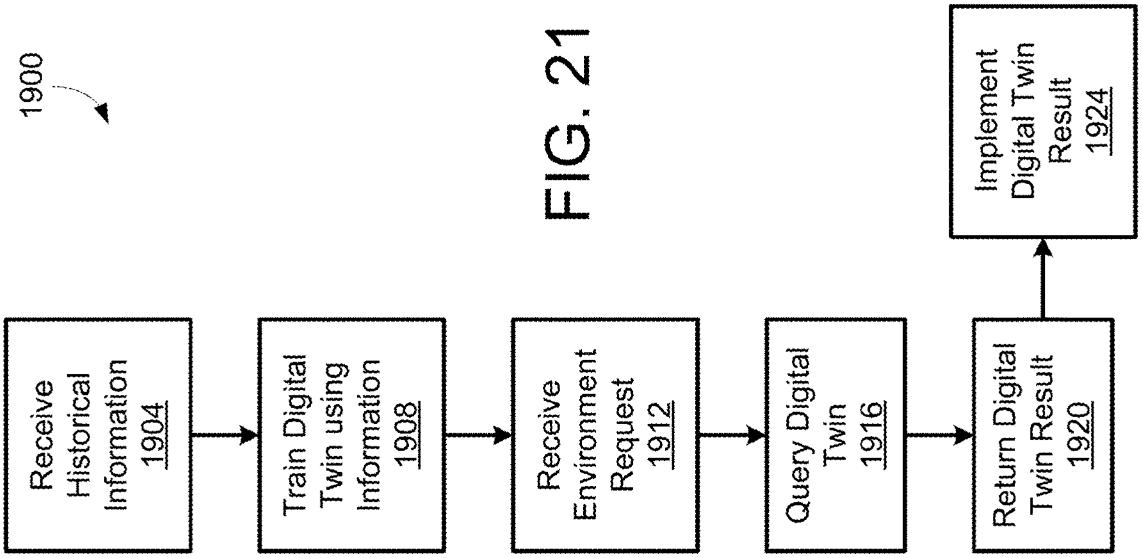
FIG. 21 is a flow chart of an efficient patient environment method for operating the system architecture of FIG. 18, according to some embodiments.

As shown in FIG. 21, the digital twin 1604 includes an efficient patient environment engine that includes a machine learning or artificial intelligence system. The efficient patient environment engine can provide an efficient patient environment method 1900 that improves the efficiency of operation of a room or space while maintaining the comfort and health of the patient and the care team.

At step 1904, the efficient patient environment engine receives historical information relating to environmental parameters and associated state-of-mind (SOM) scores of the patient or care team members (e.g., a surgeon in an OR). For example, the historical information can include temperature, humidity, air flow, shade position, light levels, etc. The associated SOM scores can be used to identify relationships between patient or care team requests and the outcomes achieved within the environment. For example, when a user (i.e., patient, family, care team, etc.) makes a request for a change in temperature, a satisfactory feeling for the user can be achieved in multiple ways (e.g., raising and lowering temperature, raising and lowering humidity, raising and lowering airflow, etc.).

At step 1908 the efficient patient environment engine of the digital twin 1604 is trained using the historical information so that the efficient patient environment engine can identify the most energy efficient solution to achieve a user request. In some embodiments, the most energy efficient solution includes adjusting system unrelated directly to the user request but are identified by the efficient patient environment engine as achieving a high SOM score for that particular request. For example, the efficient patient environment engine can identify action commands for the HVAC system 1618, the lighting system 1608, the shade system 1612, etc. to achieve a user request.

At step 1912, the user makes an environmental request. In some embodiments, the environmental request includes a temperature change, a humidity change, a lighting change, a shade change, etc. In some embodiments, the environmental request includes an indication that the user is hot, cold, clammy, light headed, tired, nauseous, or another SOM indicator.

At step 1916, the environmental request is inputted to the efficient patient environment engine of the digital twin 1604 for processing. The efficient patient environment engine queries a policy using the environmental request and returns a digital twin result at step 1920. The digital twin result includes command actions for systems and subsystems of the room or space to achieve the most energy efficient response while maintaining a high SOM score of the user. For example, if the environmental request includes a indication to reduce a temperature of the room, the most energy efficient response may not be adjusting the actual temperature of the room as requested by the user. Rather, the digital twin result may indicate that a more energy efficient response includes lowering humidity of the room and increasing air flow. Or any combination of adjusting lighting, shades, temperature, humidity, air flow etc. to achieve the users desired affect while maintaining high efficiency operation.

At step 1924, the digital twin result is provided to the integration engine 1404 and the action commands are implemented in the room or space. The digital twin 1604 ios also capable of collecting feedback information for the user either by direct feedback (e.g., received via a GUI of a mobile device) or by sensed feedback (e.g., the user again made a similar environmental request, visual analysis of user behavior and/or gestures, etc.). The efficient patient environment engine can identify and provide associated actions that achieve a desired result at a lower energy cost and high efficiency. The efficient patient environment engine can drive overall system efficiency while maintaining a high SOM of the user.

Distributed Care Control

Figure 22:
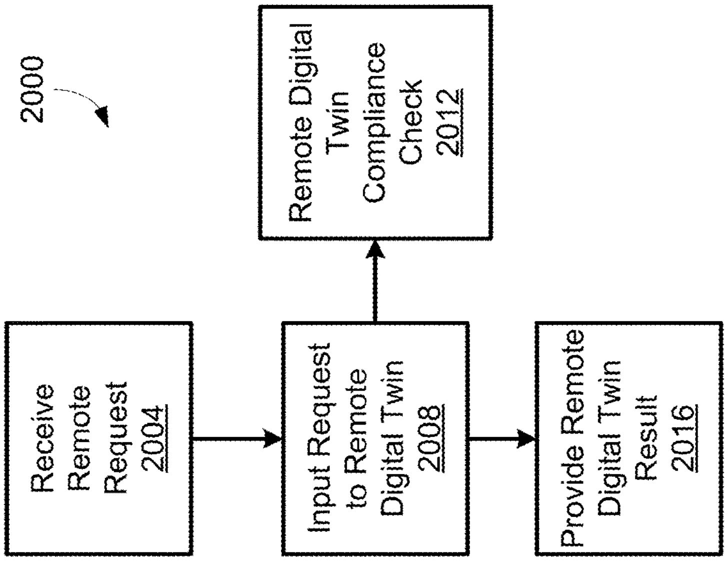
FIG. 22 is a flow chart of a distributed care control method for operating the system architecture of FIG. 18, according to some embodiments.

As shown in FIG. 22, the digital twin 1604 is structured to facilitate control and compliance of a remote healthcare facility using a distributed care method 2000. In some embodiments, a healthcare network may include some buildings that are equipped with more advanced equipment and control systems (e.g., the command center engine 502, the enterprise management system 1460, etc.) and some buildings that have less sophisticated controls available. In some embodiments, the multiple buildings may be arranged on a healthcare campus, or the less sophisticated building may be located remotely. For example, a more sophisticated control system may exist at an urban healthcare building and a remote healthcare building located in a rural area may have fewer or less sophisticated control. The distributed care method 2000 allows the digital twin 1604 to provide advanced controls to the remote building.

The digital twin 1604 includes a remote digital twin engine that defines a digital representation of the physical systems and spaces of the remote building. The remote digital twin engine can be trained over time using historical information of requests at the remote building and the building responses. For example, the remote digital twin engine records a temperature response of a room or space within the remote building following an environmental request made by a user or a control system of the remote building. The remote digital twin engine is able to accurately reproduce actions and effects of the remote building and to model potential outcomes, associates, and related attributes of spaces within the remote building. The ability to model the remote space can allow for improved health outcomes and improved SOM scores by correlating attributes (e.g., how does humidity, temperature, and pressure affect a patients SOM score) and modelling how a space will react to prompts and user inputs/requests.

Additionally, the remote digital twin engine can model compliance information that may be difficult to obtain at the remote building. For example, the remote digital twin engine may be able to recreate a compliance activity and provide detailed compliance reporting for a compliance check by The Joint Commission or another standard setting body or regulator group. Compliance standards can define operating parameters and procedures, response actions, or any other parameters, checks, or standards as determined by the standard setting body or regulator group. The remote digital twin engine can provide more advanced compliance reporting by recreating faults and actions taken by the system, and by auto-populating reports for the compliance review of the standard setting body.

At step 2004, the remote digital twin engine receives a remote request from the remote building. In some embodiments, the remote digital twin engine automatically recognizes the remote request via the cloud 1456. For example, when a procedure is scheduled (e.g., a surgery in an OR), or when an environmental request is made at a nurse station, the local controller provides information to the remote digital twin engine of the digital twin 1604 and the remote request is recognized.

At step 2008, the remote request is processed by the remote digital twin engine to determine possible outcomes of the remote request. The remote digital twin engine can identify a best action set that achieves desired outcomes. For example, desired outcomes may include highest efficiency operation, highest likelihood of successful health outcome, a successful operation of the building while maintaining compliance, etc. The remote digital twin engine can process multiple outcomes and select the best action set without physical experimentation within the remote building. This leads to a more efficient operation for achieving the desired result and provides more information to the remote building systems for operation.

At step 2012, compliance information from the remote digital twin engine regarding the action set list is checked against compliance standards for the remote building. The remote digital twin engine can auto-populate compliance reports using the information generated by the remote digital twin engine to improve transparency and information depth. The improved ability to provide a clear and accurate picture of the operation of the remote building can improve the ability of the remote building to stay within compliance and avoid costly shut downs or compliance related issues.

At step 2016, the remote digital twin engine determines the best action set and provide the included system and subsystem actions of the remote building as a digital twin result. The digital twin result can then be used by the remote building (e.g., a remote building BMS) to implement the changes and arrange the space or room with in the remote building to achieve the remote request.

The remote digital twin engine allows for advanced data based control of a remote building that does not include advanced analytics, an integration engine 1404, or other components of the system architecture 1600.

Prediction Of A Future Environmental State

Figure 23:
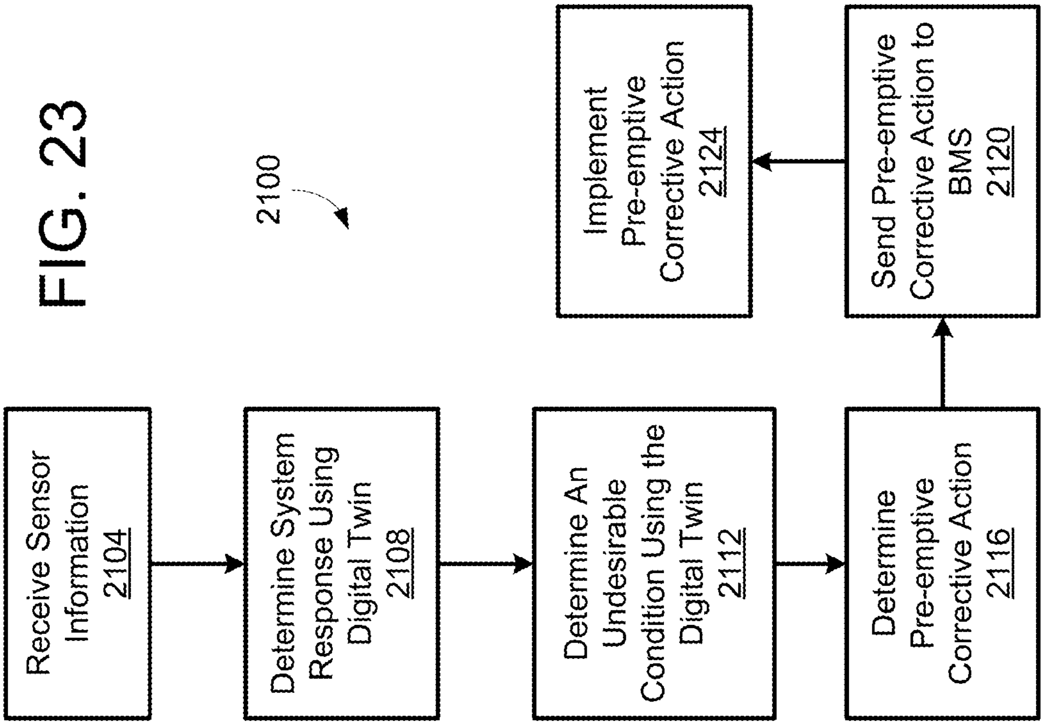
FIG. 23 is a flow chart of a prediction of a future environmental state method for operating the system architecture of FIG. 18, according to some embodiments.

As shown in FIG. 23, the digital twin 1604 includes a digital twin prediction engine that receives information and identifies trends and potential future compliance events or undesirable operating conditions. The digital twin prediction engine includes a prediction method 2100 and the digital twin prediction engine receives information at step 2104. The information can include any information from one or more systems or sub-systems of the building or space.

At step 2108, the digital twin prediction engine determines a system response that models the actual response of the building. The digital twin prediction engine models the system response and at step 2112, determines that an undesirable condition will exist or is likely to exist if operation of the building systems continues unchanged.

At step 2116, the digital twin prediction engine processes alternative operational states and inputs (e.g., changes to the operation of the HVAC system 1618 or another system) to determine how the undesirable condition might be avoided. After processing the available inputs and information, the digital twin prediction engine returns a pre-emptive corrective action indicative of the best case response. The pre-emptive corrective action is determined by the digital twin prediction engine to provide the best response to the predicted undesirable condition and to in some cases avoid the undesirable condition entirely.

At step 2120, the digital twin prediction engine send the pre-emptive corrective action to the integration engine 1404 or to another system or subsystem of the system architecture 1600 so that the pre-emptive corrective action can be implemented at step 2124.

The digital twin prediction engine is structured to model a large number of potential reactions and outcomes and to determine a best response that can avoid the undesirable condition. In some embodiments, the undesirable condition may include an out of compliance event (e.g., temperature, pressure, and humidity compliance). Use of the digital twin prediction engine and the returned pre-emptive corrective actions may allow the building or space to remain in compliance through an otherwise disruptive event. For example, if power is lost to a first room or space, dampers, air handlers, or other HVAC equipment associated with a second room may be manipulatable to provide the required environmental control to the first room. The digital twin prediction engine of the digital twin 1604 can determine interrelations of system and sub-systems and thereby provide controls that may not be obvious to the user of the building control systems. The digital twin prediction engine can also document changes made and the pre-emptive corrective action for use in compliance reports describing actions taken and how compliance events are responded to or avoided.

Smart Fall Avoidance

Figure 24:
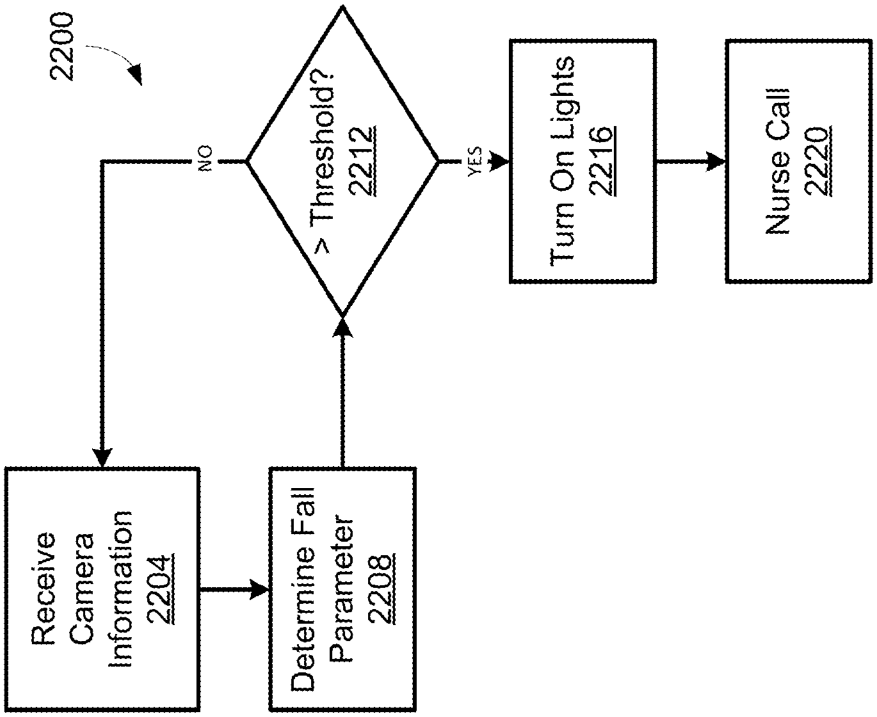
FIG. 24 is a flow chart of a smart fall avoidance method for operating the system architecture of FIG. 18, according to some embodiments.

As shown in FIG. 24, the digital twin 1604 and/or the integration engine 1404 include a fall avoidance engine that identifies a potential fall of a patient and responds by actuating building systems or subsystems, to reduce the likelihood that the patient actually falls. A fall avoidance method 220 is enacted by the fall avoidance engine. Camera information is received from the camera system 1626 at step 2204. In some embodiments, other information is received at step 2204 including bed sensor information (e.g., has a patient exited the bed), audio information from the microphone system 1630 (e.g., has the patient woken up and is making noises associated with getting out of bed), etc. In some embodiments, the information received in step 2204 includes characterization or classification of the patient (e.g., a 1-10 fall risk classification) and/or electronic health information from the EMR/ADT system 1454. The information may be automatically generated or received by manual entry by a nurse or by the patient or a family member (e.g., via the companion system 1464).

At step 2208, the fall avoidance engine determines a fall parameter based on the information received in step 2204. In some embodiments, the fall parameter is a value indicative of the likelihood of a patient fall. For example, a larger fall parameter may indicate a larger likelihood that the patient would fall if no action is taken. In some embodiments, the fall parameter is a percentage, ratio value, a sliding scale value, etc. The fall parameter is determined based on a model trained using historical information or self-supervised learning as discussed above and can predict the likelihood of a potential fall based on patient activity and situational information (e.g., light levels in the room or space, medications administered to the patient, patient injuries or maladies, etc.).

At step 2212, the fall parameter is compared to the threshold or a tolerance band. If the fall parameter is less than or equal to the threshold or falls within the tolerance band, then the method returns to step 2204 and the fall avoidance engine continues to monitor the patient for a potential fall.

If the fall parameter is greater than the threshold or falls outside the tolerance band, then the fall avoidance engine determines that a fall is likely to occur and takes environmental actions at step 2216. In some embodiments, the environmental action includes turning on the lights using the lighting system 1608. In some embodiments, the lighting system 1608 may illuminate specific areas of a space, an entire room, a bathroom walk way, etc. In some embodiments, the environmental action can include opening shades of the shade system 1612, operating the entertainment system 1622, activating the RTLS 1634 to track the patient, etc.

At step 2220, a notification or alarm is sent to the nurse call system 1412 to alert the care team that a fall is likely. The notification is automated and may prompt a check or a care action to provide aid to the patient.

Automatic recognition of a potential fall scenario and an automated response to reduce the likelihood of a fall can increase the percentage of successful health outcomes for a healthcare facility and lead to an overall improvement in patient satisfaction.

Reconfigurable Space Utilization

Figure 25:
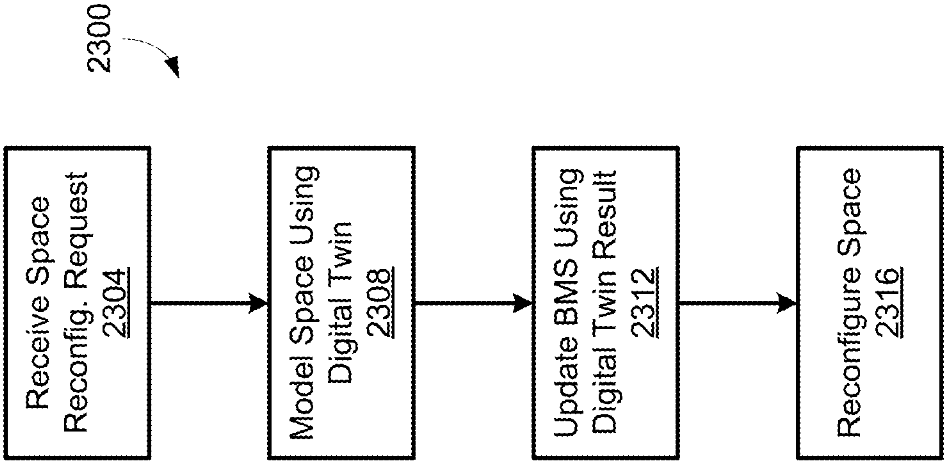
FIG. 25 is a flow chart of a reconfigurable space utilization method for operating the system architecture of FIG. 18, according to some embodiments.

As shown in FIG. 25, the digital twin 1604 includes a reconfiguration engine that is structured to model a response of a space or room and the ability of the building systems and sub-systems to determine how best to reconfigure the space or room for a desired use.

The reconfiguration engine of the digital twin 1604 is structured to implement a reconfiguration method 2300 that includes receiving a space reconfiguration request at step 2304. The reconfiguration request can include a current usage of the space (e.g., general population hospital space), and a requested usage of the space (e.g., a COVID or infections disease ward, a burn unit, etc.). The reconfiguration request can include associated compliance information for the currant usage and/or the requested usage. For example, the current usage (e.g., a general population hospital space) may have different compliance standards defined by a standard setting body (e.g., The Joint Commission) than the requested usage (e.g., an infectious disease ward).

At step 2308, the reconfiguration engine receives inputs from the space (e.g., current temperature, humidity, and pressure) and models the system response to the request usage. For example, the reconfiguration engine can determine if the building systems and sub-systems are capable to operate the space according to the requested usage and meet all compliance standards associated with the requested usage. If the reconfiguration engine determines that the building systems and sub-systems are not capable of achieving the requested usage, then a digital twin result is returned indicating that the requested change is no feasible. If the reconfiguration engine determines that the change is feasible, then the digital twin result is provided to the integration engine 1404 at step 2312 and the space is reconfigured to the requested usage at step 2316. The integration engine 1404 can use the digital twin result to operate the HVAC system 1618 and other systems and subsystems of the system architecture 1600 to operate the space according to the requested usage. The digital twin result includes operational parameters that are modelled based on the space and can provide the most efficient manner of operation to condition the space and achieve the desired requested usage while maintaining compliance of the space. The digital twin result can be used for compliance documentation of how the space is reconfigured for the requested usage. For example, what physical changes are controlled, at what times, and how long changes take to implement can be monitored and populated into a compliance report. The population of compliance reports can act as a quality control and also be used in compliance reporting for the standard setting body.

Treatment Improvement Through Environmental Control

Figure 26:
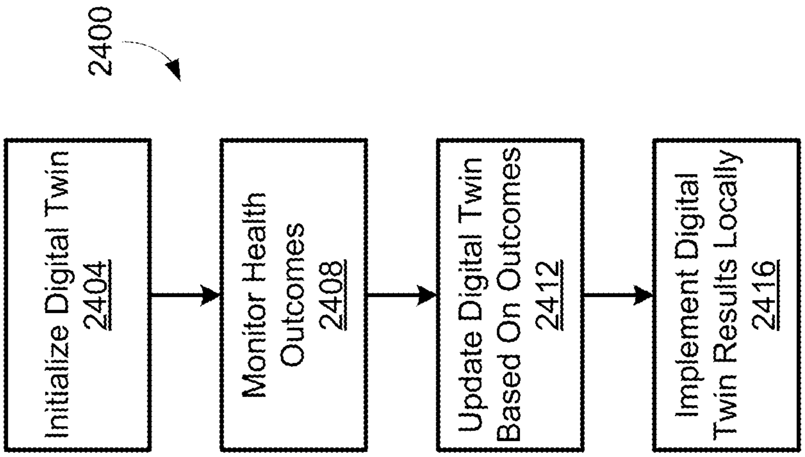
FIG. 26 is a flow chart of a treatment improvement through environmental control method for operating the system architecture of FIG. 18, according to some embodiments.

As shown in FIG. 26, the digital twin 1604 includes a treatment improvement engine that is structured to model a treatment space environment and associate environmental parameters with health outcomes. The treatment improvement engine is structured to implement a treatment improvement method 2400 that includes initializing the treatment improvement engine at step 2404 with an initial policy defining prescribed environmental parameters associated with various treatment procedures. For example, a burn unit space may define a first set of environmental parameters (e.g., temperature, pressure, humidity, air quality, parts per million of identified contaminants, air flow rates, etc.), while an operation space may define a second set of environmental parameters different from the first set of environmental parameters.

At step 2408, the treatment improvement engine monitors health outcomes and the associated environmental conditions over time and uses the associated outcomes to train and update the treatment improvement engine at step 2412. Continually updating the treatment improvement engine of the digital twin 1604 based on health outcomes, and the association of health outcomes to environmental parameters allows the digital twin 1604 to identify correlations and relationships that may not be apparent. For example, improved environmental parameters for a burn unit may be different than improved environmental parameters for a post-surgery recovery ward. The digital twin 1604 is capable of determining improved environmental parameters that may not be apparent to operators of the building systems. The treatment improvement engine of the digital twin 1604 may be a remotely located artificial intelligence or machine learning engine that is trained based on the aggregated information from a large number of healthcare facilities. The knowledge and learning of the treatment improvement engine gained from multiple sources, can then be implemented by the integration engine 1404 of the system architecture 1600 locally at step 2416. In this way, the local building can leverage the learning provided by a larger network of healthcare facilities and a larger knowledge base of health outcome based environmental parameter associations.

Compliance Testing

Figure 27:
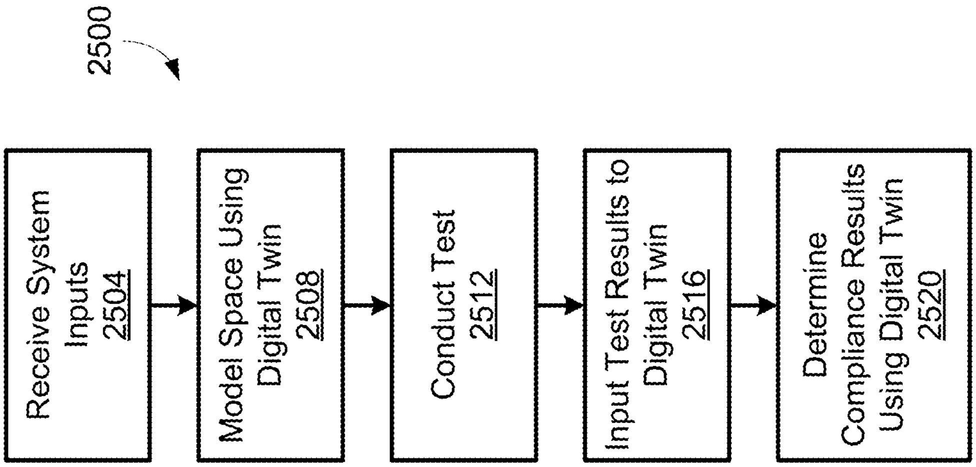
FIG. 27 is a flow chart of a compliance testing method for operating the system architecture of FIG. 18, according to some embodiments.

As shown in FIG. 27, the digital twin 1604 includes a compliance testing engine that is structured to model a space or room of the building and the building systems and/or sub-systems and use the compliance testing engine to provide compliance information that may be otherwise difficult to test. For example, in a healthcare facility, air dampers need to be periodically checked for compliance with compliance standards set by The Joint Commission or another compliance standard setting body or regulatory organization. Air dampers can sometimes be located behind ceiling or wall tiles and require disruption of an area of the healthcare facility to conduct adequate checks. The compliance testing engine may allow for non-invasive testing to verify compliance of systems and sub-systems with compliance standards without requiring disruption to the operation of the healthcare facility. The compliance testing engine is structured to implement a compliance testing method 2500 that include receiving system inputs at step 2504. The inputs can be any inputs associated with a particular component (e.g., an air handler), a system (e.g., the HVAC system 1618), or the space (e.g., an operating room). For example, control signals, ambient environmental information, fault codes, sensor information, or other sources of information can be utilized as inputs.

At step 2508, the compliance testing engine processes the inputs and generates a model of the space and/or component (e.g., a digital representation of the air handler). The model accurately represents how the space and/or component react to situations in the real world. At step 2512, a non-invasive test is conduct on the real world space and/or component. For example, an air flow may be measured, a pressure tested, a temperature measured, a humidity measured, an air quality tested, etc. The non-invasive test does not require significant disturbance of the healthcare space allowing the healthcare space to continue normal operation during the testing.

At step 2516, the results of the testing completed in step 2512 are input into the compliance testing engine and the digital twin 1604 works to determine the parameters associated with the test result. The digital twin 1604 is structured to determine and recreate the operational parameters of the space and/or component that lead to the real world test result. Then, at step 2520, the determined operational parameters that lead to the real world test result are used to populate a compliance report evidencing the operation and validated testing results of the space and/or component. The digital twin 1604 can use the compliance testing engine to generate rich data of the operational parameters and to verify performance, operation, and other features of the space and/or component without requiring invasive testing or inspection of the space and/or component. The compliance testing engine allows for more complete compliance information to be generated and reported while minimizing the disturbance to healthcare facility operation.

Knowledge Graph

Figure 28:
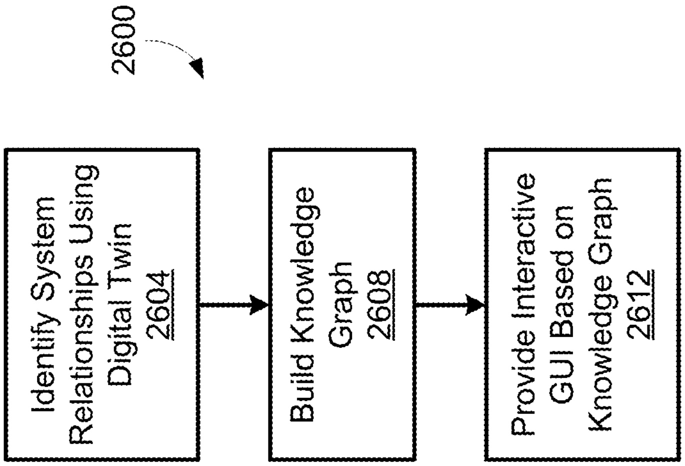
FIG. 28 is a flow chart of a knowledge graph method for operating the system architecture of FIG. 18, according to some embodiments.

As shown in FIG. 28, the digital twin 1604 includes a knowledge graph engine that is structured to model a building system. The knowledge graph engine implements a knowledge graph method 2600 including identification of system relationships at step 2604. The digital twin 1604 is capable of analyzing operation information of the building systems and identifying the causality between various inputs and parameters. For example, adjustment of temperature in a space may affect humidity and airflow of the space and adjacent spaces. The knowledge graph engine identifies the relationships, and generates a knowledge graph at step 2608. Over time the knowledge graph is updated as operational parameters of the space change. For example, the knowledge graph may change seasonally and ambient weather changes and affect operational parameters of the space.

At step 2612, the knowledge graph engine generates a graphical user interface (GUI) based on the knowledge graph that presents the relationships identified by the knowledge graph engine and allows users of the GUI to better understand the affects adjustments made to the system have on other parameters of their space. The knowledge graph engine can improve user behavior and improve overall compliance and efficiency of the space.

Asset Tracking

Asset tracking in a healthcare facility can refer human assets (e.g., nurses, doctors, administrative staff, patients, friends and family, etc.) and to physical assets (e.g., a crash cart, medical equipment, etc.). Additionally, action assets can include actions such as hand washing, mask usage, door closures, PPE procedures, or other activities that can be tracked and analyzed to determine the impact of the action assets. The system architecture 1600 can implement asset tracking to improve overall operation of the building. The digital twin 1604 or the integration engine 1404 can be used to track physical assets and determine ideal positioning or routings for physical assets. For example, the system architecture 1600 can identify the nearest medical device needed for a particular procedure. The system architecture 1600 can improve efficiency of medical equipment storage to reduce setup time, transport time, etc. The system architecture 1600 can provide improved wayfinding by tracking route efficiency for medical equipment related to various procedures. Using the digital twin 1604 to model the space allows for improved efficiency in asset tracking and improved capabilities of asset tracking systems.

Hand Washing And Other Contamination Containment

Figure 29:
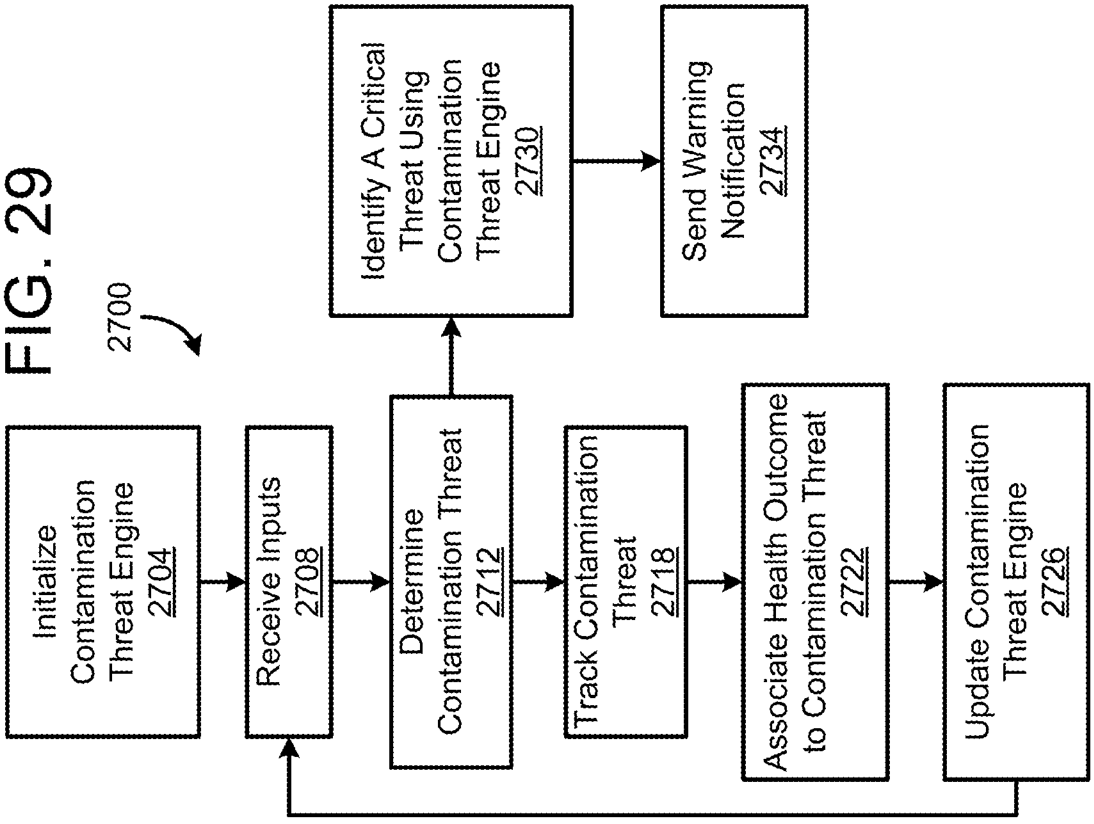
FIG. 29 is a flow chart of a hand washing and other contamination containment method for operating the system architecture of FIG. 18, according to some embodiments.

As shown in FIG. 29, a contamination threat engine resides in the system architecture 1600 (e.g., the digital twin 1604, the integration engine 1404, the cloud 1456, the enterprise management system 1460, etc.) and is structured to implement a contamination threat tracking method 2700. At step 2704, the contamination threat engine is initialized with a policy designed to track a particular contamination threat. For example, a contamination threat may include a hand washing activity, a PPE procedure, etc. The contamination threat engine then receives inputs at step 2708 related to the contamination threat. For example, inputs can include video analysis, or information received from sensors (e.g., water on time, soap volume dispensed, etc.).

At step 2712, the contamination threat engine determines a contamination threat parameter. In some embodiments, the contamination threat parameter is a percentage, a ratio value, a sliding scale value, or another parameter than indicates the likelihood of a contamination resulting from the activity being tracked. At step 2718, the contamination threat is tracked after the activity has taken place (e.g., the individual conducting the activity is tracked following the contamination threat activity). At step 2722, a health outcome of a patient is tied to the contamination threat and the determine contamination threat parameter. For example, no infection ensued, or an infection occurred.

Based on the contamination parameter and the tracked health outcome, the policy of the contamination threat engine is updated or trained at step 2726 and the method 2700 continues to track contamination threats using the updated policy. Over time, the contamination threat engine learns to associate contamination threat parameters with health outcomes and can identify contamination threat parameters that exceed a threshold or fall outside of a tolerance band and are therefore identified at step 270 as a critical threat. A critical threat indicates an increased risk of a negative health outcome. Once a critical threat is identified, a notification or warning can be sent by the system architecture at step 2734 to alert the individual that actions taken could lead to a negative health outcome and corrective action can be taken.

Hostile Situational Awareness

Figure 30:
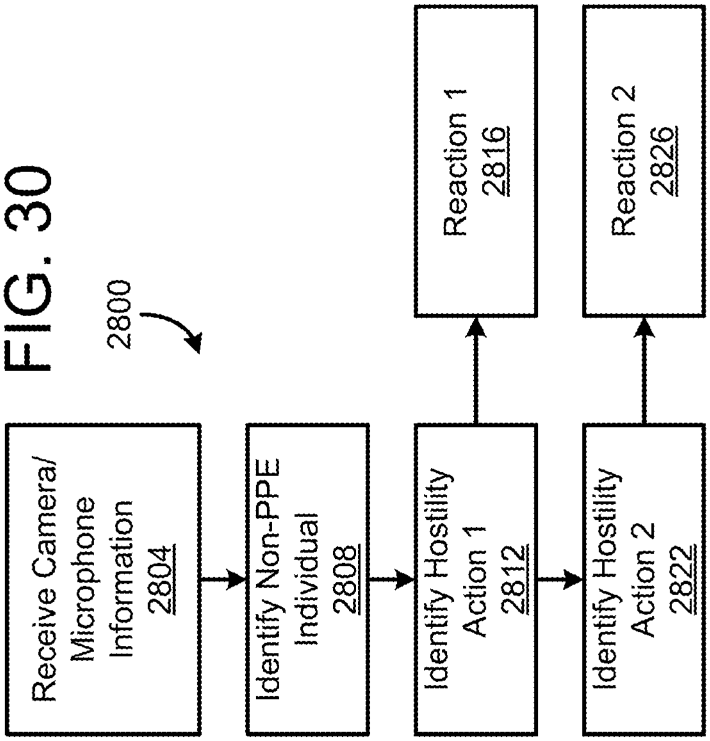
FIG. 30 is a flow chart of a hostile situational awareness method for operating the system architecture of FIG. 18, according to some embodiments.

As shown in FIG. 30, the system architecture 1600 can include a hostile situation engine structured to implement a hostile situation mitigation method 2800. The hostile situation engine can receive information at step 2804 including camera information from the camera system 1626, microphone information from the microphone system 1630, location information from the RTLS 1634, security information including badge access, door actuation, etc. from the security system 1638 and/or elevator system, and/or other information from the system architecture 1600.

At step 2808, the hostile situation engine identifies an individual who is not wearing PPE (e.g., not a nurse, doctor, etc.). At step 2812, a first hostile action is recognized. In some embodiments, hostile actions include classifications that identify a threat level. For example, a raised voice may indicate a low level threat, raised arms may indicate a medium level threat, and shouting and aggressive jerking movements may indicate a high threat level. In response to the first hostile action recognized in step 2812, a first reaction is implemented at step 2816. In some embodiments, the first reaction includes sending an automated alert including relevant information and video feed to a security team via the security system 1638. In some embodiments, the first reaction includes activating lights using the lighting system 1608 to provide full illumination of an ongoing hostile activity. In some embodiments, the first reaction include recording video and audio using the camera system 1626 and the microphone system 1630. In some embodiments, the first reaction includes activating the entertainment system 1622 to present a prerecorded message and/or video regarding hostile events, or to connect a live stream to security personal to engage with and affect the hostile situation immediately (e.g., reducing time to security engagement versus physically walking to the location of the hostile activity). The first reaction is intended to deescalate the hostile activity.

At step 2822, a second hostile action is identified and classified similar to the first hostile action. In response to the identification of the second hostile action, a second reaction is initiated at step 2826. The second reaction is intended to isolate the hostile activity and mitigate the ability of the hostile activity to spread. For example, the second reaction can include locking of doors (e.g., patient room doors, wing access doors, etc.), actuation of doors (e.g., automatically open or close doors), or closing of gates and/or other barriers. The barriers can be utilized to automatically isolate the hostile activity and inhibit its spread to other areas of the building. For example, using RTLS information from the RTLS 1634, the hostile situation engine can determine a location of the hostile event and lock all adjacent doors effectively locking the hostile individual in a single space or separating them from others who may be harmed. The hostile situation engine can be used to integrate building systems to mitigate hostilities and threats automatically with a fast response. The hostile situation engine leverages a variety of sensor inputs such as computer vision, audio sensing/voice recognition, and RTLS to sense danger to hospital staff, and then take coordinated action by integrating with a variety of systems (e.g., nurse call, watches, phone, other hospital systems) to converge help as quickly as possible to solve this dangerous situation. Further, the hostile situation engine can leverage hostility information to generate tailored insights, and relationships of hostile events to building parameters, layouts etc. and automated reporting for Joint Commission (or other regulatory body) compliance with safety standards or required procedures.

False Fault Detection For Compliance Reporting System

Compliance reporting is a required activity for many critical environment spaces (e.g., hospitals, data centers, health care facilities, oil and gas industry buildings, clean rooms, food processing facilities, etc.). Compliance as used herein refers to conforming building environmental parameters (e.g., temperature/pressure/humidity, particulates per million of contaminants, air quality factors, etc.) and/or other building characteristics (e.g., building equipment operating characteristics or parameters) to a rule, specification, policy, or law collectively referred to as compliance standards, set by a governing body, compliance setting body, government, or another third party outside the operator of the building or space. In some implementations, the features of the present disclosure may be used in conjunction with building compliance standards such as standards promulgated by the American Society of Heating, Refrigerating and Air-Conditioning Engineers (ASHRAE), carbon reduction/sustainability standards such as Leadership in Energy and Environmental Design (LEED) and/or National Australian Built Environment Rating System (NABERS) standards, building and occupant health standards such as those promulgated by the International WELL Building Institute, or any others. Regulations and accrediting organizations vary among fields, with examples such as PCI-DSS and GLBA in the financial industry, FISMA for U.S. federal agencies, HACCP for the food and beverage industry, and the Joint Commission and HIPAA in healthcare. In some cases other compliance frameworks (such as COBIT) or even standards (NIST) inform on how to comply with regulations. It should be understood that the example compliance standards referenced herein are provided by way of example only, and the features of the present disclosure can be utilized in conjunction with any compliance standard or framework, whether developed and promulgated by a standards setting organization or an internal or proprietary standard, and all such implementations are contemplated within the scope of the present disclosure.

Compliance reports may be assembled and submitted for review by the compliance setting body on a schedule and the compliance reports can include potential sources of non-compliance and actions taken to address the non-compliance. Typically, compliance reporting is done manually and requires significant manual labor and time. The lack of automation can lead to inconsistencies in reporting. Example automated compliance reporting systems are described in U.S. patent application Ser. No. 17/024,404 filed on Sep. 17, 2020, U.S. patent application Ser. No. 17/024,376 filed on Sep. 17, 2020, U.S. patent application Ser. No. 17/024,387 filed on Sep. 17, 2020, and U.S. patent application Ser. No. 17/408,014 filed on Aug. 20, 2021. The entire contents of these applications is incorporated herein by reference.

When using an automated compliance reporting system, it is desirable to eliminate false faults for the reports. False faults are situations where the parameters of the space have never become non-compliant or would not warrant addition to the report. In some embodiments, a false fault detection system can identify real compliance events that need to be added to the compliance report and reduce false faults where instantaneous parameter readings can spike (e.g., a door is held open and therefore a pressure reading drops for a short period of time). The false fault detection system monitors sensor information and compares the information with compliance standards. If the information is out of compliance, the false fault detection system utilizes a timer, a warning delay, an alert delay, trending analysis, and/or other measures to parse real compliance events from false faults. If the false fault detection system determines a real compliance event, the false fault detection system generates an alert and determines a root cause, and then automatically annotates the compliance report. The false fault detection system can also generate a work order to prompt for a service update or for a human to address the identifier real compliance event.

Figure 31:
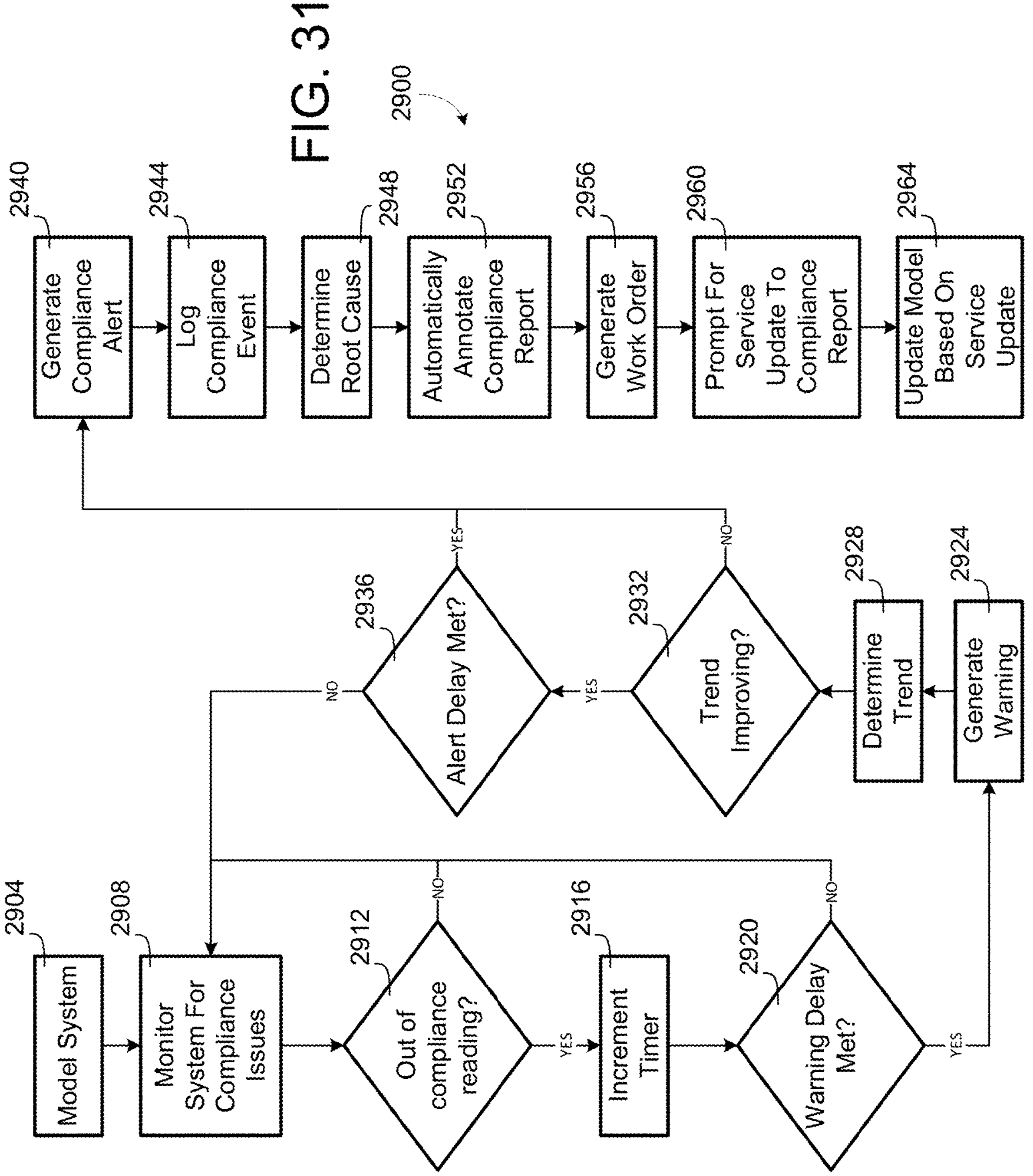
FIG. 31 is a flow chart of a false fault detection method operating the system architecture of FIG. 18, according to some embodiments.

As shown in FIG. 31, a false fault detection method 2900 can be implemented by the system architecture 1600. At step 2904, a false fault detection model is generated in the integration engine 1404. The false fault detection model is used to identify real events and to reduce false faults where instantaneous sensor information can indicate a spike in a compliance related parameter. The false fault detection model can include and/or operate using data stored in a digital twin of the critical environment space that is being monitored. For example, if the critical environment space is a hospital the inputs for the room are defined. In some embodiments, the inputs include connected air handlers, door switches, security cameras, sensor array (e.g., temperature, pressure, and humidity sensors), ventilation fans, windows, etc. The false fault detection model also includes logic (e.g., artificial intelligence or machine learning engines, physics based models, simple ladder logic, etc.) that identifies a root cause of a real compliance event based on the inputs. In some embodiments, the integration engine 1404 will communicate with the cloud 1456 and digital twin 1604 to implement the false fault detection model. While the present disclosure discusses using the features described herein in relation to critical environments, it should be understood that the features can be used in conjunction with any environment (e.g., any building, set of buildings, room or set or rooms or other portions of buildings, etc.).

At step 2908, the integration engine 1404 monitors information received from the sensor array for compliance issues. In some embodiments, compliance issues include sensor information exceeding a threshold or being below a threshold. For example, in a hospital setting, temperature, pressure, and humidity (TPH) compliance is monitored and the TPH of a critical environment space (e.g., an operating room) must be maintained within compliance standards for TPH.

At step 2912, the integration engine 1404 analyzes the sensor information received at step 2908, compares the information with a compliance standard, and determines if the information is out of compliance. If the information is not out of compliance (i.e., it is in compliance), the method 2900 returns to step 2908 for the integration engine 1404 to continue to monitor the sensor information. If the information is out of compliance at step 2912, the method 2900 continues to step 2916 and the integration engine 1404 increments a timer. In some embodiments, the timer is decremented when the information is in compliance at step 2912. In some embodiments, the timer is set to zero when the information is in compliance at step 2912.

At step 2920, the integration engine 1404 compares the timer to a warning delay time. In some embodiment, the warning delay time can be 5 minutes, 10 minutes, or 15 minutes. If the timer is less the warning delay time (NO), the method 2900 returns to step 2908 for the integration engine 1404 to continue to monitor the sensor information. In some embodiments, the timer is reset if the sensor information returns to compliance before the warning delay time is met.

If the timer is equal to or greater than the warning delay time, the method 2900 continues to step 2924, and the integration engine 1404 generates a warning. The warning can include a notification sent to the nurse call system 1412, the companion system 1464, a mobile device or another interface to alert relevant individuals of an out of compliance sensor information that has exceeded the warning delay time.

At step 2928, the integration engine 1404 determines a trend of the out of compliance sensor information. In some embodiments, the trend is a simple time based trend, a derivative (or gradient) trend (e.g., a derivative of a value of an environmental condition represented in the sensor information, a derivative of a difference between the value of the environmental condition and the compliance standard), a cumulative trend of an integral of information above a compliance threshold (i.e., of the difference between the sensor information and the compliance threshold), or based on another trending model. Determining the trend can include determining a direction and magnitude of the trend.

At step 2932, the integration engine 1404 analyzes the trend determined at step 2928. If the trend is improving (e.g., moving or trending toward compliance, sensor measurements trending in a direction towards the compliance standard), then the method 2900 continues to step 2936, and the timer is compared to an alert delay time. The alert delay time is larger (longer) than the warning delay time. In some embodiments, the alert delay time is about one hour. If the timer is less than the alert delay time, then the method 2900 returns to step 2908 and the integration engine 1404 continues to monitor the sensor information.

If the trend is not improving (e.g., the trend indicates worsening compliance conditions, sensor measurements trending in a direction away from the compliance sensor, etc.) at step 2932, then a compliance alert is generated at step 2940. Additionally, if the trend analyzed in step 2932 is improving or staying constant (e.g., not trending toward compliance but rather staying stable and out of compliance, sensor measurements not substantially changing) and the timer is greater than or equal to the alert delay time in step 2936, then the compliance alert is generated at step 2940.

In some embodiments, the integration engine 1404 utilizes a combination or blending of information to determine a real compliance event. For example, the integration engine 1404 may determine that the system is in compliance if the sensor information is within a first threshold of compliance (e.g., five percent) for less than a predetermined amount of time (e.g., two hours). The integration engine 1404 may determine that the system is out of compliance if the sensor information is within the first threshold of compliance (e.g., five percent) for greater than the predetermined amount of time (e.g., two hours). In some embodiments, the integration engine 1404 can use a model (e.g., artificial intelligence, machine learning, algorithms, physics based models, etc.) to determine real compliance events and false faults based on a combination of an amplitude of the sensor information relative to the compliance standards/thresholds and the time the sensor information has indicated that the system or space is out of compliance or within a threshold of out of compliance (e.g., five percent). For example, a threshold time (i.e., the warning delay time or the alert delay time) may be inversely proportional (or another relationship) with the deviation such that a larger deviation of the sensor information away from the compliance standard results in a smaller amount of time (e.g., 15% over compliance standard corresponds to a 5 minute predetermined time, 5% over compliance standard corresponds to a 30 minute predetermined time, etc.), such that the warning delay time and/or the alert delay time can be automatically adjusted based on a magnitude of the deviation of the sensor information from the compliance standard.

The compliance alert generated at step 2940 is provided to the nurse call system 1412, the companion system 1464, a mobile device or another interface to inform relevant individuals of the compliance alert. At step 2944, the integration engine 1404 logs the real compliance event into the compliance report. In some embodiments, the compliance report includes time, date, out of compliance sensor readings, and any other relevant information as dictated by the compliance setting body.

At step 2948, the integration engine 1404 utilizes the sensor information to determine a root cause of the real compliance event. To determine root causes, the integration engine 1404 can use information stored in the digital twin 1604 and implement a root cause determination engine to identify a list of most likely root causes for the real compliance event. Example root cause determination systems are described in U.S. Pat. No. 8,655,830 filed on Nov. 5, 2010, U.S. Pat. No. 9,753,455 filed on Mar. 31, 2011, U.S. patent Ser. No. 10/402,767 filed on Feb. 13, 2014, U.S. Pat. No. 8,731,724 filed on Sep. 27, 2011, and U.S. patent Ser. No. 11/182,047 filed on Nov. 22, 2017. The entire contents of these applications is incorporated herein by reference.

At step 2952, the integration engine 1404 automatically annotates the compliance report with the list of identified root causes. In some embodiments, the identified root cause includes problems that can be addressed by the system architecture 1600. For example, if a temperature is too high and the room is very sunny, the root cause may be addressed by automatically closing blinds. In another example, if the root cause indicates that an air handler is not operating correctly, a secondary air handler may be available to bring online to address the real compliance event. In this way, the system architecture 1600 can automatically address real compliance events. Should automatic actions be implemented, the compliance report is updated to indicate steps automatically taken by the system architecture 1600 and the results of those actions or steps.

In some embodiments, thermostat adjustments made by human operators can be a primary root cause of real compliance events in a hospital setting. When the integration engine 1404 generates the compliance alert, the integration engine 1404 can identify a root cause as a surgeon adjusted thermostat setting. For example, the system architecture 1600 can log the time of the adjustment to the thermostat, the degree of adjustment, the badge sign in of the surgeon, etc. In this case, the integration engine 1404 automatically annotates the compliance report based on the information (e.g., the surgeon's operation schedule) stored in the digital twin 1604.

Another root cause identification example includes an air handler operational status. The integration engine 1404 can generate the compliance alert, when a hospital staff shuts down an air handler (e.g., do to scheduling, maintenance, etc.). Using scheduling integration, the system architecture 1600 may be able to determine if the air handler shut down is intentional or not. In some embodiments, the integration engine 1404 adds the real compliance event to the compliance report and also indicate that the air handle (or other system component) shut down is intentional. In this case, the integration engine 1404 can use information (e.g., shutdown schedule) stored in the digital twin 1604.

Another root cause identification example includes outdoor air conditions. The integration engine 1404 can generate the compliance alert when a thermostat reading spikes because a staff or a customer props open a door. The integration engine 1404 can receive information from the security system or door switch sensor and can then automatically annotate the compliance report to indicate that the real compliance event was caused by an open door.

The root cause determination of the system architecture 1600 can allow for significant improvements in automated root cause determination because of the integration of the disparate systems within the system architecture 1600. Integration with a sensor array in the room, the security system, the scheduling systems, the nurse call system, and the HVAC system provides a large amount of information available to root cause determination engines employed by the integration engine 1404 and improves the accuracy of the root cause determination. The integration engine 1404 may be able to utilize multiple sensors and information sources to determine root causes. For example, if the integration engine 1404 determines that pressure in a duct leading to a space is correct, but the space is out of compliance for pressure, then the integration engine 1404 can determine that a door is open even if door switch information is not available.

At step 2956, the integration engine 1404 generates a work order. In some embodiments, when the integration engine 1404 identifies a root cause, the work order includes the list of root causes. The work order may not include identified root causes if none were determined in step 2948. The work order generated by the integration engine 1404 at step 2956 prompts a human to find and evaluate the real compliance event and manually annotate comments into the compliance report. In some embodiment, the comment field can include AI analysis of work order results. For example, how quickly was the real compliance event addressed and corrected.

At step 2960, the integration engine 1404 prompts for a service update to the compliance report. For example, what services were performed in response to the work order. What was the result of the services (e.g., problem fixed, problem improved but not fully fixed, not the problem, incorrectly identified root cause, etc.). At step 2964, the integration engine 1404 updates the false fault detection model based on the service update. This allows for real world feedback to train the false fault detection model and can improve via artificial intelligence over time and experience based on real world feedback. The improvements to the false fault detection model can be utilized by other similar facilities via the cloud 1456. In some embodiment, the integration engine 1404 builds databases in the digital twin 1604 to better understand future compliance events and more accurately generate root causes. In some embodiments, artificial intelligence can be used to analyze the stored databases for future compliance. In some embodiments, the database stored in the digital twin 1604 can include air filter changes and schedules, door switches that are disabled, maintenance schedules, etc.

In some embodiments, the compliance report can be used to identify and modify operator behavior. For example, if the integration engine 1404 identifies that a number of operator based real compliance events (e.g., propping open doors, adjusting thermostats, etc.) exceeds a threshold percentage of the total real compliance events, a warning or memo may be distributed to the relevant operators to indicate the real problems caused by those behaviors. In this way, the overall compliance of the space can be improved through education of the operators.

In some embodiments, the false fault detection method 2900 eliminates up to about 75% of false compliance events. This larger reduction in false positives for compliance issues greatly reduces the noise included on the compliance report and improves the usability of the automated compliance reporting systems.

Configuration of Exemplary Embodiments

Embodiments of the present disclosure relate to a building management system (BMS) of a building including one or more processing circuits comprising one or more memory devices storing instructions thereon that, when executed by one or more processors, cause the one or more processors to receive sensor information, determine that the sensor information is out of compliance relative to a compliance standard, increment a timer in response to determining that the sensor information is out of compliance, compare the timer to a warning delay time, and generate a warning when the timer exceeds the warning delay time.

In some embodiments, the one or more memory devices further store instructions thereon that, when executed by the one or more processors, cause the one or more processors to determine a trend of the sensor information, determine if the trend is improving, increment the timer in response to the trend improving, compare the timer to an alert delay time, and generate an alert in response to the timer exceeding the alert delay time.

In some embodiments, the one or more memory devices further store instructions thereon that, when executed by the one or more processors, cause the one or more processors to determine a trend of the sensor information, determine if the trend is improving, and generate an alert in response to the trend not improving.

In some embodiments, the one or more memory devices further store instructions thereon that, when executed by the one or more processors, cause the one or more processors to determine a trend of the sensor information, determine if the trend is improving, increment the timer in response to the trend improving, compare the timer to an alert delay time, and generate an alert in response to the timer exceeding the alert delay time or the trend not improving.

In some embodiments, the one or more memory devices further store instructions thereon that, when executed by the one or more processors, cause the one or more processors to automatically populate a compliance report in response to generating the alert, automatically determine a root cause in response to generating the alert, and/or automatically annotate the compliance report with the determined root cause. In some embodiments, the one or more memory devices store instructions thereon that, when executed by the one or more processors, cause the one or more processors to automatically generate a work order in response to generating the alert.

In some embodiments, the one or more memory devices further store a false fault detection model used to perform operations of the one or more processors. In some embodiments the one or more memory devices are further store instructions thereon that, when executed by the one or more processors, cause the one or more processors to update the false fault detection model based on the alert and/or update the false fault detection model based on actions taken to address the alert.

In some embodiments, the one or more memory devices store instructions thereon that, when executed by the one or more processors, cause the one or more processors to automatically determine a root cause in response to generating the alert, automatically address the root cause within the BMS, and update the false fault detection model based on automatically addressing the root cause within the BMS.

In some embodiments, the one or more memory devices are configured to store instructions thereon that, when executed by the one or more processors, cause the one or more processors to receive the sensor information including temperature, pressure, and humidity and determine if the temperature, pressure, and humidity are out of compliance relative to the compliance standard.

In some embodiments, the one or more memory devices store instructions thereon that, when executed by the one or more processors, cause the one or more processors to determine a trend of the sensor information and identify a real compliance event based on the trend. In some embodiments, the one or more memory devices store instructions thereon that, when executed by the one or more processors, cause the one or more processors to decrement the timer in response to determining that the sensor information is in compliance.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A compliance system for a environment comprising:

at least one sensor configured to output sensor measurements relating to at least one environmental condition of the environment;

a computing system programmed to:

record a warning when the sensor measurements are out of compliance relative to a compliance standard for longer than a warning delay time;

in response to a combination of recording the warning and a non-improving trend of the sensor measurements, generate an alert;

in response a combination of recording the warning and an improving trend of the sensor measurements:

suppress the alert until the improving trend continues with the sensor measurements out of compliance for greater than an alert delay time; and generate the alert upon the improving trend continuing with the sensor measurements out of compliance for greater than the alert delay time.

2. The compliance system of claim 1, wherein the computing system is programmed to classify the sensor measurements as having the improving trend or the non-improving trend by calculating a derivative of the sensor measurements.

3. The compliance system of claim 1, wherein the computing system is programmed to classify the sensor measurements as having the improving trend or the non-improving trend by calculating an integral of a difference between the sensor measurements and the compliance standard.

4. The compliance system of claim 1, wherein the computing system is programmed to classify the sensor measurements as having the improving trend or the non-improving trend by:

determining a direction of change of the sensor measurements over time;

identifying the improving trend when the direction of change is toward the compliance standard; and identifying the non-improving trend when the direction of change is away from the compliance standard or when the sensor measurements are not changing over time.

5. The compliance system of claim 1, wherein the computing system is programmed to adjust the warning delay time or the alert delay time based on a magnitude of a deviation of the sensor measurements from the compliance standard.

6. The compliance system of claim 1, further comprising a display, wherein the computing system is configured to generate the alert by causing a notification to be presented on the display, wherein the computing system is programmed to abstain from causing the notification to be presented in response to the warning until the alert is generated.

7. The compliance system of claim 6, wherein the computing system is configured to automatically populate a compliance report with the warning.

8. The compliance system of claim 1, wherein the environment is an operating room of a healthcare facility and the sensor measurements represent temperature, pressure, and humidity of the operating room.

9. The compliance system of claim 1, wherein the environment is a laboratory.

10. The compliance system of claim 1, wherein the computing system is programmed to automatically determine a root cause in response to the alert and automatically generate a work order to resolve the root cause.

11. The compliance system of claim 1, wherein the computing system is programmed to automatically determine a root cause in response to the alert and cause a unit of building equipment to change operations to resolve the root cause.

12. The compliance system of claim 1, wherein the computing system is programmed to record the warning when the sensor measurements are out of compliance relative to the compliance standard for longer than the warning delay time by:

incrementing a timer in response to the sensor measurements being out of compliance;

decrementing the timer in response to the sensor measurements being in compliance; and comparing the timer to the warning delay time.

13. A method for reducing alarm noise in a monitoring system for compliance standards for temperature, pressure, or humidity of a healthcare facility, comprising:

collecting, by at least one sensor, sensor measurements relating to at least one of the temperature, pressure, and humidity of the healthcare facility;

recording a warning when the sensor measurements are out of compliance relative to a compliance standard for longer than a warning delay time;

in response to a combination of recording the warning and a non-improving trend of the sensor measurements, generating an alert;

in response a combination of recording the warning and an improving trend of the sensor measurements:

suppressing the alert until the improving trend continues with the sensor measurements out of compliance for greater than an alert delay time; and generating the alert upon the improving trend continuing with the sensor measurements out of compliance for greater than the alert delay time.

14. The method of claim 13, comprising classifying the sensor measurements as having the improving trend or the non-improving trend by calculating an integral of a difference between the sensor measurements and the compliance standard or by calculating a derivative of the difference.

15. The method of claim 13, comprising classifying the sensor measurements as having the improving trend or the non-improving trend by:

determining a direction of change of the sensor measurements over time;

identifying the improving trend when the direction of change is toward the compliance standard; and identifying the non-improving trend when the direction of change is away from the compliance standard or when the sensor measurements are not changing over time.

16. The method of claim 13, comprising:

abstaining from causing a notification be pushed to a user in response to the warning until the alert is generated; and causing the notification to be pushed to the user in response to generating the alert.

17. The method of claim 16, comprising automatically populating a compliance report with the warning.

18. One or more non-transitory computer-readable media storing program instructions that, when executed by one or more processors, cause the one or more processors to perform operations comprising:

recording a warning when sensor measurements relating to at least one environmental condition of a environment are out of compliance relative to a compliance standard for longer than a warning delay time;

in response to a combination of recording the warning and a non-improving trend of the sensor measurements, generating an alert;

in response a combination of recording the warning and an improving trend of the sensor measurements:

suppressing the alert until the improving trend continues with the sensor measurements out of compliance for greater than an alert delay time; and generating the alert upon the improving trend continuing with the sensor measurements out of compliance for greater than the alert delay time.

19. The one or more non-transitory computer-readable media of claim 18, wherein the operations further comprise:

abstaining from causing a notification be pushed to a display device in response to the warning until the alert is generated;

causing the notification to be pushed to the display device in response to generating the alert; and automatically populating a compliance report with the warning.

20. The one or more non-transitory computer-readable media of claim 18, wherein the environment is an operating room of a healthcare facility and the sensor measurements represent temperature, pressure, and humidity of the operating room.

* * * * *